US011651514B1

(12) United States Patent
Olsson et al.

(10) Patent No.: US 11,651,514 B1
(45) Date of Patent: *May 16, 2023

(54) GROUND TRACKING APPARATUS, SYSTEMS, AND METHODS

(71) Applicant: SeeScan, Inc., San Diego, CA (US)

(72) Inventors: Mark S. Olsson, La Jolla, CA (US); Scott A. Powell, San Diego, CA (US); Nicholas A. Smith, Chula Vista, CA (US); Ryan B. Levin, San Diego, CA (US); Thomas R. Kok, San Diego, CA (US); Michael J. Martin, San Diego, CA (US); Garrett A. Newby, San Diego, CA (US)

(73) Assignee: SEESCAN, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/936,250

(22) Filed: Mar. 26, 2018

Related U.S. Application Data

(63) Continuation of application No. 14/752,834, filed on Jun. 27, 2015, now Pat. No. 9,928,613.

(Continued)

(51) Int. Cl.
| | |
|---|---|
| *G06T 7/73* | (2017.01) |
| *G01V 3/165* | (2006.01) |
| *G01C 11/08* | (2006.01) |
| *G01C 11/02* | (2006.01) |
| *H04N 5/225* | (2006.01) |

(Continued)

(52) U.S. Cl.
CPC .............. *G06T 7/74* (2017.01); *G01B 11/002* (2013.01); *G01C 11/02* (2013.01); *G01C 11/08* (2013.01); *G01V 3/165* (2013.01); *G06T 7/248* (2017.01); *G06T 7/292* (2017.01); *H04N 5/2252* (2013.01); *H04N 5/2257* (2013.01); *H04N 5/2258* (2013.01); *G06T 2207/10021* (2013.01);

(Continued)

(58) Field of Classification Search
CPC ........... G06T 7/74; G06T 7/292; G06T 7/248; G01B 11/002; G01C 11/08; G01C 11/02; G01V 3/165; H04N 5/2252; H04N 5/2257; H04N 5/2258
See application file for complete search history.

(56) References Cited

U.S. PATENT DOCUMENTS 7,201,236 B1 * 4/2007 Nickel ................ E21B 47/0232
175/45
7,443,154 B1 10/2008 Merewether et al.
(Continued)

FOREIGN PATENT DOCUMENTS

JP 2001-266129 A 9/2001

OTHER PUBLICATIONS

International Searching Authority, "Written Opinion of the International Searching Authority" for PCT Patent Application No. PCT/US15/38377, dated Jan. 7, 2016, European Patent Office, Munich.

*Primary Examiner* — Sunghyoun Park
(74) *Attorney, Agent, or Firm* — Steven C. Tietsworth, Esq.

(57) ABSTRACT

Apparatus, systems, and methods are disclosed for tracking movement over the ground or other surfaces using two or more spaced apart cameras and an associated processing element to detect ground features in images from the cameras and determine tracking parameters based on the position of the detected ground features in the images.

16 Claims, 46 Drawing Sheets

Related U.S. Application Data

(60) Provisional application No. 62/019,715, filed on Jul. 1, 2014.

(51) Int. Cl.
    *G01B 11/00*    (2006.01)
    *G06T 7/292*    (2017.01)
    *G06T 7/246*    (2017.01)

(52) U.S. Cl.
    CPC .............. *G06T 2207/30181* (2013.01); *G06T 2207/30184* (2013.01); *G06T 2207/30244* (2013.01)

(56) References Cited

U.S. PATENT DOCUMENTS

| | | | |
|---|---|---|---|
| 2005/0156776 A1* | 7/2005 | Waite | G01V 3/12 342/22 |
| 2007/0044536 A1* | 3/2007 | Gunsaulis | E21B 7/04 73/1.79 |
| 2010/0141261 A1* | 6/2010 | Overby | G01V 3/12 702/2 |
| 2010/0309311 A1 | 12/2010 | Svanholm | |
| 2013/0002854 A1* | 1/2013 | Nielsen | H04N 7/183 348/94 |
| 2013/0127470 A1* | 5/2013 | Olsson | G01V 3/104 324/326 |

* cited by examiner

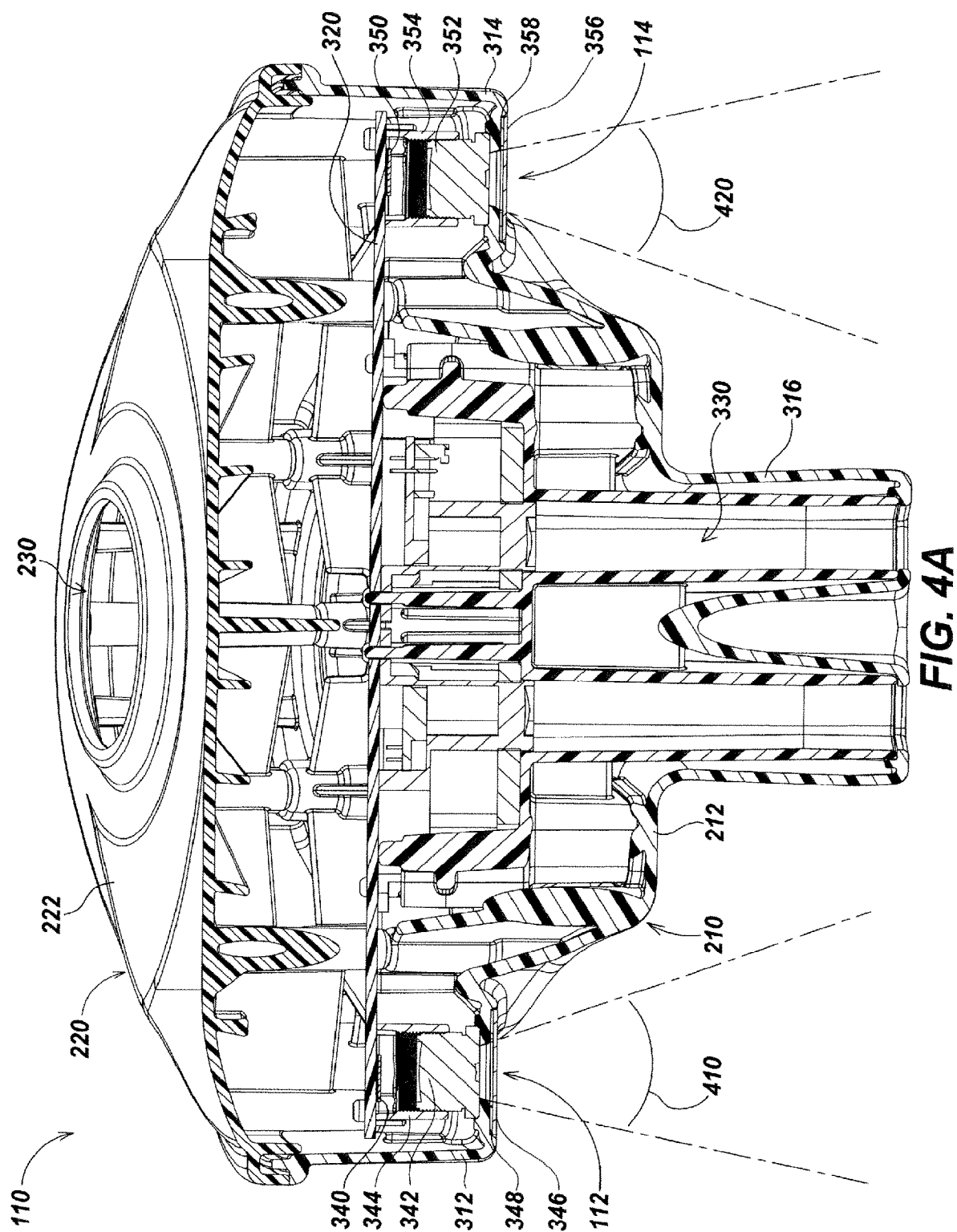

GROUND TRACKING APPARATUS, SYSTEMS, AND METHODS

CROSS-REFERENCE TO RELATED APPLICATIONS

This application is a continuation of and claims priority to U.S. Utility patent application Ser. No. 14/752,834, entitled GROUND TRACKING APPARATUS, SYSTEMS, AND METHODS, filed Jun. 27, 2015, which claims priority under 35 U.S.C. § 119(e) to U.S. Provisional Patent Application Ser. No. 62/019,715, entitled STEREO OPTICAL GROUND TRACKING APPARATUS, SYSTEMS, AND METHODS, filed in Jul. 1, 2014. The content of each of these applications is incorporated by reference herein in its entirety for all purposes.

FIELD

This disclosure relates generally to apparatus, systems, and methods for tracking movement over the ground or other surfaces and generating associated tracking information. More specifically, but not exclusively, the disclosure relates to ground tracking devices and methods for tracking ground movement of a buried utility locator or other device using two or more offset cameras or other imaging sensors to capture images and locate ground features within the images using correlations or other image processing. Relative positioning of the ground features within the images may then be used to determine height and positional information of the ground tracker and, in combination with time data, velocity and other parameters associated with position or movement of the ground tracking apparatus may also be determined.

BACKGROUND

Tracking and storing position and movement data has become integral in many activities. For example, navigation and mapping, surveying, fleet tracking, and robotics applications are just a few common applications where the ability to track position and motion has become important. Many of these applications suffer from inaccuracies inherent in the position tracking technology itself. Moreover, in applications where highly accurate position data is necessary, a lack of accuracy may result in poor data and associated maps, and in some cases serious and costly problems, such as infrastructure damage, fires, explosions, and even injury or death in some cases.

For example, locating and documenting buried utilities such as water pipes, electrical power conduits or cables, or gas lines with a high degree of precision has become essential to maintaining and improving infrastructure, as well as to ensure the safety of humans living or working nearby. Buried utility locators (also denoted here in as a "utility locator," "line locator," or simply "locator" for brevity) are devices that are commonly used to find these kinds of underground utilities. One popular type of locator uses magnetic field sensing to locate utilities based on magnetic fields emitted from the utility. The magnetic fields are generated from currents flowing in the utility itself or, in some cases, in by current flowing in other associated conductors such as tracer wires or, in some cases, directly from a magnetic field sonde device (also denoted herein as a "sonde" for brevity) that is inserted into a pipe or other cavity and generates a dipole magnetic field at its point of insertion.

Some utility locators use other additional sensors to enhance locating ability. For example, satellite navigation systems such as global positioning satellite (GPS) receivers have been used to approximate the location of utilities. Even with enhanced capabilities of additional sensors and/or apparatus the accuracy of locating a buried utility with existing locators may be lacking due to the inherent imprecision of such known systems, such as when GPS receivers have poor satellite coverage or are subject to interference.

Accordingly, there is a need in the art to address the above-described as well as other position determination, tracking, and mapping related problems.

SUMMARY

This disclosure relates generally to apparatus, systems, and methods for tracking movement over the ground or other surfaces and generating associated tracking information. More specifically, but not exclusively, the disclosure relates to ground tracking devices and methods for tracking ground movement of a buried utility locator or other device using two or more offset cameras or other imaging sensors to capture images and locate ground features within the images using correlations or other image processing. Relative positioning of the ground features within the images may then be used to determine height and positional information of the ground tracker and, in combination with time data, velocity and other parameters associated with position or movement of the ground tracking apparatus may also be determined.

For example, in one aspect the disclosure relates to a ground tracker for tracking movement over a surface. The ground tracker may include, for example, a housing; a first camera element disposed on or in the housing; a second camera element disposed on or in the housing offset in position relative to the first camera element; and a processing element coupled to an output from the first camera element and the second camera element. The processing element may be programmed with instructions to: receive an image from the first camera element and an image from the second camera element, wherein the first camera element image and the second camera element image are captured with the ground tracking apparatus at a first position; detect a ground feature in both the image from the first camera element and the image from the second camera element; determine, based on a position of the ground feature in the image from the first camera element and a position of the ground feature in the image from the second camera element, a height value of the ground tracker above the ground feature at the first position; and store the height value at the first position in a non-transitory memory. The image from the first camera element and the image from the second camera element may be captured at substantially the same time. The image from the first camera element and the second camera element may alternately be captured at different points in time.

In another aspect, the disclosure relates to methods for implementing the above-described processing elements and camera functions, in whole or in part.

In another aspect, the disclosure relates to non-transitory storage media containing programming instructions for programming one or more processor or processing element to implement the processing element functions as described above, in whole or in part.

In another aspect, the disclosure relates to means for implementing the above-described ground tracking elements or functions, in whole or in part.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein:

FIG. 4A is a section view of details of the ground tracking apparatus embodiment of FIG. 2B along line 4-4.

DETAILED DESCRIPTION

Overview

Figure 1A:
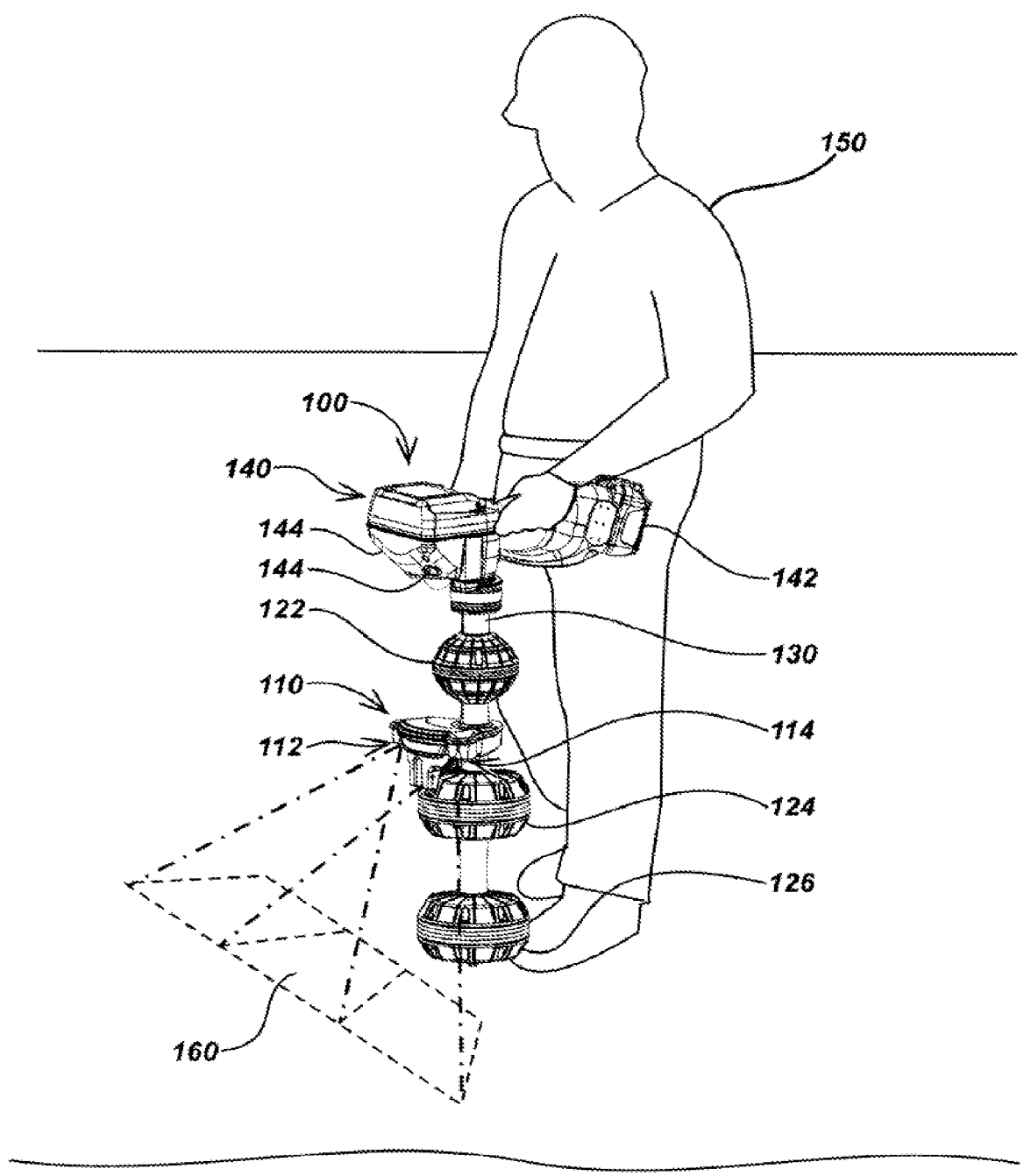
FIG. 1A illustrates a user with a buried utility locator having an embodiment of a ground tracking apparatus attached.

Various aspects and details of ground tracking apparatus as described herein may be used in combination with the disclosures of the following co-assigned patents and patent applications in additional device, method or system embodiments. These co-assigned applications include U.S. Pat. No. 7,009,399, filed Oct. 9, 2002, entitled OMNIDIRECTIONAL SONDE AND LINE LOCATOR; U.S. patent application Ser. No. 10/308,752, filed Dec. 3, 2002, entitled SINGLE AND MULTI-TRACE OMNIDIRECTIONAL SONDE AND LINE LOCATORS AND TRANSMITTER USED THEREWITH; U.S. Pat. No. 7,336,078, filed Oct. 1, 2004, entitled MULTI-SENSOR MAPPING OMNI-DIRECTIONAL SONDE AND LINE LOCATORS AND TRANSMITTER USED THEREWITH; U.S. Pat. No. 7,619,516, filed Mar. 11, 2005, entitled SINGLE AND MULTI-TRACE OMNIDIRECTIONAL SONDE AND LINE LOCATORS AND TRANSMITTER USED THEREWITH; U.S. Pat. No. 7,332,901, filed Apr. 15, 2005, entitled LOCATOR WITH APPARENT DEPTH INDICATION; U.S. Pat. No. 7,276,910, filed Jul. 19, 2005, entitled A COMPACT SELF-TUNED ELECTRICAL RESONATOR FOR BURIED OBJECT LOCATOR APPLICATIONS; U.S. Pat. No. 7,288,929, filed Jul. 19, 2005, entitled INDUCTIVE CLAMP FOR APPLYING SIGNAL TO BURIED UTILITIES; U.S. Pat. No. 7,136,765, filed Aug. 15, 2005, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 8,203,343, filed Oct. 12, 2005, entitled RECONFIGURABLE PORTABLE LOCATOR EMPLOYING MULTIPLE SENSOR ARRAYS HAVING FLEXIBLE NESTED ORTHOGONAL ANTENNAS; U.S. patent application Ser. No. 11/551,651, filed Oct. 20, 2006, entitled A SELF-STANDING MAPPING SONDE & LINE LOCATOR EMPLOYING IMPROVED DISPLAY METHODS WITH INTEGRAL GROUND-PENETRATING RADAR AND OTHER DETACHABLE DETECTION APPARATUS; U.S. Pat. No. 7,298,126, filed Mar. 8, 2007, entitled SONDES FOR LOCATING UNDERGROUND PIPES AND CONDUITS; U.S. Pat. No. 8,264,226, filed Jul. 6, 2007, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 11/782,572, filed Jul. 24, 2007, entitled MARKING PAINT APPLICATOR FOR PORTABLE LOCATOR; U.S. Pat. No. 7,741,848, filed Sep. 13, 2007, entitled ADAPTIVE MULTI-CHANNEL LOCATOR SYSTEM FOR MULTIPLE PROXIMITY DETECTION; U.S. Pat. No. 8,013,610, filed Dec. 20, 2007, entitled HIGH Q SELF-TUNING LOCATING TRANSMITTER; U.S. Pat. No. 7,498,797, filed Dec. 21, 2007, entitled LOCATOR WITH CURRENT-MEASURING CAPABILITY; U.S. Pat. No. 7,518,374, filed Jan. 1, 2008, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,755,360, filed Apr. 21, 2008, entitled PORTABLE LOCATOR SYSTEM WITH JAMMING REDUCTION; U.S. Pat. No. 7,733,077, filed Oct. 1, 2008, entitled MULTI-SENSOR MAPPING OMNI-DIRECTIONAL SONDE AND LINE LOCATORS AND TRANSMITTER USED THEREWITH; U.S. Pat. No. 7,443,154, filed Oct. 28, 2008, entitled MULTI-SENSOR MAPPING OMNIDIRECTIONAL SONDE AND LINE LOCATOR; U.S. Pat. No. 8,248,056, filed Oct. 31, 2008, entitled A BURIED OBJECT LOCATOR SYSTEM EMPLOYING AUTOMATED VIRTUAL DEPTH EVENT DETECTION AND SIGNALING; U.S. Pat. No. 8,400,154, filed Feb. 6, 2009, entitled LOCATOR ANTENNA WITH CONDUCTIVE BOBBIN; U.S. Pat. No. 7,825,647, filed Jun. 8, 2009, entitled COMPACT LINE ILLUMINATOR FOR LOCATING BURIED PIPES AND CABLES; U.S. Pat. No. 8,106,660, filed May 14, 2010, entitled SONDE ARRAY FOR USE WITH BURIED LINE LOCATOR; U.S. Pat. No. 7,948,236, filed May 24, 2010, entitled Adaptive MULTI-CHANNEL LOCATOR SYSTEM FOR MULTIPLE PROXIMITY DETECTION; U.S. Pat. No. 7,990,151, filed Jun. 14, 2010, entitled TRI-POD BURIED LOCATOR SYSTEM; U.S. patent application Ser. No. 12/827,993, filed Jun. 30, 2010, entitled MARKING PAINT APPLICATOR FOR PORTABLE LOCATOR; U.S. patent application Ser. No. 12/939,591, filed Nov. 4, 2010, entitled SMART PERSONAL COMMUNICATION DEVICES AS USER INTERFACES; U.S. patent application Ser. No. 12/947,503, filed Nov. 16, 2010, entitled IMAGE-BASED MAPPING LOCATING SYSTEM; U.S. patent application Ser. No. 13/041,320, filed Mar. 4, 2011, entitled ECONOMICAL MAGNETIC LOCATOR APPARATUS AND METHOD; U.S. Pat. No. 8,773,133, filed May 16, 2011, entitled ADAPTIVE MULTICHANNEL LOCATOR SYSTEM FOR MULTIPLE PROXIMITY DETECTION; U.S. patent application Ser. No. 13/161,183, filed Jun. 15, 2011, entitled GROUND-TRACKING DEVICES FOR USE WITH A MAPPING LOCATOR; U.S. patent application Ser. No. 13/189,844, filed Jul. 25, 2011, entitled BURIED LOCATOR SYSTEMS AND METHODS; U.S. patent application Ser. No. 13/356,408, filed Jan. 23, 2012, entitled SONDES AND METHODS FOR USE WITH BURIED LINE LOCATOR SYSTEMS; U.S. patent application Ser. No. 13/469,024, filed May 10, 2012, entitled BURIED OBJECT LOCATOR APPARATUS AND SYSTEMS; U.S. patent application Ser. No. 13/493,883, filed Jun. 11, 2012, entitled MAGNETIC SENSING BURIED OBJECT LOCATOR INCLUDING A CAMERA; U.S. patent application Ser. No. 13/532,721, filed Jun. 25, 2012, entitled MODULAR BATTERY PACK APPARATUS, SYSTEMS, AND METHODS; U.S. patent application Ser. No. 13/570,084, filed Aug. 8, 2012, entitled HAPTIC DIRECTIONAL FEEDBACK HANDLE FOR LOCATION DEVICES; U.S. patent application Ser. No. 13/570,211, filed Aug. 8, 2012, entitled PHASE SYNCHRONIZED BURIED OBJECT LOCATOR APPARATUS, SYSTEMS, AND METHODS; U.S. patent application Ser. No. 13/584,799, filed Aug. 13, 2012, entitled BURIED OBJECT LOCATOR SYSTEMS AND METHODS; U.S. patent application Ser. No. 13/602,303, filed Sep. 3, 2012, entitled WIRELESS BURIED PIPE AND CABLE LOCATING SYSTEMS; U.S. patent application Ser. No. 13/605,960, filed Sep. 6, 2012, entitled SYSTEM AND METHODS FOR LOCATING BURIED OR HIDDEN OBJECTS USING SHEET CURRENT FLOW MODELS; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS & METHODS; U.S. patent application Ser. No. 13/766,670, filed Feb. 13, 2013, entitled OPTICAL GROUND TRACKING APPARATUS, SYSTEMS, AND METHODS; U.S. patent application Ser. No. 13/787,711, filed Mar. 6, 2013, entitled DUAL SENSED LOCATING SYSTEMS AND METHODS; U.S. patent application Ser. No. 13/841,879, filed Mar. 15, 2013, entitled GROUND-TRACKING SYSTEMS AND APPARATUS; U.S. patent application Ser. No. 13/850,181, filed Mar. 25, 2013, entitled GRADIENT ANTENNA COILS AND ARRAYS FOR USE IN LOCATING SYSTEMS; U.S. patent application Ser. No. 13/894,038, filed May 14, 2013, entitled OMNI-INDUCER TRANSMITTING DEVICES AND METHODS; U.S. patent application Ser. No. 13/925,636, filed Jun. 24, 2013, entitled MODULAR BATTERY PACK APPARATUS, SYSTEMS, AND METHODS INCLUDING VIRAL DATA AND/OR CODE TRANSFER; U.S. patent application Ser. No. 13/958,492, filed Aug. 2, 2013, entitled OPTICAL GROUND TRACKING APPARATUS, SYSTEMS & METHODS; U.S. patent application Ser. No. 14/022,067, filed Sep. 9, 2013, entitled USER INTERFACES FOR UTILITY LOCATORS; U.S. patent application Ser. No. 14/053,401, filed Oct. 14, 2013, entitled BURIED OBJECT LOCATING DEVICES AND METHODS; U.S. Pat. No. 8,564,295, filed Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. patent application Ser. No. 14/080,582, filed Nov. 14, 2013, entitled MULTI-FREQUENCY LOCATING SYSTEMS & METHODS; U.S. patent application Ser. No. 14/148,649, filed Jan. 6, 2014, entitled MAPPING LOCATING SYSTEMS & METHODS; U.S. patent application Ser. No. 14/154,128, filed Jan. 13, 2014, entitled UTILITY LOCATOR SYSTEMS & METHODS; U.S. patent application Ser. No. 14/214,051, filed Mar. 14, 2014, entitled GROUND-TRACKING SYSTEMS & APPARATUS; U.S. patent application Ser. No. 14/214,263, filed Mar. 14, 2014, entitled USER INTERFACES FOR ENHANCED UTILITY LOCATORS; U.S. patent application Ser. No. 14/215,239, filed Mar. 17, 2014, entitled OPTICAL GROUND TRACKING APPARATUS, SYSTEMS, AND METHODS; U.S. patent application Ser. No. 14/229,813, filed Mar. 28, 2014, entitled UTILITY LOCATOR TRANSMITTER APPARATUS & METHODS; U.S. patent application Ser. No. 14/321,699, filed Jul. 1, 2014, entitled UTILITY LOCATOR APPARATUS, SYSTEMS, AND METHODS; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. Provisional Patent Application No. 62/026,010, filed Jul. 17, 2014, entitled METHODS AND SYSTEMS FOR GENERATING INTERACTIVE MAPPING DISPLAYS IN CONJUNCTION WITH USER INTERFACE DEVICES; U.S. Provisional Patent Application No. 62/030,562, filed Jul. 29, 2014, entitled INDUCTIVE CLAMP DEVICES, SYSTEMS, AND METHODS; U.S. patent application Ser. No. 14/446,279, filed Jul. 29, 2014, entitled INDUCTIVE CLAMP DEVICES, SYSTEMS, AND METHODS; U.S. patent application Ser. No. 14/446,145, filed Jul. 29, 2014, entitled UTILITY LOCATING SYSTEMS WITH MOBILE BASE STATION; U.S. patent application Ser. No. 14/516,558, filed Oct. 16, 2014, entitled ELECTRONIC MARKER DEVICES AND SYSTEMS; U.S. patent application Ser. No. 14/179,538, filed Dec. 12, 2014, entitled OPTICAL GROUND TRACKING APPARATUS, SYSTEMS, AND METHODS; U.S. patent application Ser. No. 14/580,097, filed Dec. 22, 2014, entitled NULLED-SIGNAL LOCATING DEVICES, SYSTEMS, AND METHODS; U.S. patent application Ser. No. 14/584,996, filed Dec. 29, 2014, entitled OPTICAL GROUND TRACKING METHODS AND APPARATUS FOR USE WITH BURIED UTILITY LOCATORS; and U.S. Provisional Patent Application No. 61/107,985, filed Jan. 1, 2015, entitled SELF-STANDING MULTI-LEG ATTACHMENT DEVICES FOR USE WITH UTILITY LOCATORS. The content of each of these applications is incorporated by reference herein in its entirety. The utility locator and related device applications and patents may be collectively referred to herein as the "co-assigned applications" or "incorporated applications."

As used herein, the term "buried objects" includes objects located inside walls, between floors in multi-story buildings or cast into concrete slabs, for example, as well as objects below the surface of the ground, such as buried utilities. In a typical application a buried object is a pipe, cable, conduit, wire, or other object buried under the ground surface, at a depth of from a few centimeters to meters or more, that a user, such as a utility company, construction company, homeowner, or others wish to locate, map (e.g., by surface position as defined by lat/lon or other surface coordinates, and/or also by depth), and/or provide a corresponding mark of on the ground surface using paint or other markers.

As noted previously, this disclosure relates generally to apparatus, systems, and methods for tracking movement over the ground or other surfaces and generating associated tracking information. More specifically, but not exclusively, the disclosure relates to ground tracking devices and methods for tracking ground movement of a buried utility locator or other device using two or more offset cameras or other imaging sensors to capture images and locate ground features within the images using correlations or other image processing. Relative positioning of the ground features within the images may then be used to determine height and positional information of the ground tracker and, in combination with time data, velocity and other parameters associated with position or movement of the ground tracking apparatus may also be determined.

For example, in one aspect the disclosure relates to a ground tracker for tracking movement over a surface. The ground tracker may include, for example, a housing; a first camera element disposed on or in the housing; a second camera element disposed on or in the housing offset in position relative to the first camera element; and a processing element coupled to an output from the first camera element and the second camera element. The processing element may be programmed with instructions to: receive an image from the first camera element and an image from the second camera element, wherein the first camera element image and the second camera element image are captured with the ground tracking apparatus at a first position; detect a ground feature in both the image from the first camera element and the image from the second camera element; determine, based on a position of the ground feature in the image from the first camera element and a position of the ground feature in the image from the second camera element, a height value of the ground tracker above the ground feature at the first position; and store the height value at the first position in a non-transitory memory. The image from the first camera element and the image from the second camera element may be captured at substantially the same time. The image from the first camera element and the second camera element may alternately be captured at different points in time.

The processing element may, for example, be further programmed to: determine, based on one or both of the image from the first camera element and the image from the second camera element, the height value at the first position, and one or both of another image from the first camera element captured at a second position and another image from the second camera element captured at the second position, a change in position of the ground tracker relative to the first position; and store data associated with the change in position as a tracking parameter in the non-transitory memory.

Both of another image from the first camera element and another image from the second camera element may, for example, be captured at the second position. In this case the processing element may be further programmed to determine, based on a position of the ground feature in the another image from the first camera element and a position of the ground feature in the another image from the second camera element, a second height value corresponding to the height of the ground tracker above the ground feature at the second position; and store the second height value in the non-transitory memory. The another image from the first camera element and the another image from the second camera element may be captured at substantially the same time. The another image from the first camera element and the another image from the second camera element may alternately be captured at different points in time. If a second height value is determined, the change in position may be further based on the second height value.

The processing element may, for example, be further programmed to: receive another image from the first camera element and another image from the second camera element, wherein the another images are captured at a second position different from the first position; detect a ground feature in the another image from the first camera element and the another image from the second camera element; determine, based on a position of the ground feature in the another image from the first camera element and a position of the ground feature in the another image from the second camera element, a height value of the ground tracker above the ground feature at the second position; and store the height value at the second position in a non-transitory memory.

The processing element may, for example, be further programmed to: determine, based on one or both of the image from the first camera element and the image from the second camera element, the height value at the first position, the height value at the second position, and one or both of the another image from the first camera element and the another image from the second camera element captured at a second position, a change in position of the ground tracker relative to the first position; and store data corresponding to the change in position as a tracking parameter in the non-transitory memory. The data associated with the change of position may include a relative distance and/or direction between the first position and the second position. The data associated with the change of position may include coordinates of the second position relative to the first position. The data associated with the change of position may include other tracking parameters or data.

The processing element may, for example, be further programmed to: determine a time difference between capture of one or both of the images from the first camera element and the second camera element and the another image; based on both a determined relative distance and a determined relative direction between the first position and the second position, determine a velocity vector associated with movement of the ground tracker between the first position and the second position; and store the velocity vector as a tracking parameter in the non-transitory memory.

The processing element may, for example, be further programmed to: determine a time difference between capture of one or both of the images from the first camera element and the second camera element and the another image; based on a determined relative distance between the first position and the second position, determine a speed associated with movement of the ground tracker between the first position and the second position; and store the speed as a tracking parameter in the non-transitory memory.

The ground feature may, for example, be detected in the image from the first camera element and the image from the second camera element by correlating pixels of the image from the first camera element and pixels of the image from the second camera element.

The change in position of the ground tracker may, for example, be determined by correlating pixels of the image from the first camera element and the another image from the first camera element, or by correlating pixels of the image from the second camera element and the another image from the second camera element, or by correlating pixels of the image from the first camera element and the another image from the first camera element and correlating pixels of the image from the second camera element and the another image from the second camera element.

The processing element may, for example, be disposed in the housing. The processing element may alternate be disposed in whole or in part in another associated device or system. The ground tracker may be configured to be operatively coupled to a locator or other device. The processing element may be disposed in the locator or other device.

In another aspect, the disclosure relates to methods for implementing the above-described processing elements and camera functions, in whole or in part.

In another aspect, the disclosure relates to non-transitory storage media containing programming instructions for programming one or more processor or processing element to implement the processing element functions as described above, in whole or in part.

In another aspect, the disclosure relates to means for implementing the above-described ground tracking elements or functions, in whole or in part.

In another aspect, the disclosure relates to a predictive method that may be used to identify ground features and find ground feature correlations adjacent images or frames from two or more cameras or imaging sensors. This predictive method may use Block-Matching methods, such as the Sum of Absolute Difference (SAD) method, to refine a sampling range whereby correlations in ground features each identified as a grouping or block of pixels may be found between adjacent frames. An additional predictive method may also be used to identify ground correlation in successive frames taken at different position at either earlier or later times. In some embodiment of the predictive method, inertial navigation system (INS) sensor data and/or a predetermined maximum possible travel in the time of two successive frames may be used to determine a sampling range whereby correlations in ground features between successive frames over time may be identified.

Various additional aspects are described subsequently herein in conjunction with the appended Drawings.

As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments It is noted that the following exemplary embodiments are provided for the purpose of illustrating examples of various aspects, details, and functions of apparatus, methods, and systems for locating buried or hidden objects; however, the described embodiments are not intended to be in any way limiting. It will be apparent to one of ordinary skill in the art that various aspects may be implemented in other embodiments within the spirit and scope of the present disclosure.

EXAMPLE EMBODIMENTS

Figure 1B:
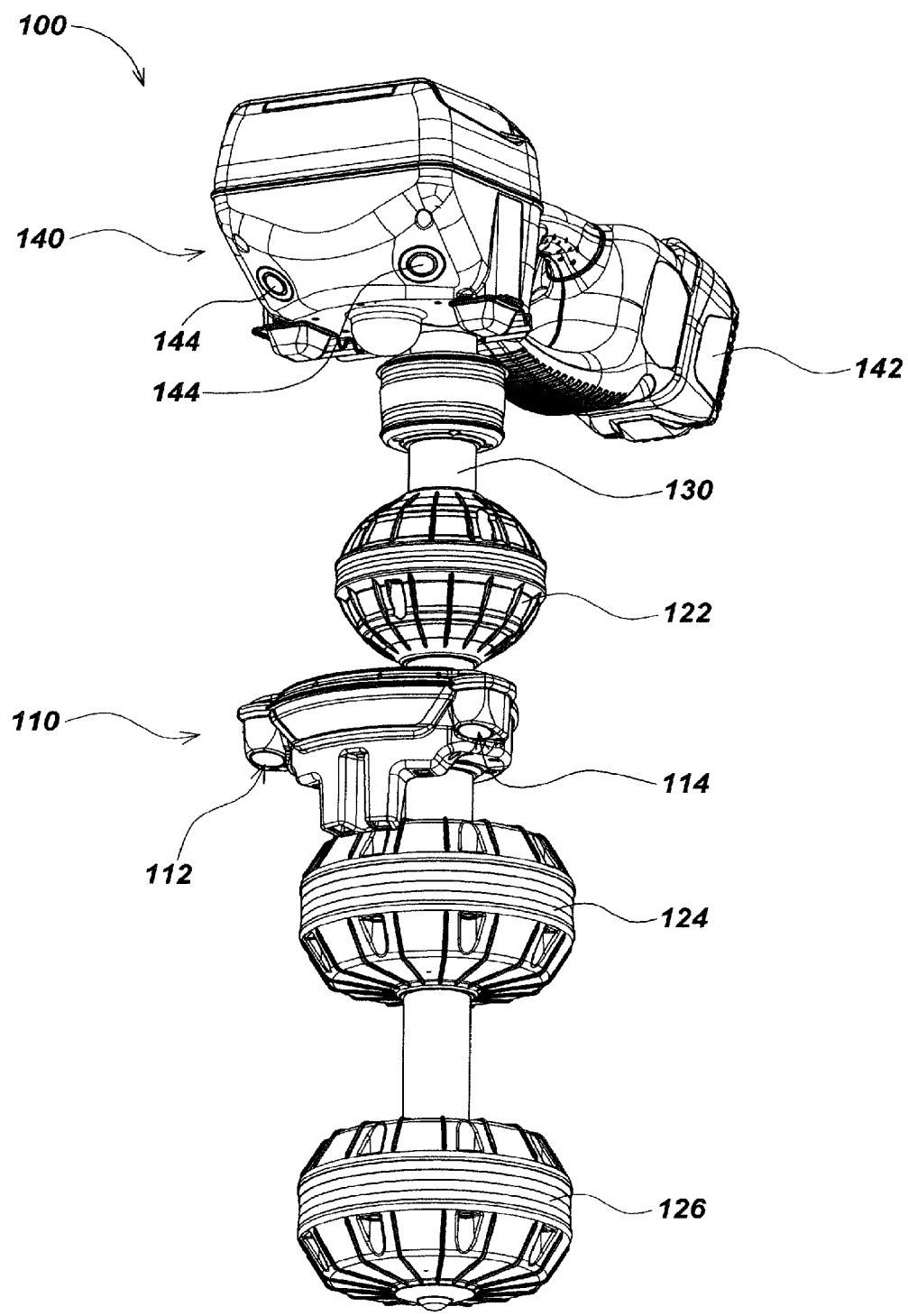
FIG. 1B is an isometric view of details of the buried utility locator and ground tracking apparatus embodiment of FIG. 1A.

Referring to FIGS. 1A and 1B, an embodiment 100 of a utility or line locator device (also denoted herein as a "locator" for brevity) with an attached embodiment 110 of a ground tracking apparatus (also denoted here as a "ground tracking device" or "ground tracker" for brevity), in accordance with certain aspects, is illustrated. The locator 100 may be any of various embodiments of locating devices for locating buried or hidden objects, such as the magnetic field locators described in the co-assigned incorporated applications or other similar or equivalent line or buried utility locators. Magnetic field locators (sometimes also referred to as "electromagnetic locators," "magnetic locators" or similar terms) are locators that include one or more magnetic field antennas, which may each be single antennas or antenna arrays, for sensing magnetic fields emitted from hidden or buried utilities (or other conductors with AC current flow therein). In the locator embodiment 100 of FIG. 1, three magnetic field antenna arrays 122, 124, and 126 are shown disposed on an elongated downward-extending antenna mast 130 of the locator; however, other locator embodiments may include fewer or more antennas or antenna arrays with alternate magnetic field antenna configurations. In an exemplary locator embodiment, the antenna arrays comprise two or more omnidirectional antenna arrays with three or more concentric circular coils oriented to sense magnetic fields at a compact point in space in three orthogonal dimensions. Examples of such omnidirectional antenna arrays are described in several of the incorporated applications.

In an exemplary locator device, a ground tracker is coupled to a locator, such as those locators described in the incorporated applications or others known or developed in the art, to provide enhanced ground tracking functionality. Embodiments of various ground tracking apparatus in accordance with the present invention may include two or more spaced-apart cameras/imaging elements, with outputs from the imaging elements operatively coupled to one or more processing elements. The camera outputs are used for sending captured images or video frames from the cameras to the processing elements, where they may be processed as described subsequently herein to detect ground features using correlations and determine, based on the position of one or more ground features within images, a height of the ground tracker above the detected feature or features.

Sets or subsets of pixels of multiple images or video frames that include the identified ground features may then be processed to determine tracking parameters such as relative height changes or position changes as the ground tracker is moved across the ground surface, distance moved between separate images or frames captured from the same camera at different times or from both cameras captured at different times. From this data and a time measurement, such as the time between image or frame captures, successive positions, motion vectors, speed of travel between positions, as well as other parameters as described herein may be determined. The tracking parameters may then be stored in a non-transitory memory in the locator or ground tracker, either by themselves, or in association with data generated by the locator (e.g., buried object depth, position on the ground surface, current flow and direction, absolute coordinates, and the like) or other coupled device.

In an exemplary embodiment a processing element receives an image from a first (e.g., right) imaging sensor or camera element and an image from a second (e.g. left) imaging sensor or camera element of a ground tracker, with the pair of first images both captured with the locator at a first position. One or more ground features may be detected by, for example, correlation within the pair of first images, such as described subsequently herein, and then the relative position of the first images within the frames, along with the known geometry of the ground tracker, may be used to determine a height measurement (e.g., a Z-axis coordinate, representing a vertical axis normal to the ground) of the ground tracker above the ground feature.

In typical embodiments, the first images are captured at substantially the same time, such as, for example, based on a common clock or trigger signal. However, the image from the first camera and the image from the second camera may be captured at different points in time to make the height measurement if the ground tracker is at substantially the same position. If the locator moves from an initial position in time-separated captures, the geometry change will affect the overall accuracy of the height determination which may decrease, typically as a function of the amount of movement. Therefore, it is typically desirable to capture images from both cameras at substantially the same time so as to minimize movement of the locator across time-separated images to maximize the accuracy of the height measurement; however, this is not absolutely necessary if the ground tracker has not moved significantly in position. In some embodiments multiple ground features may be detected and multiple height determinations of the height of the ground tracker above each ground feature may be determined. This may be done, for example, to improve an overall height measurement or to correct for errors or distortions in the ground tracker system.

If the locator is then moved to a second position different from the first position, the relative positional change (e.g., in X and Y axis coordinates of a plane tangent to the ground surface) of the ground tracker from the first position may be determined by detecting the ground feature or features determined in the images from the first and second cameras and using a relative offset of the position of the ground feature within another image captured as the second position one of the first and second cameras or, in some embodiments by detecting the ground feature in images captured by both the first and second cameras as the second position. It is noted that the ground tracker may be at the second position at a time either before the first position height measurement is made or after the first position height is made (i.e., the ground tracker need not be at the second position temporally after the first position, the processing described herein may be done in either direction in time). Backward time processing may be done by, for example, storing multiple captured images or frames and associated data, such as time or frame number, in a buffer and determining the tracking parameters by processing the buffered images or video frames. This sequence may be repeated indefinitely as the ground tracker is moved across a surface so as to provide data representing a track of the ground tracker (and associated device, such as a utility locator) across the ground surface. If additional data is provided to the ground tracker from an absolute positioning device such as a GPS receiver, both relative and absolute tracking data may be determined and stored in memory. Likewise, if an initial reference position is known or provide, subsequent relative position changes may be combined with the initial position to generate absolute positioning data throughout movement of the ground tracker.

In some embodiments height may only be determined after multiple X, Y positional determinations are made (assuming the height remains constant or using an average height as the height over a time interval between height measurements in some embodiments). This may be done to improve processor efficiency and/or to save on power consumption or for other reasons. For example, an image capture sequence may include capturing a pair of images from both the first and second image sensors at time T1 and determining a height based on detected ground feature(s), capturing a single image from one or the other of the image sensors at time T2 (and optionally at successive time intervals) to determine positional changes relative to the ground surface (e.g., in X and Y coordinates) based on the ground feature or features detected in a single image or video frame from one or other of the cameras, and then capturing a pair of images again at a later time and determining another height (e.g., in Z coordinates) at this time based on a ground feature detected in both of the images of the pair. If these multiple images or video frames and associated data are stored in memory, tracking parameters may then be determined later either in a forward or backward direction.

As noted above, a second height determination may be made at the second position in the same fashion as in the first position by capturing images from both cameras, detecting the ground feature in both images, and determining the height of the ground tracker above the ground based on relative position differences of the ground feature between the pair of images captured at the second position. Overall accuracy may be improver in this approach by using the second height measurement to determine the relative positional information (assuming the height has changed). However, if the frame rate of the camera is relatively slow and/or the ground tracker is moved slowly over the ground, separate height measurements (Z axis) need not be made at every point in time when relative positional (X and Y) measurements are made to maintain accuracy.

As used herein, an imaging sensor or imager refers to an electronic device or system for capturing images or video frames and storing and/or outputting the images or video as digital data signals representing pixels of the images or video frames. A camera refers to an imaging sensor and associated optics and mechanical elements for providing a focused image on the imaging sensor to generate the images or video frames. Cameras and imagers typically include additional elements such as control and/or signal processing circuits, housings, digital storage memory, filters, output circuits and interfaces, and the like.

Although exemplary embodiments of ground trackers are shown and described herein in use with a utility locator, other ground tracker embodiments in accordance with the present invention may be used in various other applications either alone or in combination with other devices, systems, or equipment where ground tracking may be desirable. In these other applications, alternate components and/or configurations may replace the antennas and associated elements used in locators while still providing the ground or surface tracking functionality as described herein.

Returning to FIG. 1A, in an exemplary embodiment, a control/user interface module 140 (also denoted herein as a "UI module" for brevity) may be positioned atop a mast 130 of the locator 100. The UI module 140 may include one or more electronics circuits or modules including analog or digital circuitry for receiving and processing magnetic field antenna signals and related functions, one or more processing elements or modules including processors, memory, analog to digital (A/D) converters, analog or digital circuits, and related electronic components, one or more displays, such as an LCD display or other display elements, one or more user interface elements such as switches, actuators, knobs, mice, joysticks, audio input or output devices, and/or other user interface elements.

In an exemplary embodiment, UI module 140 receives signals from magnetic field antenna elements and determines, in one or more electronics circuits and processing elements, information associated with buried objects such as, for example, location relative to the ground or other surface, directional orientation, buried object depth, current magnitude, phase, frequency/frequencies, direction of current flow within the buried object, and the like (denoted herein as "locator parameters"). For example, the locator antennas may receive or sense magnetic field signals emitted from a buried pipe (e.g., from a current flowing in the pipe induced by an ambient electromagnetic field such as that from overhead power lines, radio stations, etc., or from a current coupled to the pipe from a utility locator transmitter or other current induction device) and determines the locator parameters from these magnetic field signals as well as, optionally, signals from other devices or sensors. The magnetic field signals are typically sensed at multiple separated points in space, and in multiple spatial dimensions at each point in space. Further details are described in various locator embodiments detailed in the incorporated applications including examples of various apparatus and methods for receiving, processing, storing, and displaying magnetic field signals in locators. As further described below, output data from a ground tracker, such as tracking parameters as described herein, may be provided to a module such as UI module 140 to facilitate storage of the tracking parameters and/of association of the tracking parameters with other locator data. The aggregate data may be stored in a memory of the locator and/or communicated via a wired or wireless connection to other devices or systems.

In an exemplary locator embodiment, multiple omnidirectional antenna arrays may receive magnetic field signals and provide antenna output signals corresponding to the received magnetic field signals in multiple dimensions (typically orthogonal dimensions, e.g., along three orthogonal axes relative to the position and operating angle of the locator) to front end receiver/electronics circuits and processing elements. Examples of such antennas and front end processing circuits are disclosed in the incorporated applications. The magnetic field signals are then provided to a processing element or elements in the locator (e.g., as described in, for example, the incorporated applications) to generate estimates of locator parameters such as the depth of the utility, the position of the utility with respect to the ground surface (with respect to the position of the locator above the ground), the directional orientation of the utility, and the like. This data may then be stored, rendered on a visual display (e.g., LCD panel) or audible display (e.g., buzzer or speaker) of the locator, stored in a non-transitory memory in the locator, and/or communicated, either via wired or wireless connection, to another electronic device or system.

In accordance with the various ground tracking aspects disclosed herein, to advantageously improve the performance of a locator (or other device in which ground or surface tracking may be useful), an integral or attached ground tracking apparatus embodiment may be used in conjunction with the locator (or other devices) to determine tracking parameters by repeatedly capturing images from spaced apart cameras/imaging sensors and processing the captured images using correlation processing and other processing as described herein to detect ground features, determine the height of the locator above the ground feature, determine relative position data and positional changes as the locator is moved, in conjunction with time data, generate motion vectors, speed or velocity, and other tracking parameters as described herein.

The UI module 140 and/or other modules or processing elements in locator 100 (or a separate ground tracker in some embodiments) may include an intelligent battery 142, along with associated docking and interface circuitry, such as described in, for example, co-assigned U.S. patent application Ser. No. 13/532,721, entitled MODULAR BATTERY PACK APPARATUS, SYSTEMS, AND METHODS, filed Jun. 25, 2012, the content of which is incorporated by reference herein. The UI module 140 and/or other modules or processing elements in the locator (or a separate ground tracker in some embodiments) may also include intelligent battery functionality and viral data and/or code transfer functionality such as is described in the '721 application and in co-assigned U.S. Patent Application Ser. No. 61/663,617, entitled MODULAR BATTERY PACK APPARATUS, SYSTEMS, AND METHODS INCLUDING VIRAL DATA AND/OR CODE TRANSFER, the content of which is also incorporated by reference herein.

The UI module 140 of locator 100 may further include one or more locator-mounted cameras, such as the cameras 144 as shown in FIG. 1A and FIG. 1B. The cameras 144 may capture images or video data/signals to document the locate area such, as for example, by capturing images or video of the ground or other surfaces during a locate operation and/or by capturing images or video of the area surrounding the locate operation by imaging in a horizontal directional or upward direction relative to where the locator is being moved. Examples of such cameras and methods of use are described, for example, various of the incorporate applications including U.S. patent application Ser. No. 13/766,670, entitled OPTICAL GROUND TRACKING LOCATOR DEVICES AND METHODS, filed Feb. 13, 2013, the content of which is incorporated by reference herein.

In some embodiments of a ground tracker, a processing element or elements for implementing the ground tracking processes and methods as described herein may be disposed on or within the ground tracker itself. The processing element(s) may include one or more processing devices, field programmable gate array (FPGA) modules and/or other processing device(s), and associated electronics. The FPGA module(s) and/or other processing devices(s) and electronics may include one or more non-transitive memory storage element(s) (also denoted herein as "memory" for brevity) for storing images or frames of video from each camera/imaging element or buffers for storing multiple images or video frames. The memory may include random access memory such as one or more DDR3 modules or other memory or digital storage devices. In such embodiments, the processing of data may be implemented in corresponding elements/modules of the ground tracking apparatus, and data representing tracking parameters determined from ground feature correlations may be stored as data in the memory. This data and/or associated imagery from each camera may be communicated to the utility locator device and/or other device or system via wired or wireless data connections.

In other embodiments, the processing element(s) and associated memory elements and other circuitry may be housed partially or fully within the utility locator device (or other device with which the ground tracker is used), such as in UI module 140, and/or within similar or equivalent modules in the other devices or systems. In such embodiments, signal processing may be implemented fully within the locator or other device or system, or, in some embodiments, processing of data may be shared between the ground tracker and locator or other device or system.

Referring to FIG. 1A, in use, a locator with an attached or integrated ground tracker may be used to simultaneously detect buried utility lines and/or other conductors as well as track position and motion of the combined locator/ground tracker system (also denoted herein as a "tracking locator" for brevity) as the locator is moved over the ground or other surface. The locate data, such as buried utility position (relative to the ground surface), depth, current flow, phase, etc., may then be associated with the tracking data (tracking parameters such as relative position, distance changes, angular data, velocity or speed, motion vectors, height, and the like) and stored in a memory in one or more of the locator, the ground tracker, or other associated devices or systems. The tracking data may be combined or associated with other motion or position data provided from other devices, such as data collected from a GPS receiver, inertial positing device such as a gyroscopic sensor, accelerometer, compass sensors, etc. or other location or positioning device or system. These additional devices may be used to improve the overall tracking accuracy of the tracking locator and/or to provide an independent position check and/or to convert relative positional data to absolute positional data (e.g., in lat./lon. or other absolute coordinates).

In an example operation, tracking locator embodiment 100 may be held in the hand of a user/operator 150. The user 150 may walk about ground surface 160 while holding the locator in a vertical orientation to detect utilities buried under the ground (known as a "locate operation" or "locate" for brevity). When the user is in a first position a first camera element, such as right imager element 112 (and associated electronics and optics), and a second camera element, such as left imager element 114 (and associated electronics and optics) may each generate images or video frames, which may be captured in pairs (or, if more than two cameras or other imaging devices are used in certain embodiments, in corresponding sets of three or more images/frames). The pairs are typically captured at substantially the same time at a single position of the ground tracker; however, in some embodiments the images from the first and second camera elements may be captured at separate times but at the same or substantially the same position.

These images or video frames may then be provided as output signals from the cameras to one or more processing elements where they may then be processed, such as described subsequently herein, using correlation to detect or identify one or more ground features in images (from the corresponding cameras) of the ground surface over which the tracking locator is moved. The ground features may be identified from correlation of pixels in the images that correspond to features on the ground or other surface that the ground tracker is being moved over. For example, ground features correlated in pairs of images where a surface is relatively uniform may correspond with an area of the surface having a distinct shape, shading, texture, surface feature, projected light (e.g., a dot or shape from a laser or other device), or other characteristic that is in a subset of pixels of the images or video frames from both the first and second cameras.

Ground features may, for example, be surface objects such as rocks, stones, or debris on the ground, metallic or plastic objects, plants or ground cover such as grass, ice plant, or other ground cover or plant debris such as wood, bark, sticks, and the like, and/or other objects. A ground feature may also be differences in soil or other ground surface colors or luminance, ground surface patterns, or other distinct shapes, colors, textures, and the like that can be detected across two or more frames using image/video frame pixel correlation.

One or more ground features determined from a set of two or more images taken at the same position and at the same time may then be used to determine a height or heights of the ground tracker above the detected ground feature or features by processing the pair of images to determine relative position differences in the detected ground feature or features between the two images (based on known ground tracker geometry).

Images captured from one or both of the first and second camera elements taken at a different position may then be processed as described herein to determine a position change of the ground tracker relative to the first position. If a single image is captured at the different position, the height determined at the first position may be used in calculating the positional changes based on comparison of changes of position of the detected ground feature between images captured from the same camera. However, if both cameras are used at the different position, an additional height measurement may be made at this position, which may be combined with the first height measurement to generate an average and/or may be used as a new height for determining the positional changes at the other position. As noted previously, the positions need not be sequential in time—processing may be done using images or image pairs acquired earlier in time against later images or image pairs or vice-versa.

When combined with other position/location devices such as GPS receivers or inertial navigation devices, or when a starting reference position is known or determined, absolute position or motion information may also be determined by combining relative position and motion information from the ground tracker with absolute positional information.

In an exemplary embodiment, a block-matching method and process, such as, for example, a Sum of Absolute Differences, Mean Squared Error, Sum of Squared Errors, or other signal processing methods known or developed in the art may be used to detect one or more ground features at a first point in time in the images from the pair of offset camera elements 112 and 114 using correlation. Images or video frames captured other points in time (and at different positions) may then be used to determine changes in position as well as motion vectors between positions and other tracking parameters.

For example, processing of the relative position of pixels in images representing detected ground features on images from first and second cameras (and, in some embodiments, additional cameras that may be used to further improve accuracy) taken at the substantially the same point in time and at substantially the same position may be used to determine the height of a ground tracker above the detected ground feature and corresponding ground surface, as well as various other positional parameters as described herein.

If the position of the ground tracker on a locator or other device used with the ground tracker is used are also known, then a measurement of the absolute distance of the locator or a part thereof (e.g., the antenna arrays from which buried utility position and depth are determined) to an underground utility may be readily determined by arithmetic or geometrical calculations.

In addition, to determine positional data, processing of images and corresponding pixels representing detected ground features taken over time intervals may be used to calculate position changes based on changes in the relative position of the pixels representing the ground features. Combined with time data, motion vectors (assuming the ground tracker and associated locator or other device has moved from a first position to a subsequent position) may be determined, and these may be used to precisely determine translational movements and rotations of the ground tracker and associated locator or other device.

Detection of a ground feature using a correlation may be based on a predetermined quantity/block of pixels that are correlated between two or more images or video frames. The correlations may initially be made from one or more predetermined locations/subsets within the images/frames. In other embodiments, feature detection methods, such as edge detection methods, where sample locations need not be predetermined, may be used.

Figure 2A:
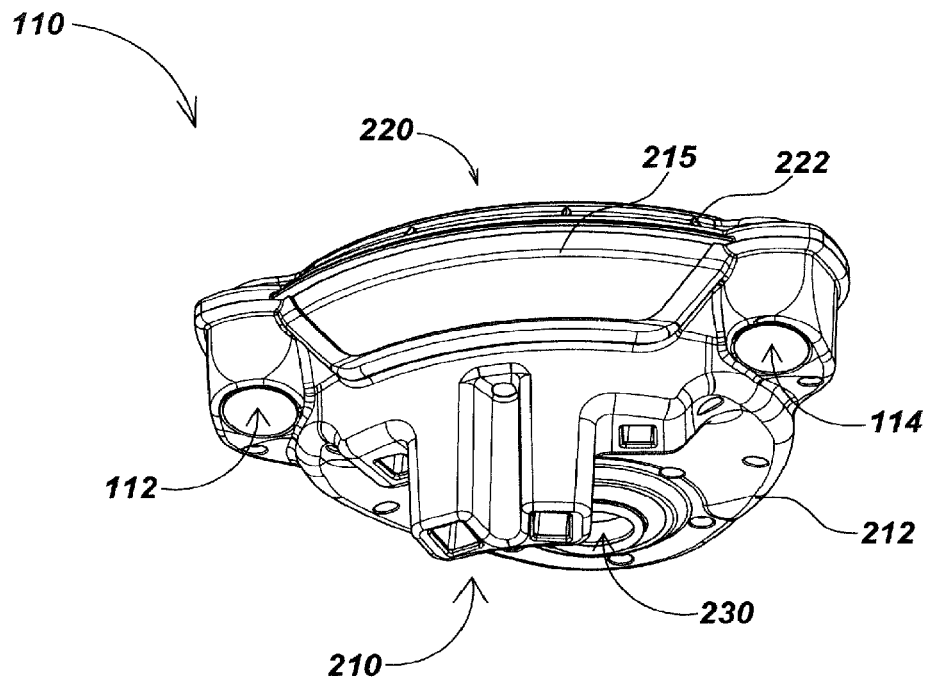
FIG. 2A is an isometric view of details of the ground tracking apparatus embodiment of FIG. 1A.
Figure 2B:
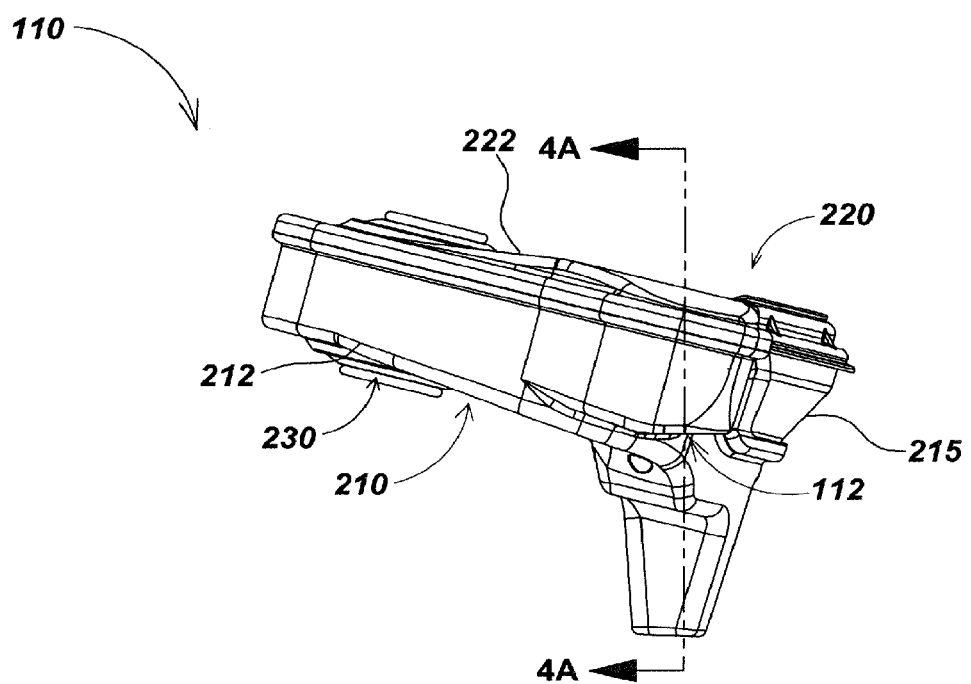
FIG. 2B is a side view of details of the ground tracking apparatus embodiment of FIG. 1A.
Figure 2C:
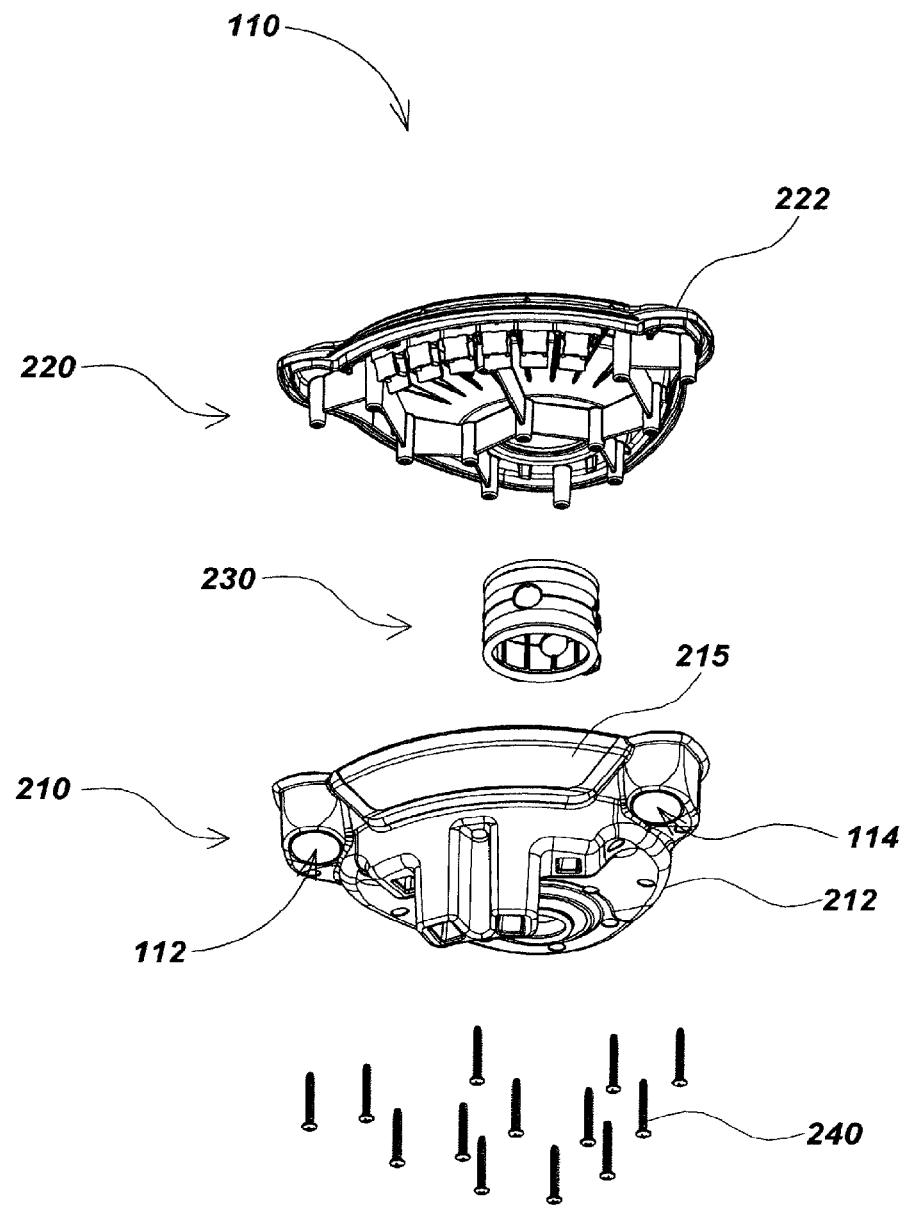
FIG. 2C is an exploded view of details of the ground tracking apparatus embodiment of FIG. 1A.
Figure 6:
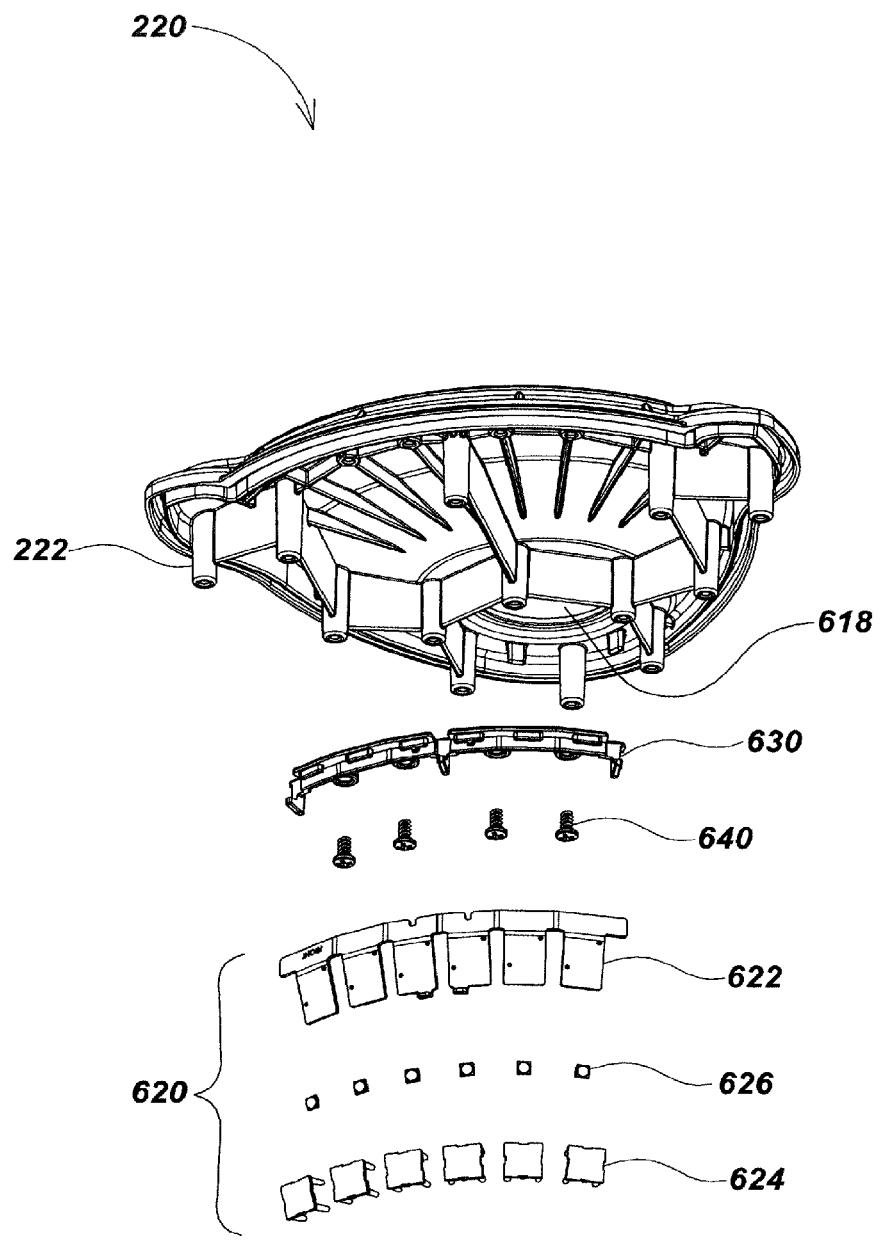
FIG. 6 is an exploded view of details of the top assembly embodiment of FIG. 2C.

Turning to FIGS. 2A-2C, additional details of exemplary ground tracker embodiment 110 are illustrated. Ground tracker 110 may include a lower assembly 210, an upper assembly 220, and a mast coupling assembly 230. The lower assembly 210 may externally be comprised of a lower shell half 212 which may contain a series of components comprising the right (or first) camera element 112 and left (or second) camera element 114 as well as a translucent or transparent lighting element window 215 through which light from a lighting device may be output to provide controlled illumination of a ground area being tracked and/or to provide ground feature dots or shapes using lasers or focusing elements. In assembly, a lighting element sub-assembly 620 (as shown in FIG. 6) may be contained within the upper assembly 220 and positioned behind the lighting element window 215 for illuminating the operating surface 160. In alternate embodiments one or more lighting elements, such as LEDs or other light output devices, may be positioned at various places or a ground tracker or associated locator or other device or system. The upper assembly 220 may externally include an upper shell half 222 that, in assembly, may mate with the lower shell half 212 to protect internal ground tracker components from external hazards such as dirt, water, and the like.

The ground tracker may include an attachment mechanism to couple it to a utility locator or other device. For example, mast coupling assembly 230 may be included to couple the ground tracker to the mast 130 of locator 100 (or to another device or system (not shown)). Other attachment mechanisms, such as brackets, hinges, screw or bolt assemblies, and the like may be used to attach the ground tracker to an associated device. As illustrated in FIG. 2C, screws 240 may be used to secure the upper assembly 220 and lower assembly 210 together, with the mast coupling assembly 230 seated in between to allow the ground tracker to be readily attached to a locator such as locator 100.

Figure 3:
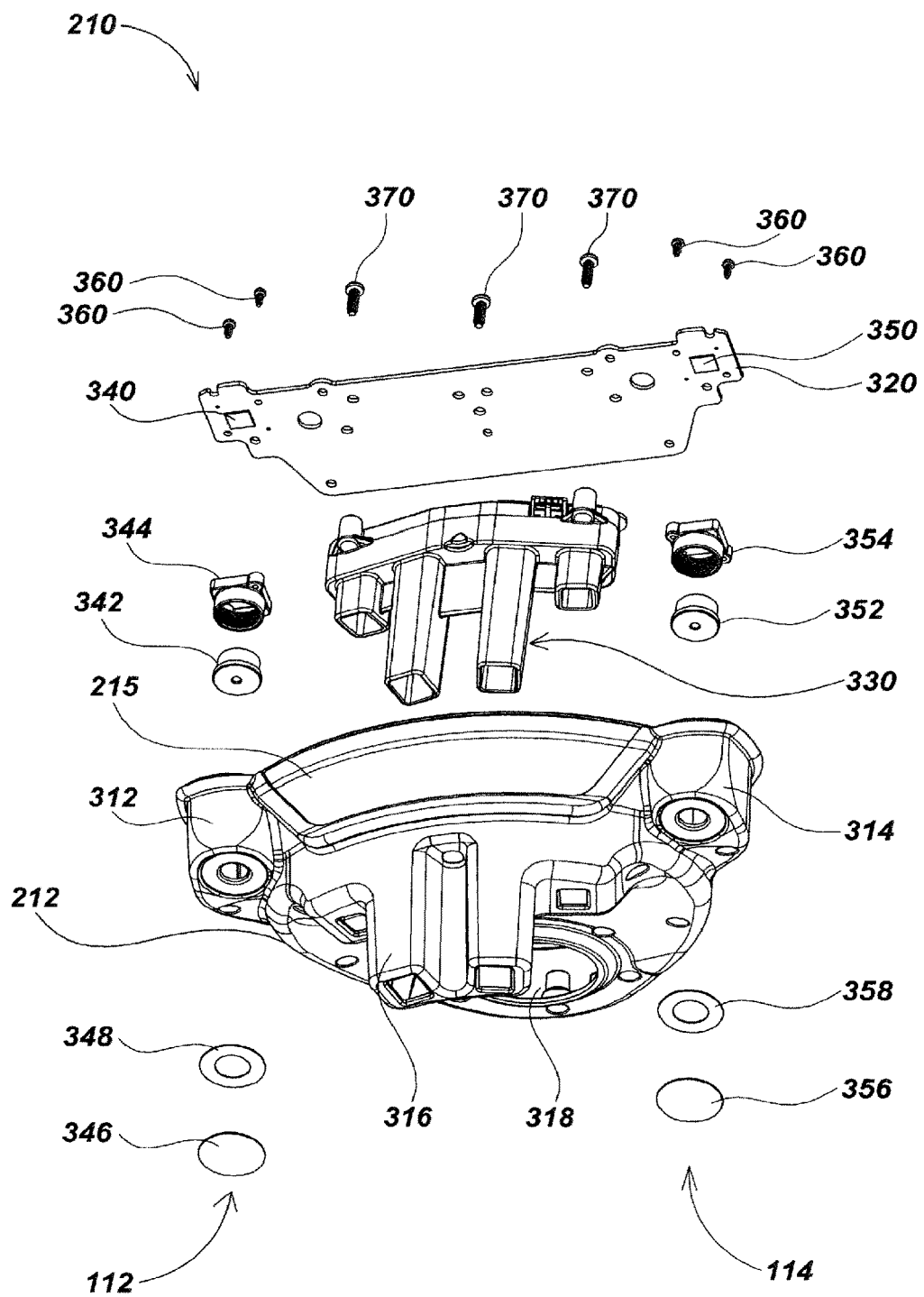
FIG. 3 is an exploded view of the lower assembly of the ground tracking apparatus embodiment of FIG. 2C.

Turning to FIG. 3, in an exemplary embodiment, the lower shell half 212 of the lower assembly 210 may be formed to contain a printed circuit board (PCB) 320 on which electronic circuits and associated processing elements for processing images and video frames as disclosed herein may be disposed. The lower shell half 212 may further include various components of the right camera 112 and left camera 114, and an infrared (IR) distance sensor assembly 330 (for measuring, via infrared radiation, a distance from a reference point on the ground tracker to the ground or other surface in certain embodiments). In typical embodiments, height of the ground tracker above the surface may be determined solely by the processing of images from the first and second cameras as described herein; however, in some embodiments, an IR or other distance measurement sensor may be used in place of or in addition to the height measurements based on image processing described herein.

The right camera element 112 may include a right imaging sensor 340 for generating images or video frames, about which a right lens 342 may secure via a right lens mount 344. The right lens 342 may mate with the right lens mount 344 via threads or other attachment mechanisms. The right lens mount 344 may secure to the PCB 320 through a series of screws 360 or other attachment mechanisms. In assembly, the right lens 342, right lens mount 344, and right imaging sensor 340 secured to the PCB 320 may seat within a right lens retainer feature 312 formed on the lower shell half 212. The right lens retainer feature 312 may be formed with a central opening allowing light to pass through to the right imaging sensor 340 via right lens 342. The right lens retainer element 312 may further seat a right sapphire window 346 which may secure to the central opening of the right lens retainer feature 312 with an adhesive piece 348 or other attachment mechanism.

Similarly, the left camera element 114 may include a left imaging sensor 350 for generating images or video frames, about which a left lens 352 may secure via a left lens mount 354. The left lens 352 may mate with the left lens mount 354 via threads or other attachment mechanism. The left lens mount 354 may secure to the PCB 320 through a series of the screws 360 or other attachment mechanisms. In assembly, the left lens 352, left lens mount 354, and left imaging sensor 350 secured to the PCB 320 may seat within a left lens retainer feature 314 formed on the lower shell half 212. The left lens retainer feature 314 may be formed with a central opening allowing light to pass through to the left imaging 350 via left lens 352. The left imaging element 114 may further seat a left sapphire window 356 which may secure to the central opening of the left lens retainer feature 314 with a left window adhesive piece 358 or other attachment mechanism.

The imaging sensors 340 and 350 of the right camera 112 and left camera 114 may be, for example, an OmniVision OV7962, OV10626, or OV10640 which are currently commercially available from OmniVision Technologies. Other camera elements or imaging sensors as are known or developed in the art may also be used in alternate embodiments. The lens 342 and 352 of the right camera 112 and left camera 114 may be a Sunex DSL853C commercially available from Sunex Inc, or other imaging optics as are known or developed in the art.

Figure 4B:
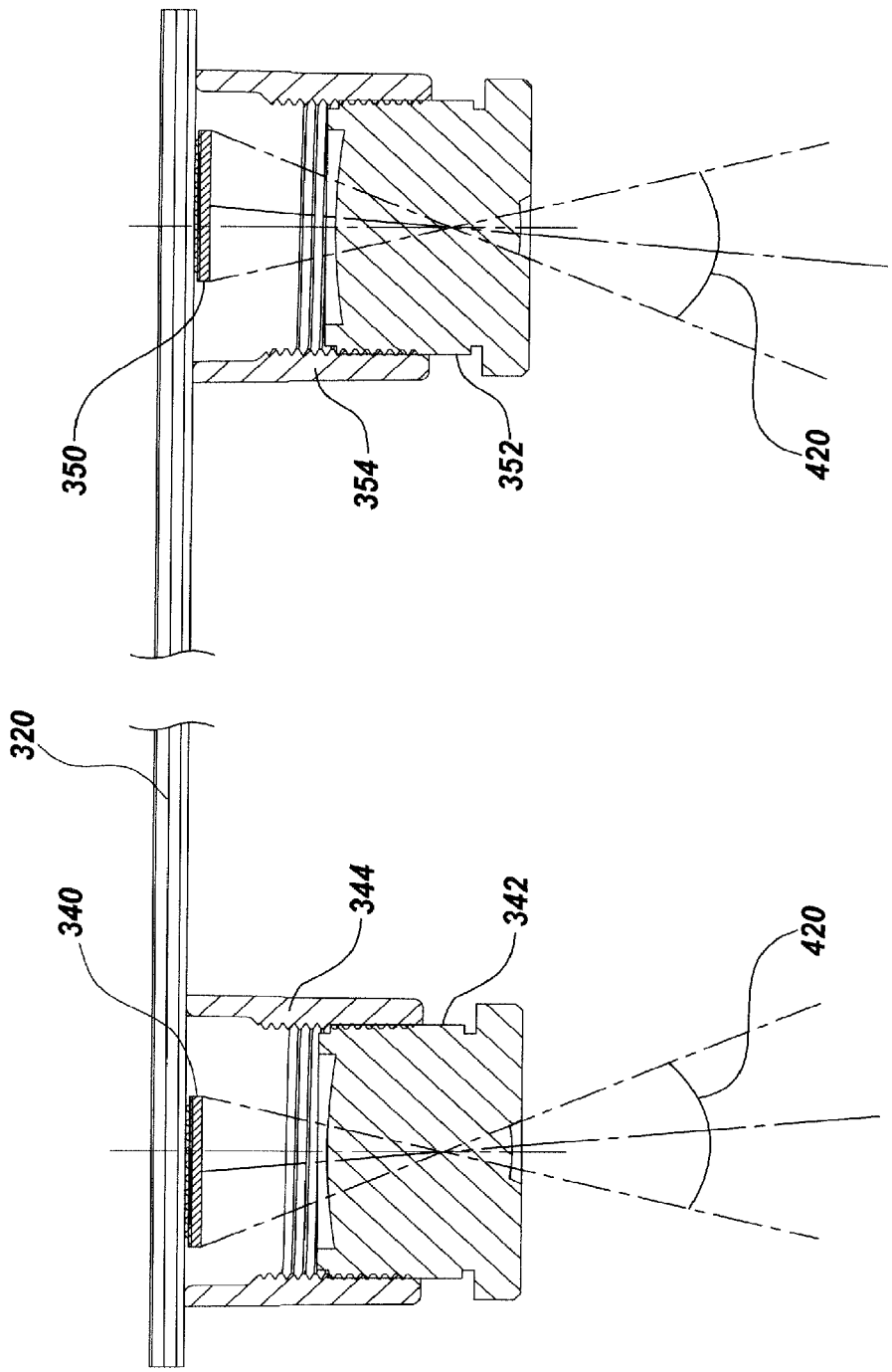
FIG. 4B is an illustration of offset lenses of imaging elements sharing a coplanar PCB from the ground tracking apparatus embodiment of FIG. 2B.

As illustrated in FIGS. 4A and 4B, in some embodiments the imaging sensors 340 and 350 of the right camera 112 and left camera 114 may be offset from their respective lenses 342 and 352. By being offset as such, the right field of vision 410 of the right camera 112 (and corresponding optical axis) and the left field of vision 420 of the left camera 114 (and corresponding optical axis) may each be set to angle inwards towards one another. This may be done while allowing the imaging sensors 340 and 350 to remain secured to a single planar PCB 320 or, in some embodiments, the entire camera assemblies may be angled inward and on separate PCBs or other substrates. In such an embodiment, the lenses, such as the lenses 342 and 352, may be selected to have larger rear image circles than required to cover the imaging area of the imaging sensors. For example, the lenses 342 and 352 may be half inch lenses whereas the imaging sensors 340 and 350 may be one-third inch format imagers. By offsetting the imaging sensors 340 and 350 from their respective lenses 342 and 352 with a larger rear image circle, overlap (not illustrated in FIG. 4A or 4B) of the fields of view 410 and 420 from the imager sensors 342 and 352 may occur as described subsequently herein without causing vignetting in the images of each imaging sensor 342 and 352.

Offsetting of imaging sensors, such as with imager sensors 340 and 350, may be used to allow the sensors to remain coplanar on a single PCB, such as PCB 320, while allowing a maximum, optimal, and/or otherwise controlled overlap in field of view between imaging elements in ground tracking apparatuses with a known and/or consistent operating height and/or height range. Maximizing or optimizing the overlap of the field of view may be advantageous in providing a large imaging area over which ground features can be detected and ground tracker movement determined.

For example, a ground tracking apparatus coupled to a locator, such as the ground tracker 110 on locator 100 of FIGS. 1A and 1B, may have a nominal range of heights over which it is used (e.g., most users will have a vertical up/down range limited by their height and arm length). As such, offset positioning of imaging sensors may be used to allow the amount of overlap of field of view between adjacent imaging elements to be controlled and optimized for the height range at which the locator is normally used. In some embodiments, imaging elements may be positioned to maximize overlap of field of view between adjacent imaging elements at the ground tracking apparatus's nominal operating height. Furthermore, using coplanar construction of imaging elements onto a single printed circuit board, such as with the camera elements 112 and 114 onto PCB 320, may be done to provide a cost effective and robust approach for manufacturing a ground tracking apparatus embodiment.

Figure 5:
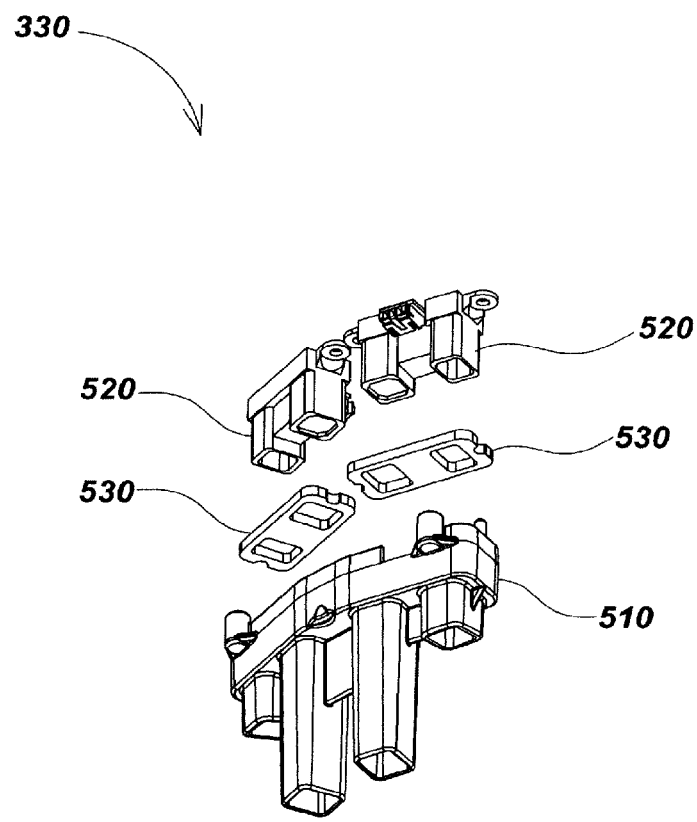
FIG. 5 is an exploded view of details of the infrared distance sensor assembly embodiment of FIG. 3.

Turning to FIG. 5, the IR distance sensor assembly 330 may be comprised of an IR distance sensor mount 510 which, in assembly, may seat a pair of IR distance sensors 520, corresponding to each camera element (in embodiments using more than two camera elements additional IR sensors may also be used. Conversely, in some embodiments a single IR sensor may be used and may be positioned, for example, between the camera elements). The IR distance sensors 520 may be IR sensor devices such as, for example, a GP2Y0A02YK0F sensor unit available from SHARP Corporation of Abeno-Ku, Osaka, Japan, or other distance measuring devices. A foam cushion piece 530 may be positioned beneath each IR distance sensor 520 between the IR distance sensor 520 and the IR distance sensor mounting piece 510. A series of openings through both the foam cushion piece 530, the IR distance sensor mounting piece 510, and an IR distance sensor retaining feature 316 (as shown in FIG. 3) formed on the lower shell half 212 may be used to allow the passage of infrared light, thus further aiding the IR distance sensors 520 within to function with minimal obstruction. The IR distance sensors 520 and associated methods of use may be distance sensors and methods for use thereof as described in co-assigned U.S. patent application Ser. No. 13/766,670, entitled OPTICAL GROUND TRACKING LOCATOR DEVICES AND METHODS, filed Feb. 13, 2013, the content of which is incorporated by reference herein. As noted previously herein, in a exemplary embodiment such an IR or other distance sensor need not be used if height determinations are made with just the ground feature image processing described herein. However, in some embodiments an optical sensor may be used in addition to or in place of ground feature height determination.

Returning to FIG. 3, each IR distance sensor 520 (as shown in FIG. 5) may be operatively coupled to PCB 320 to provide output signal connectivity. A series of screws 370 may secure the IR distance sensor assembly 330 to PCB 320. In assembly, the PCB 320 with attached IR distance sensor assembly 330, imaging sensors 340 and 350 (operatively coupled thereto), lenses 342 and 352, and lens mounts 344 and 354 of the right camera element 112 and left camera element 114 may be positioned near the bottom of the ground tracker, such as by seating the lower shell half 212. When assembled, the IR distance sensor assembly 330 may seat within the IR distance sensor retaining feature 316 formed on the lower shell half 212. The lower shell half 212 may further be formed with a mast hole feature 318 dimensioned to allow a mast, such as the mast 130 of the utility locator device 100 illustrated in FIGS. 1A and 1B, to pass through. The mast hole feature 318 may further be dimensioned to allow the mast coupling assembly 230 (as shown in FIG. 2C) to seat within the lower shell half 212 above the mast hole feature 318.

As noted previously, reference distances between the cameras of the ground tracker and elements of the attached locator, such as the antenna arrays, may be used to calculate absolute distances of the locator from the ground surface and from buried objects (e.g., the distance and angle to the buried object is measured from a reference point on the antenna array(s) of the locator). If the distance from the arrays to the ground tracker is known and the distance from the ground tracker to the ground surface is known, the absolute distance of the buried object below the ground surface can be determined using arithmetic (and/or geometry by taking into account angles when the locator is not oriented completely vertically or when the buried object is offset from the locator on the ground's surface).

Still referring to FIG. 3, the right camera element 112, left camera element 114, and the IR distance sensor assembly 330 may be operatively coupled to the PCB 320 and may communicate data/signal between electronic components coupled directly to the PCB 320 and/or within a utility locator device such as the utility locator device 100 of FIGS. 1A and 1B and/or to or from other devices or systems. One or more processing elements and associated electronics and circuitry may be included on the PCB 320 and/or elsewhere in the ground tracker 110 and configured, among other functionality, to receive and process images and/or video frames from the cameras 112 and 114 using correlation to detect ground features and associated signal processing as described herein to determine height and other tracking parameters. The processing element(s), may also be used to process magnetic field signals from the utility locator device, sensor data or information from other sensors such as accelerometers, compass sensors, satellite navigation system receivers, distance sensors, and/or other sensor devices, and perform other processing functions as described herein or in the incorporated applications.

In an exemplary embodiment, the processing element and associated electronics and circuitry may, among other electronic circuitry, include a field-programmable gate array (FPGA) control system programmed to perform correlations to detect ground features and determine tracking parameters based on the detected ground features and relative positions of pixels representing the ground features in different images.

Processing of signals may further, in addition to, or in place of, be implemented in one or more separate processing elements located within a utility locator device such as the utility locator device 100 of FIGS. 1A and 1B and/or other devices or systems. The processing element, such as the FPGA and associated electronics, may include one or more non-transitory memory elements. Such a memory element, which may, for example, be a DDR3 or other memory device, may further store image or frame pixels from each camera over multiple successive frames or time intervals. Storage of such data may, for example, be used to determine a history of movements and/or lack of movements of a ground tracking apparatus (e.g., when the positions of ground features of successive correlation sets do not change over time) or when tracking in forward or reverse temporal directions is desired.

The lower shell half 212 may further be formed with a mast hole feature 318 dimensioned to allow a mast, such as the mast 130 of the utility locator device 100 illustrated in FIGS. 1A and 1B, to pass through. The mast hole feature 318 may further be dimensioned to allow the mast coupling assembly 230 (FIG. 2C) to seat within the lower shell half 212 above the mast hole feature 318.

Turning to FIG. 6, the upper assembly 220 may include a lighting element subassembly 620 directed to illuminate a surface being tracked via one or more lighting elements. The subassembly 620 may be held in place by a light element retainer 630, which may further secure to the upper shell half 222 via screws 640 or other attachment mechanisms. The lighting element subassembly 620 may further be comprised of a PCB 622 onto which a series of optics 624 each housing an LED 626 (or other light emitting device) within. The light element retainer 630 may be formed to slightly arch outwards so as to hold the PCB 622 with attached LEDs 626 and optics 624 bent in the same arching form. In use, the lighting element subassembly 620 may illuminate the ground area/surface over which the locator or other device is operating. The arch formed in the light element retainer 630 and PCB 622 may be used to provide a wider distribution of light.

Figure 7A:
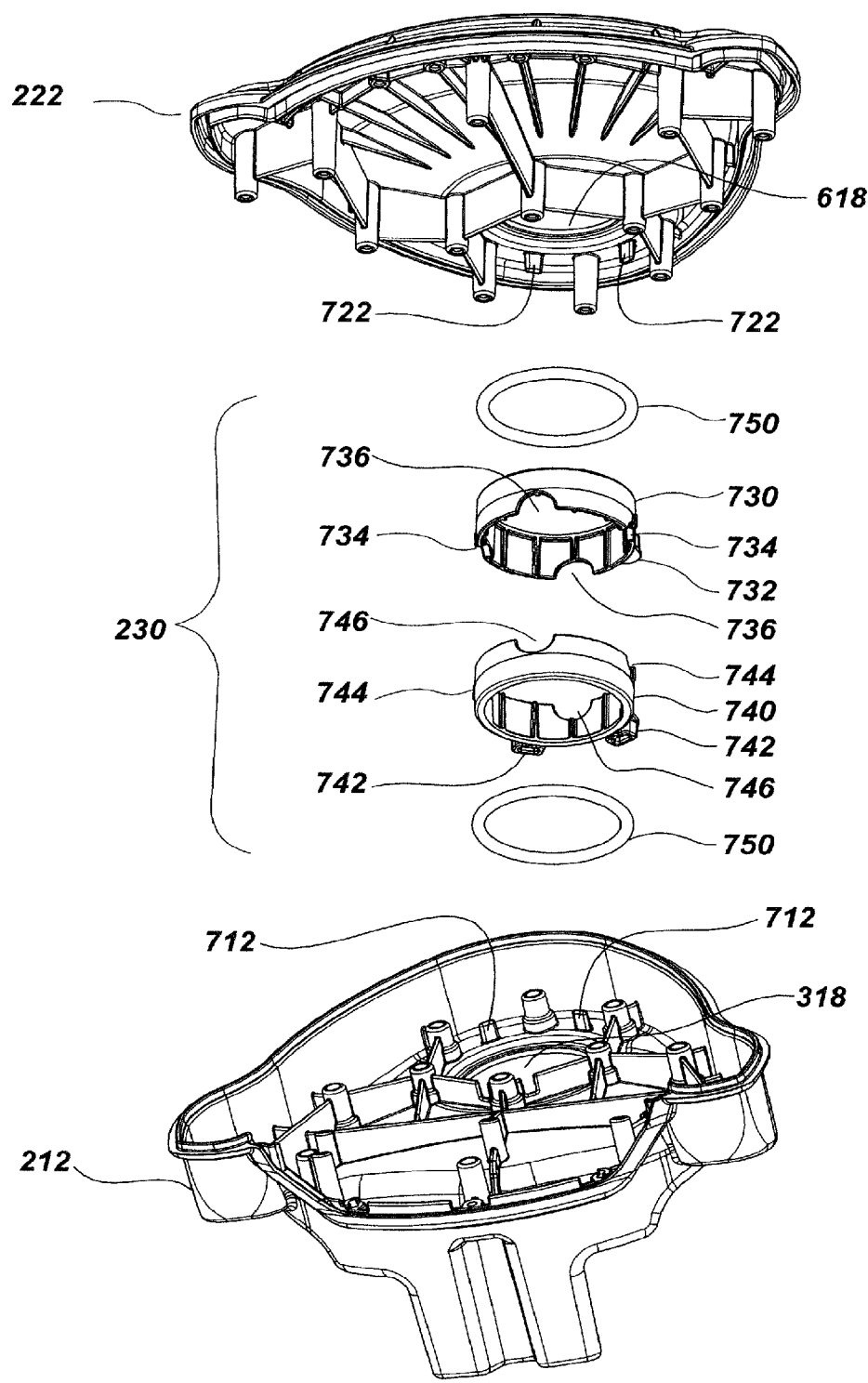
FIG. 7A is an exploded view of a top shell half, mast coupling assembly, and lower shell half embodiment.
Figure 7B:
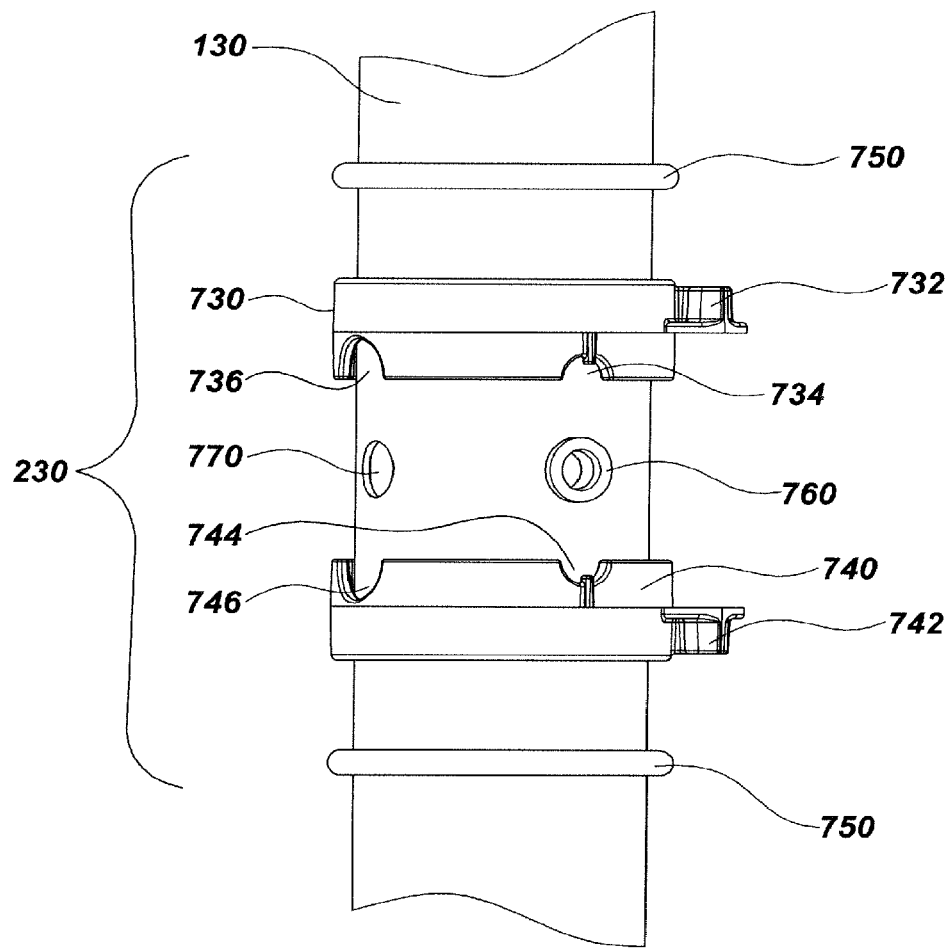
FIG. 7B is a partially exploded view of the mast coupling assembly embodiment of FIG. 7A on a mast.

Turning to FIGS. 7A and 7B, the mast coupling assembly may be comprised of a top mast coupling element 730, a bottom mast coupling element 740, and O-rings 750, one of which may seat on the top of the top mast coupling element 730 and one on the bottom of the bottom mast coupling element 740. The top mast coupling element 730 may be formed with a series of keying nub features 732, a set of top half mast retaining features 734, and a top half connector hole feature 736. Similarly, the bottom mast coupling element 740 may be formed with a series of keying nub features 742, a set of bottom half mast retaining features 744, and a bottom half connector hole feature 746. In assembly, the keying nub features 732 on the top mast coupling element 730 may each mate with a top nubbin feature 722 on the upper shell half 222. The keying nub features 742 on the bottom mast coupling element 740 may each mate with a bottom nubbin feature 712 on the lower shell half 212.

As illustrated in FIG. 7B, a pair of mast pins 760 (partially obscured in FIG. 7B) may secure to the mast 130 about which each one of the top half mast retaining features 734 and bottom half connector hole feature 746 may be seated in assembly. When mated, the top half connector hole feature 736 of the top mast coupling piece 730 and the bottom half connector hole feature 746 of the bottom mast coupling piece 740 may align with a mast wiring hole 770 formed through the mast 130. Wiring (not illustrated) may pass through the mast wiring hole 770 and mated top and bottom half connector hole features 736 and 746 to electrically connect ground tracking apparatus 110 and other devices such as locator 100.

Figure 8A:
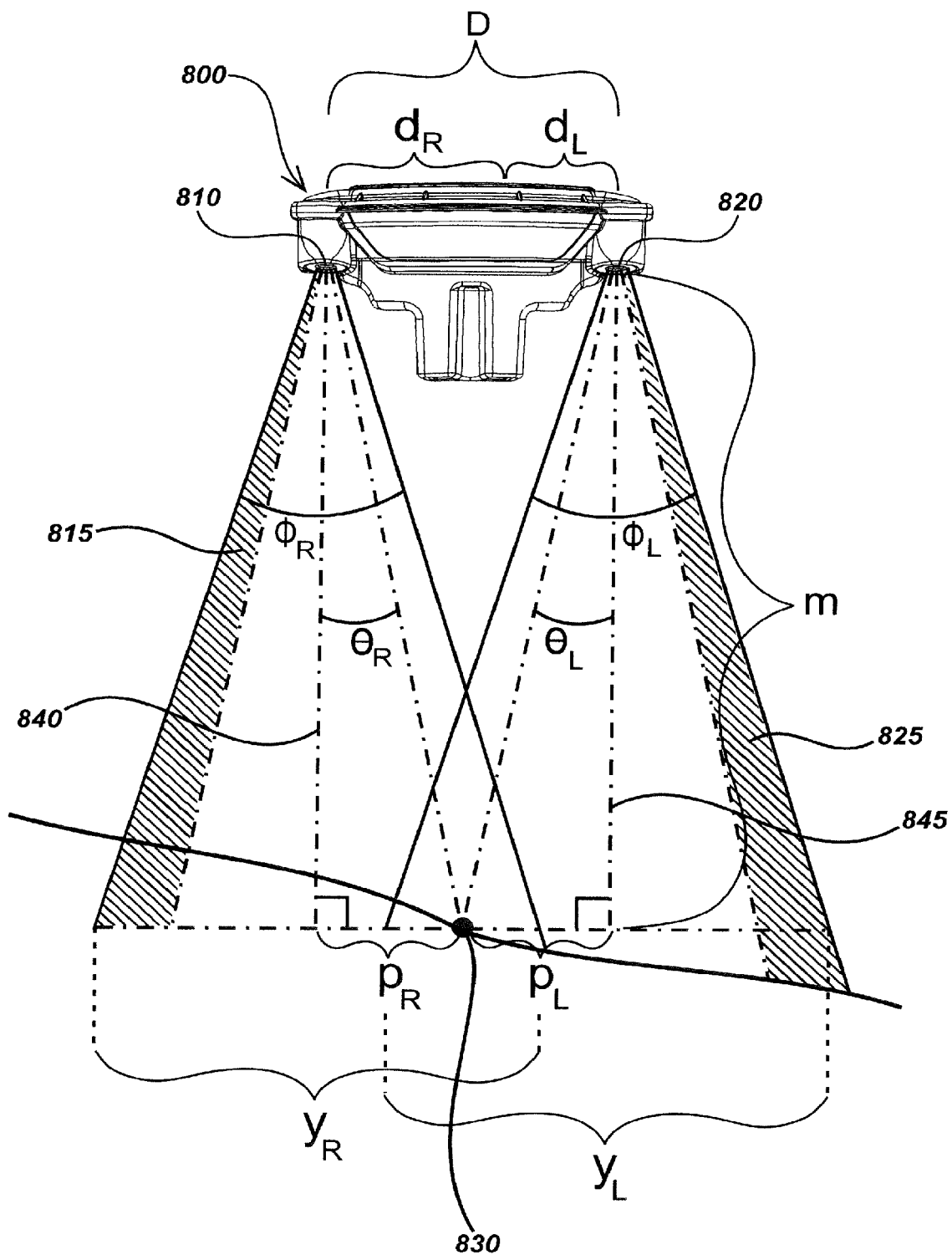
FIG. 8A is an illustration of a ground tracking apparatus embodiment illustrating geometry associated with the method embodiment of FIG. 8B.

Turning to FIG. 8A, details of an embodiment of a ground tracking apparatus 800 and associated geometry showing angles and dimensions relative to a ground surface are illustrated. Embodiment 800 may be similar in various aspects to ground tracker 110 as described previously herein. Ground tracker 800 may include a first or right camera element 810 and a second or left camera element 820, which may have partially overlapping fields of view during normal use. A right view portion 815 corresponding to right camera 810 and a left view portion 825 corresponding to left camera 820 illustrate a conceptual portion of a field of vision for each camera 810 and 820 that would be excluded from the actual field of vision due to the offsetting of the lens from its respective imager such as described with the geometry of lenses 342 and 352 to respective imagers 340 and 350 of FIG. 4.

Though the portion of field of view represented through the view portions 815 and 825 may not exist exactly as illustrated in practice, a conceptual understanding of these portions 815 and 825 is useful in understanding various aspects of the geometry needed to calculate various data and measurements to locate ground features and determine associated tracking parameters. Ground feature 830 represents a dot or small object on the ground surface. Imaging sensors of right camera 810 and left camera 820 may be positioned on a shared axis along a horizontal plane parallel to another horizontal plane containing one or more ground features, such as ground feature 830 (which may be an object or mark on the ground or may be a projected light spot or other ground feature). Ground feature 830 lies within the overlapping fields of vision of the right and left cameras.

A vertical plane may also be defined in FIG. 8A that includes the ground feature 830, right camera 810, and left camera 820 and that is perpendicular to both the horizontal plane containing the ground feature 830 and the horizontal plane containing imager elements 810 and 820. An axis in this plane represents a Z dimension with associated coordinates. m represents the vertical distance (height if the ground tracker is positioned directly above the ground feature) from ground tracker 800 to ground feature 830 measured in some non-pixel or absolute unit of measurement such as millimeters or inches. Further within the vertical plane view of FIG. 8A, a right camera optical axis 840 and a left camera optical axis 845 may extend vertically from the right imager element 810 and left camera element 820 respectively (the cameras may be configured to have inwardly angled optical axes as with the embodiment shown in FIG. 4B while keeping imaging sensors of the cameras in the same plane and on a common planar PCB). The right camera optical axis 840 may bisect an angle $\varphi_L$ representing the total possible field of vision that includes right view portion 815 of the right camera 810 and associate imaging element. The left camera optical axis 845 may bisect an angle $\varphi_R$ representing the total possible field of vision including left view portion 825 of the left camera 820 and associated imaging element. A measure of distances $y_L$ and $y_R$ are established whereby each distance $y_L$ and $y_R$ represents the horizontal distance in pixels spanning angle $\varphi_L$ and angle $\varphi_R$ respectively. Furthermore, angles $\varphi_L$ and $\varphi_R$, and distances $y_L$ and $y_R$ are known values based on the geometry and dimensions of the ground tracking apparatus 800.

In the ground tracker geometry embodiments disclosed herein, the measure of angle $\varphi_L$ may be equal to that of and angle $\varphi_R$ and may be referred to as angle $\varphi$ subsequently in this disclosure. Similarly, the measure of distance $y_L$ may be equal to that of distance $y_R$ and be referred to as distance y subsequently in this disclosure. Furthermore, angles $\varphi_L$ and $\varphi_R$ and distances $y_L$ and $y_R$ are known values based on the geometry of the ground tracking apparatus 800.

Still referring to FIG. 8A, the angle $\theta_R$ may be defined as the angle along the right imager optical axis 840 to ground feature 830 within the left camera 810. The angle $\theta_L$ may be defined as the angle along the left camera optical axis 845 to ground feature 830 within the right camera element 820. The measure of optical axes 840 and 845 of each camera element 810 and 820 from the lens above each imager to the horizontal plane containing the ground feature 830 may be equivalent to distance m between the ground feature 830 and ground tracker 800. The distance in pixels between the forward looking optical axis 840 and 845 of each camera 810 and 820 and the ground feature 830 may be denoted as $p_L$ and $p_R$ for each respective camera 810 and 820. The pixel distances $p_L$ and $p_R$ may have equivalent distances $d_L$ and $d_R$ measured in some non-pixel unit of measurement such as millimeters, where a known baseline distance D between the separate imager elements 810 and 820, also measured in some non-pixel unit of measurement, is equal to $d_L + d_R$. Though baseline distance D is a known value, values for $d_L$ and $d_R$ may be unknown. On the other hand, the equivalent pixel distances $p_L$ and $p_R$ may be determined by cameras 810 and 820. Furthermore, where $d_L$ and $d_R$ are equivalent measurements in non-pixel units to pixel measurements $p_L$ and $p_R$, $d_L$ may be equal to $m * \tan \theta_L$, $d_R$ may be equal to $m * \tan \theta_R$, and D may equal $m * \tan \theta_L + m * \tan \theta_R$.

Solving for m results in the equation $$m = \frac{D}{\tan\theta_L + \tan\theta_R},$$

where D is a known value and the measures of $\theta_L$ and $\theta_R$ are not. Through basic trigonometry, proportions may be established using various known and measureable pixel distances as they relate to their angle measurements. These proportions may be calculated using $$\frac{\frac{y_L}{2}}{p_L} = \frac{\tan\frac{\varphi_L}{2}}{\tan\theta_L} \text{ or } \tan\theta_L = \frac{2p_L \tan\frac{\varphi_L}{2}}{y} \text{ and}$$

$$\frac{-\frac{y_R}{2}}{p_R} = \frac{\tan\frac{\varphi_R}{2}}{\tan\theta_R} \text{ or } \tan\theta_R = \frac{-2p_R \tan\frac{\varphi}{2}}{y}.$$

We may substitute for $\tan \theta_L$ and $\tan \theta_R$ in the equation $$m = \frac{D}{\tan\theta_L + \tan\theta_R}$$

such that the equation to find distance m is expressed $$as\ m = \frac{D * y}{2\tan\frac{\varphi}{2}(p_L - p_R)}.$$

Example methods for determining height, relative position data, rotational and translation data, tracking parameters, and other associated data or information as described herein are described below. It is noted that in the following methods, the order of execution is not intended to be limited to the specific ordering shown, and other methods may include fewer or more steps in different orderings in alternate embodiments.

Figure 8B:
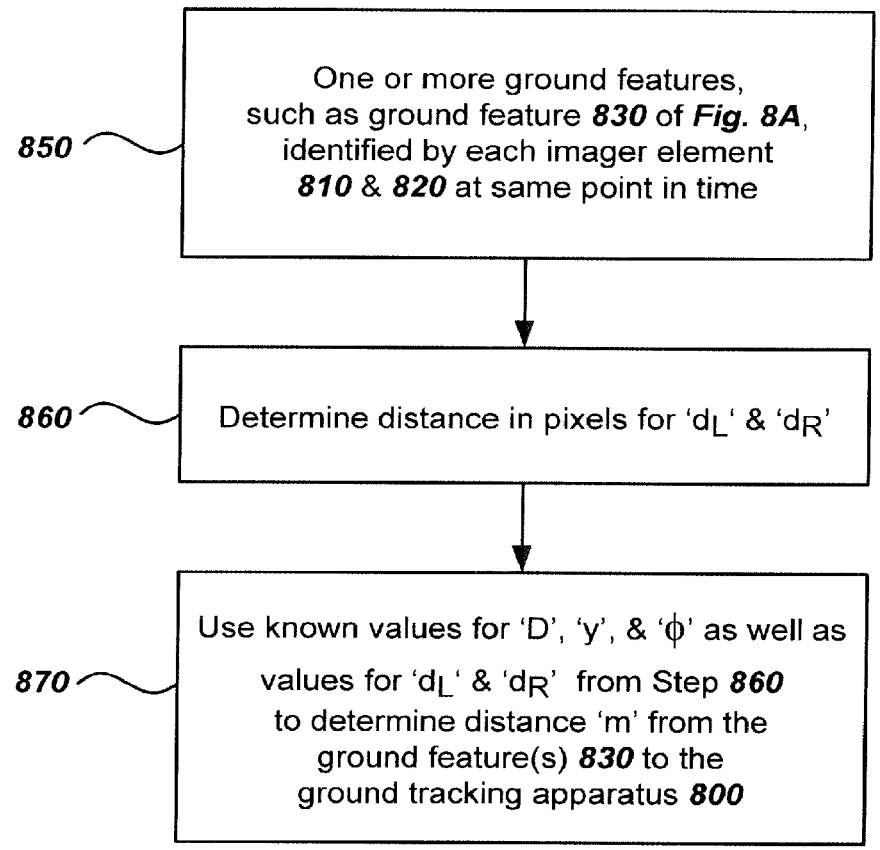
FIG. 8B illustrates details of an embodiment of a method to find the distance from a ground tracking apparatus and a ground feature.

Turning to FIG. 8B, an embodiment of a method for determining distance m based on the geometry and definitions corresponding to the embodiment 800 and angles and dimensions shown in FIG. 8A is illustrated. In step 850, one or more ground features, such as the example ground feature 830 of FIG. 8A (shown as a dot on the ground surface), may be detected within the overlapping field of view of the imager elements 810 and 820 of FIG. 8A. This may be done using a correlation of the pixels from two or more cameras or a subset of the pixels.

In a second step 860, positional values in pixels are determined for $p_L$ and $p_R$. In step 870, calculations are made to determine distance m associated with the ground feature correlation. Since D, y, and φ are known values and values for $p_L$ and $p_R$ have been determined in step 870, a calculation for distance m may be made using the equation $$m = \frac{D * y}{2\tan\frac{\varphi}{2}(p_L - p_R)}.$$

In some embodiments, multiple ground features may be imaged by the imaging elements of cameras or imaging sensors, such as cameras 810 and 820 of FIG. 8A, and processed to provide multiple values for m for each ground feature correlation and associated ground feature. In some embodiments, one or more ground features may be identified with associated ground feature correlations combined in a correlation set. For example, the surface may include one or more existing ground features. A laser (not illustrated) or other light projection source, such as the lighting element subassembly 620 (as shown in FIG. 6), may be used to project a mark onto the field of view at a predetermined position and angle, thereby creating a projected ground feature. The laser projected mark may be, for example, a laser dot, grid, or other shape or pattern and may be aimed to place the protected ground feature at a predetermined position, such as directly below and at the center of the ground tracker when held in a normal orientation above the ground. When m is calculated from a ground feature directly below a ground tracking apparatus, m may be equal to the distance of the ground tracking apparatus from the ground. Projected ground features may be used, in some embodiments, in conjunction with existing ground features to provide enhanced accuracy.

Figure 8C:
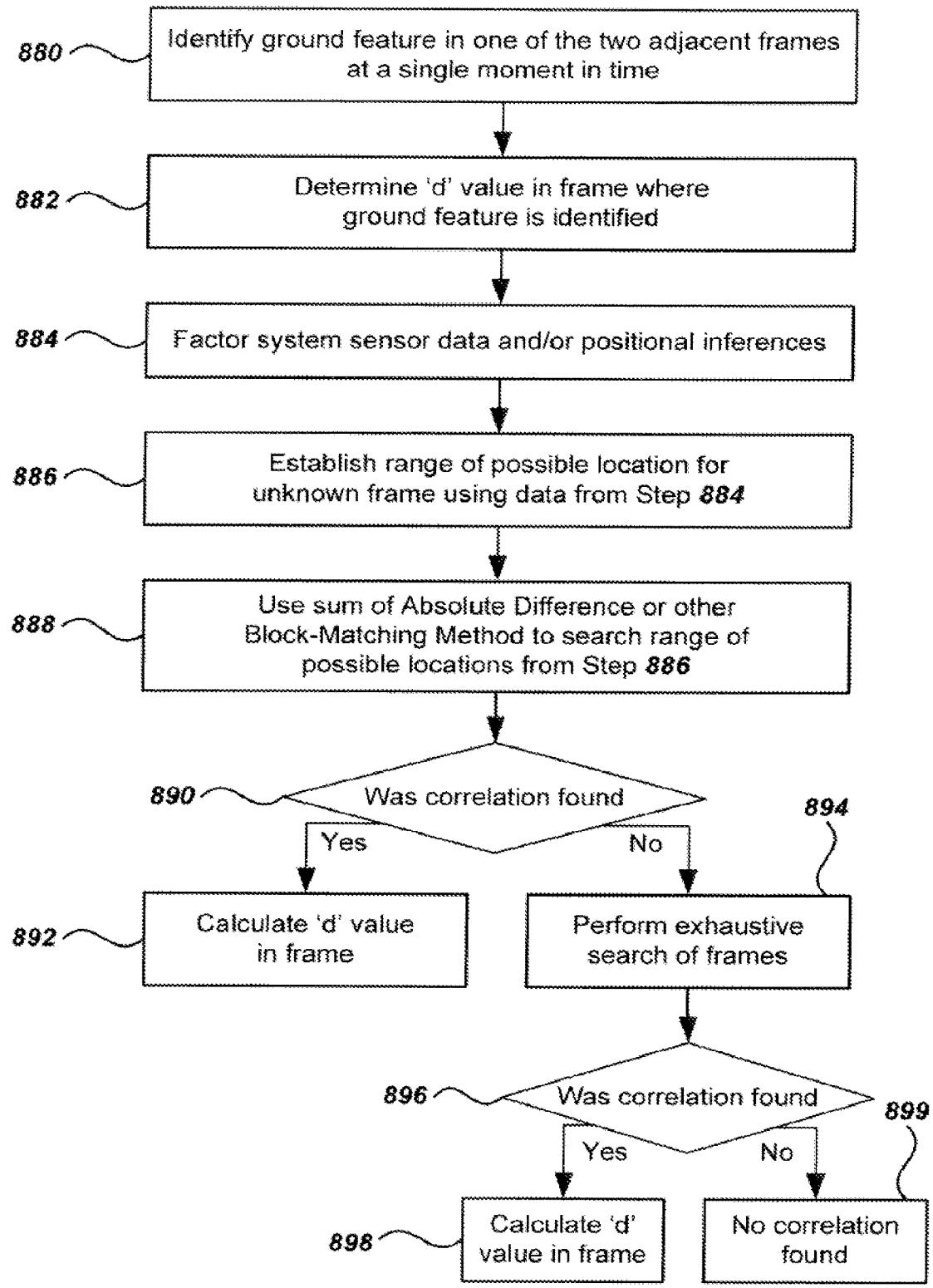
FIG. 8C illustrates details of an embodiment of a predictive method of finding ground features using correlations between overlapping images from left and right camera or imager elements.

Turning to FIG. 8C, an embodiment of a predictive method for detecting ground features by determining ground feature correlations in images or frames from adjacent cameras (i.e., first and second camera elements) at substantially the same point in time (or, in some embodiments, at different points in time but at substantially the same position) is illustrated. In step 880, a ground feature may initially be identified in the frame of one imager element, which may be either a left imager element or a right imager element. In step 882, a measurement in pixels for a d may be determined as described previously in conjunction with FIGS. 8A and 8B. For instance, if the ground feature is identified by the left imager element, a $p_L$ value is determined. In contrast, if the ground feature is identified by the right imager element, a $p_R$ value will be determined.

In step 884, system sensor data and/or positional inferences may be factored. INS data, IR distance sensor data, satellite navigation system data, and/or other system sensor data may provide, for example, information regarding orientation and height from the ground surface of the ground tracking apparatus embodiment. Furthermore, positional inferences regarding height and orientation may be made based on known frame rate and use of the ground tracking apparatus embodiment.

In step 886, a range of possible locations of the ground feature in a frame from the other camera element may be determined using, for example, data from step 884 to establish a range of possible locations of the ground feature in the adjacent frame where the ground feature location is currently unknown. In step 888, the Sum of Absolute Differences (SAD) or other Block-Matching methods may be used to search the range from step 886 to determine the location of the ground feature in the adjacent frame where the ground feature location is currently unknown. Where the ground feature is not located within the range from 886, an exhaustive search of the entire frame may optionally be performed to try to identify the ground feature in the frame.

In step 890, a determination may be made as to whether a correlation in ground features between adjacent frames was found and a ground feature was therefore detected in both frames. If the correlation was found, in step 892 calculations for the d value may be determined for the frame. If the correlation was not found from step 890, in step 894 an exhaustive search of the frame may be performed. In step 896, a determination once again may be made as to whether a correlation was found. If the correlation was found, in step 898 calculations for the d value may be determined for the frame. If the correlation was not found, in step 899, a decision may be made that there is no correlation found for that particular ground feature. In some embodiments it may be decided that there is no correlation found for that particular ground feature following step 890, thus skipping the need for an exhaustive search all together.

Figure 9A:
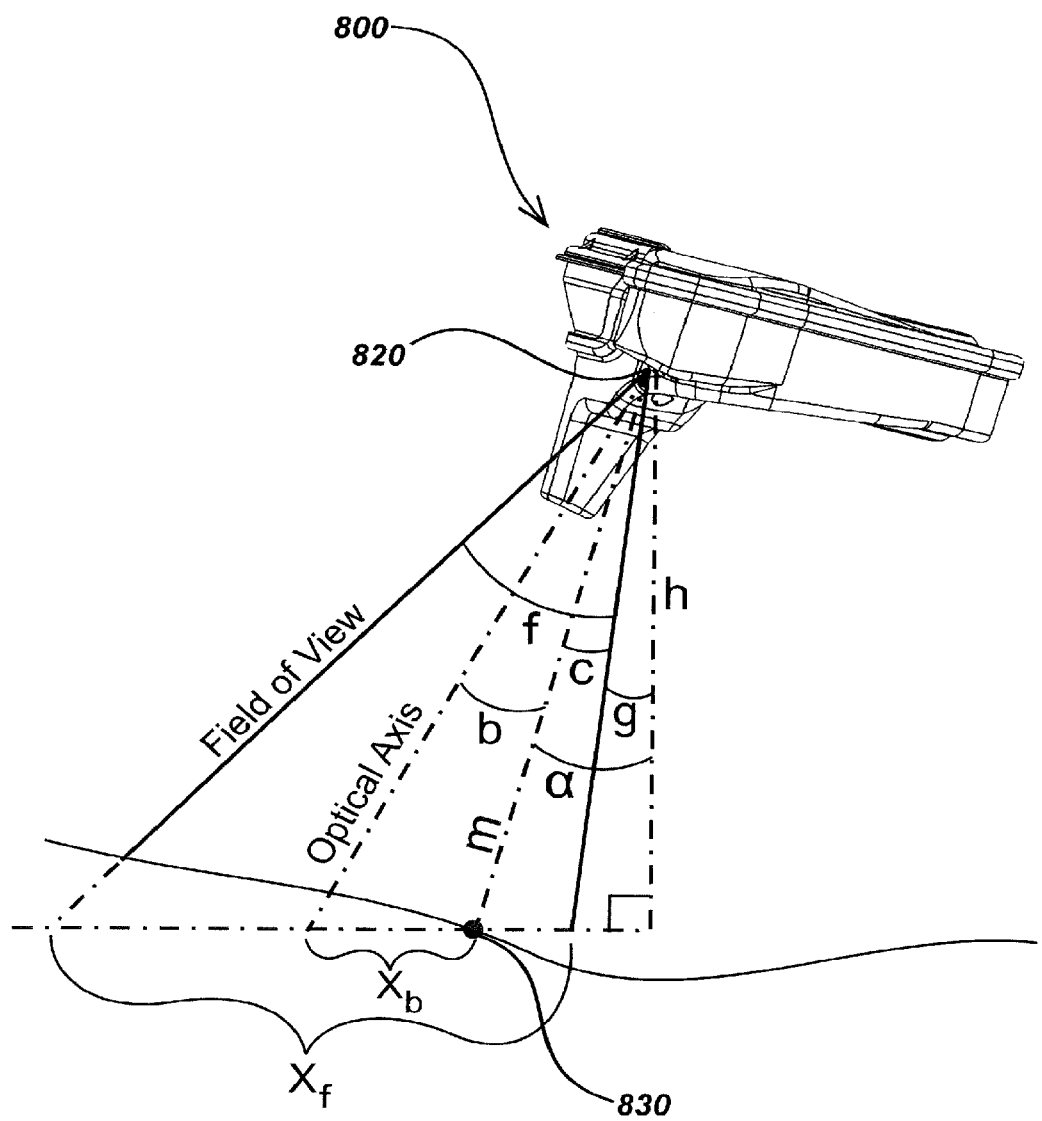
FIG. 9A is an illustration of the ground tracking apparatus embodiment of FIG. 8A showing details of geometry used in the method embodiment of FIG. 9B for calculating height relative to a ground feature.

Turning to FIG. 9A, geometry is illustrated for determining the distance of a ground tracking apparatus from the ground relative to the ground feature's position from the horizontal plane. This distance represents the height of the ground tracker above the ground feature (in the Z-axis) and is notated herein as h. An angle α may be determined and defined as the angle exiting between h and m where m may be equivalent to the calculated m from FIGS. 8A and 8B. Angle α may further be equal to g+c where angle g is the angle between the vertical axis along h and the closest edge of the field of view and angle c is the angle between the closest edge of the field of view and m.

In embodiments where the vertical axis along h is within the field of view, g will equal zero and c will equal α. In embodiments where the vertical axis along h is not within the field of view, such as that of the ground tracking apparatus 800, inertial navigation sensors, magnetometers, or other angle of inclination divining sensors, devices, and/or devices and methods may be used to determine g. In some embodiments, angle g may be predetermined by the design geometry of the ground tracking apparatus. An angle b may be defined as the angle between the optical axis and m. The distance $x_b$, may be a measure in pixels of angle b. Angle f may be a known value defined as the angle of the entire frame along the xz plane shown in FIG. 9A. The distance $x_f$ may be a measure in pixels of angle f.

Figure 9B:
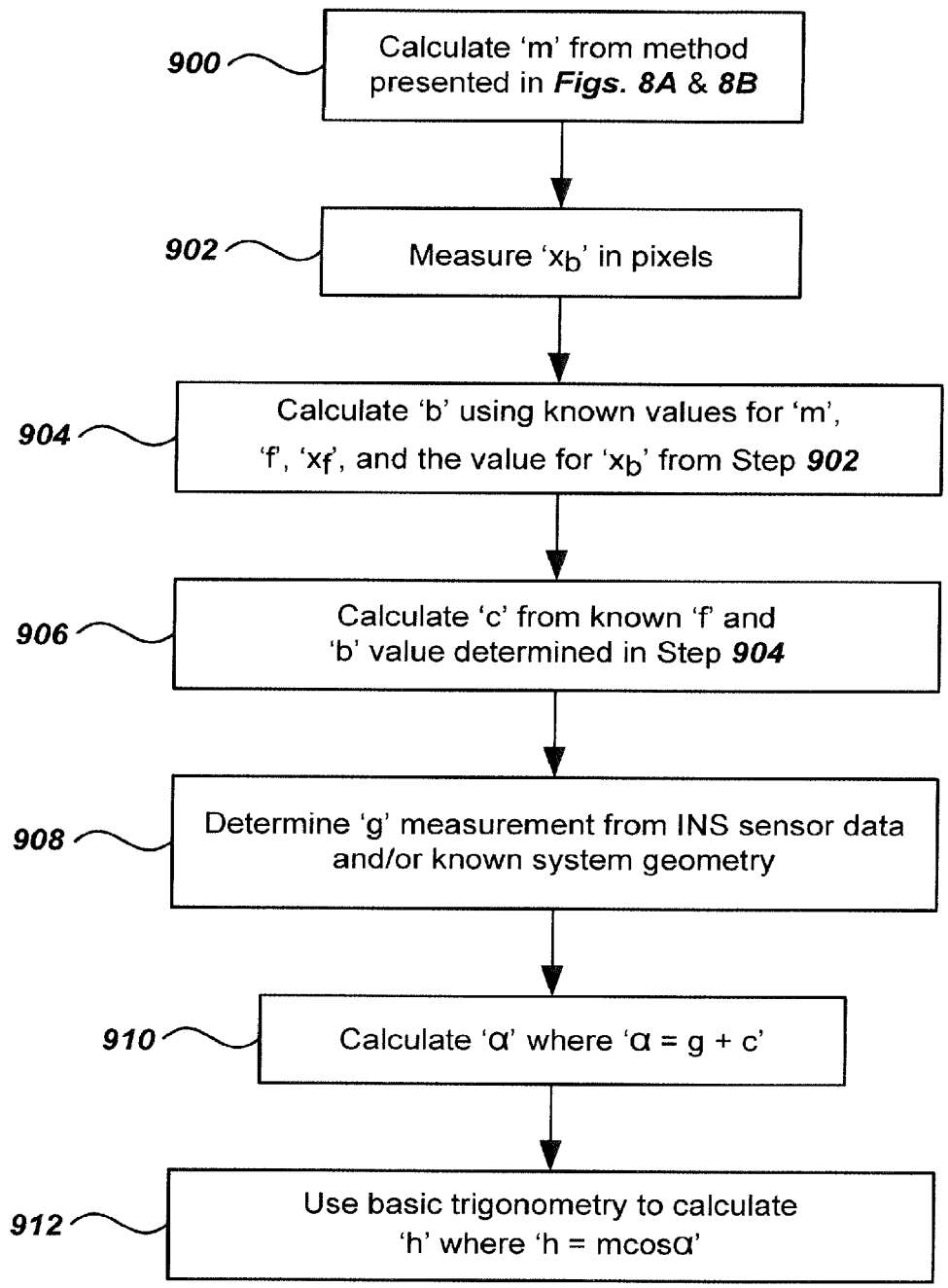
FIG. 9B illustrates an embodiment of a method for calculating the height of a ground tracking apparatus relative to a ground feature.

Turning to FIG. 9B, details of an embodiment of a method for determining height h of the ground tracking apparatus 800 (as shown in the geometry of FIG. 9A) from the ground relative to the position of the ground feature 830 are illustrated. The method may include step 900 wherein the distance m is calculated using methods described in conjunction with FIGS. 8A and 8B. In step 902, a value for $x_b$ may be determined. In step 904 angle b is calculated using known values for angle m, angle f, and $x_f$ as well as $x_b$, from step 902. For instance, a ratio may be determined where $$\frac{\tan b}{\tan\frac{f}{2}} = \frac{x_b}{\frac{x_f}{2}}$$

or solved for b as $$b = \tan^{-1}\left(\frac{2x_b\tan\frac{f}{2}}{x_f}\right).$$

In step 906, using the known measurement of angle f and the value for angle b calculated in step 904, a value for angle c may be determined, where $$c = \frac{1}{2}f - b.$$

In step 908, a value for angle g is determined through measurements of angle of inclination from INS sensor data and/or other sensor data and/or known system geometry where the angle of inclination is predetermined. For example, in a ground tracking locator as shown in FIGS. 1A-7B, the ground tracker may be held upright and parallel to the operating surface.

In such a system, the angle g may be predetermined through system geometry by positioning the ground tracker in a substantially upright position and parallel to the ground surface. In some embodiments where a prior pair of adjacent frames exists, motion vectors (described subsequently herein with respect to FIG. 13) may be calculated and further compared to determine a value for angle g. For example, comparison of top of frame motion vector length in pixels to that of motion vectors within the bottom of the frame may allow for an inference of angle g measurements.

With a known geometry and frame rate, one or more lookup tables may be created to access angle g value approximations based on motion vector comparison within the field of view. In step 910, a value for angle α may be calculated, where α=g+c. In step 912, a measurement of the height, h, may be calculated by h=m cos α.

In some cases, h may be analogues, or treated as such, to the ground tracking apparatus' actual height from the ground relative to its position within its horizontal plane above the ground surface. For example, where h is equal to m and may be calculated from a ground feature directly below a ground tracker and not significantly raised above the ground surface, h may be substantially equal to the ground tracker's actual height above the ground.

Further embodiments may use the value of h as the actual height of a ground tracking apparatus above the ground where, for example, the imager elements are relatively close together and close to the ground, and/or the ground surface is substantially flat and even, and/or a determination may be made otherwise whereby the difference between h and the ground tracking apparatus' true height will result in negligible error. In some such embodiments, an h value need not be calculated in the various adjacent frames. Instead, in such embodiments it may be assumed that difference in height between frames may be negligible and that one calculated h value may be used for two or more successive frames as described previously herein. For example, a height value may only be calculated every 10 or 20 frames in some embodiments, with the previous height value or some function of multiple height values used to determine positional changes in between.

In yet further embodiments, such as those illustrated in FIGS. 1A-7B, a series of other sensors, devices, and/or methods which may be part of a larger system may further be used to determine actual height of the ground tracker, with the height then used to determine positional changes through correlations to identify changes in the position of ground features across images taken at different positions. For example, infrared (IR) distance sensors, utility locator antennas, acoustic distance sensors, and the like may also be used. In the system described within FIGS. 1A-7B, IR the distance sensor assembly 330 (FIG. 5), antenna arrays 122, 124, and 126 (FIGS. 1A and 1B), and ground tracker 110 may each independently measure height and a comparison of height measurements may be made.

In some embodiments, a height value having the least amount of error may be determined and used. In other embodiments, a weighted average of height measurements may be determined for the height value. In yet further embodiments, methods may be used to determine a value for the actual height value using multiple h values taken at the same position or at different positions.

Figure 9C:
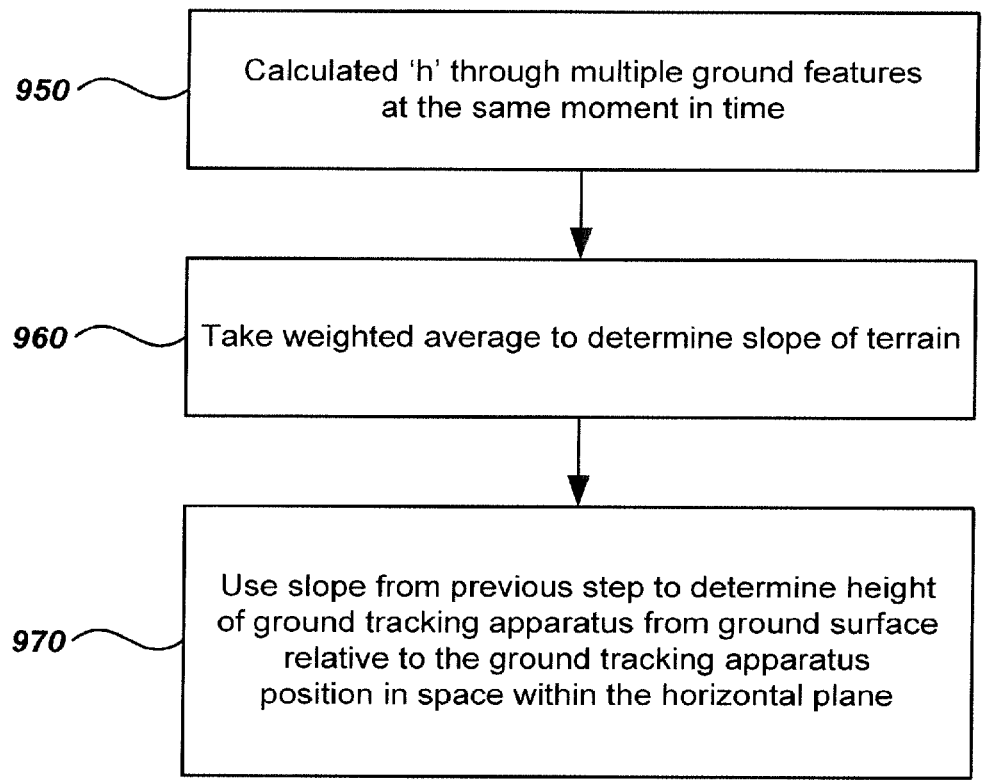
FIG. 9C illustrates an embodiment of a method for calculating actual height of a ground tracking apparatus above the ground.

Turning to FIG. 9C, details of an embodiment of a method for determining a more accurate value for the actual or true height of a ground tracking apparatus using multiple values of h is described. In step 950, h is calculated from multiple detected ground features at substantially the same point in time. In step 960, a weighted average of h values may be taken to estimate the slope of the ground surface. In step 970, ground slope determined in step 960 may be used to estimate the true height of the ground tracking apparatus.

Figure 32A:
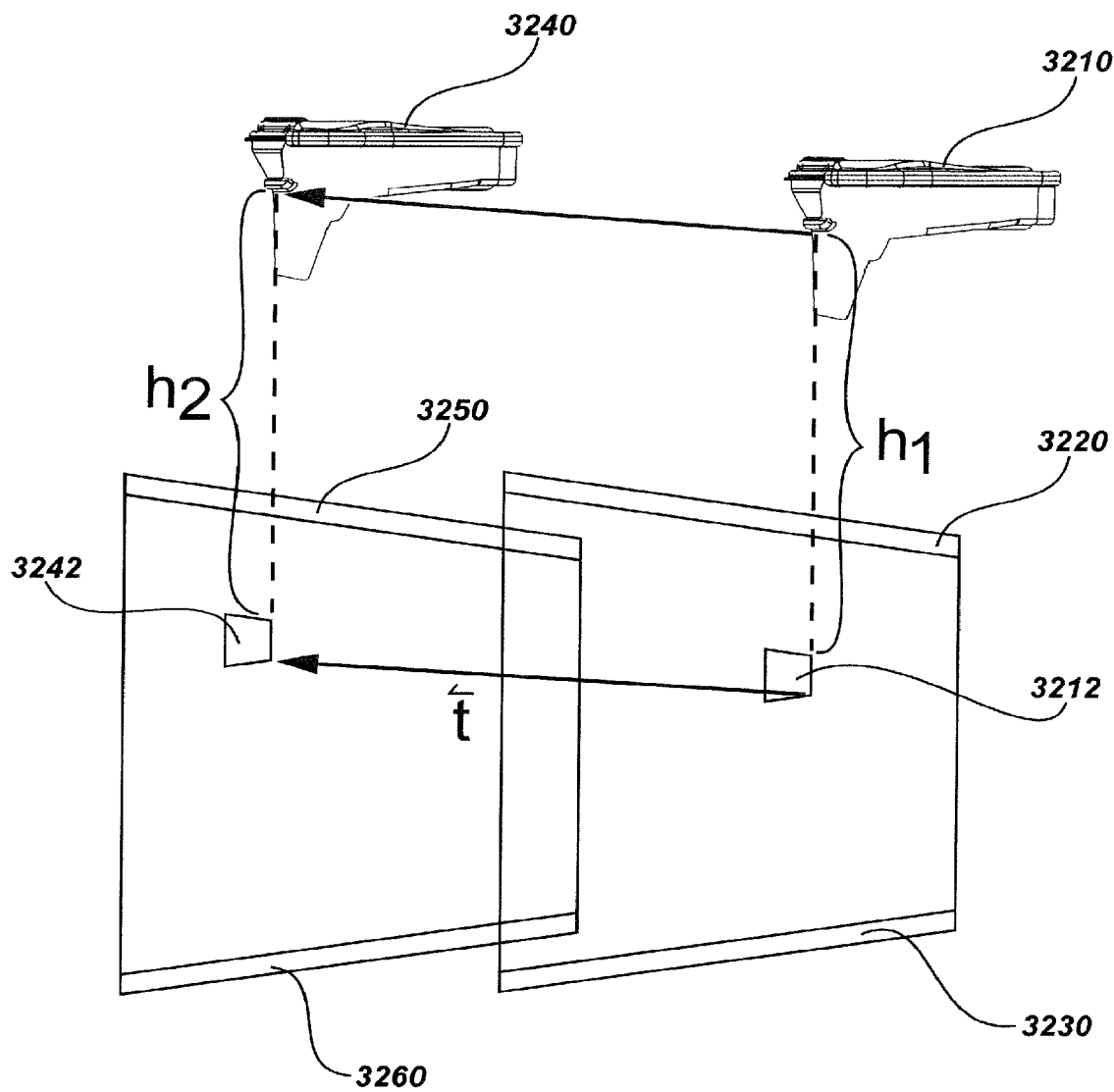
FIG. 32A illustrates an embodiment of a method for determining height and translational motions based off the same set of pixel blocks.
Figure 32B:
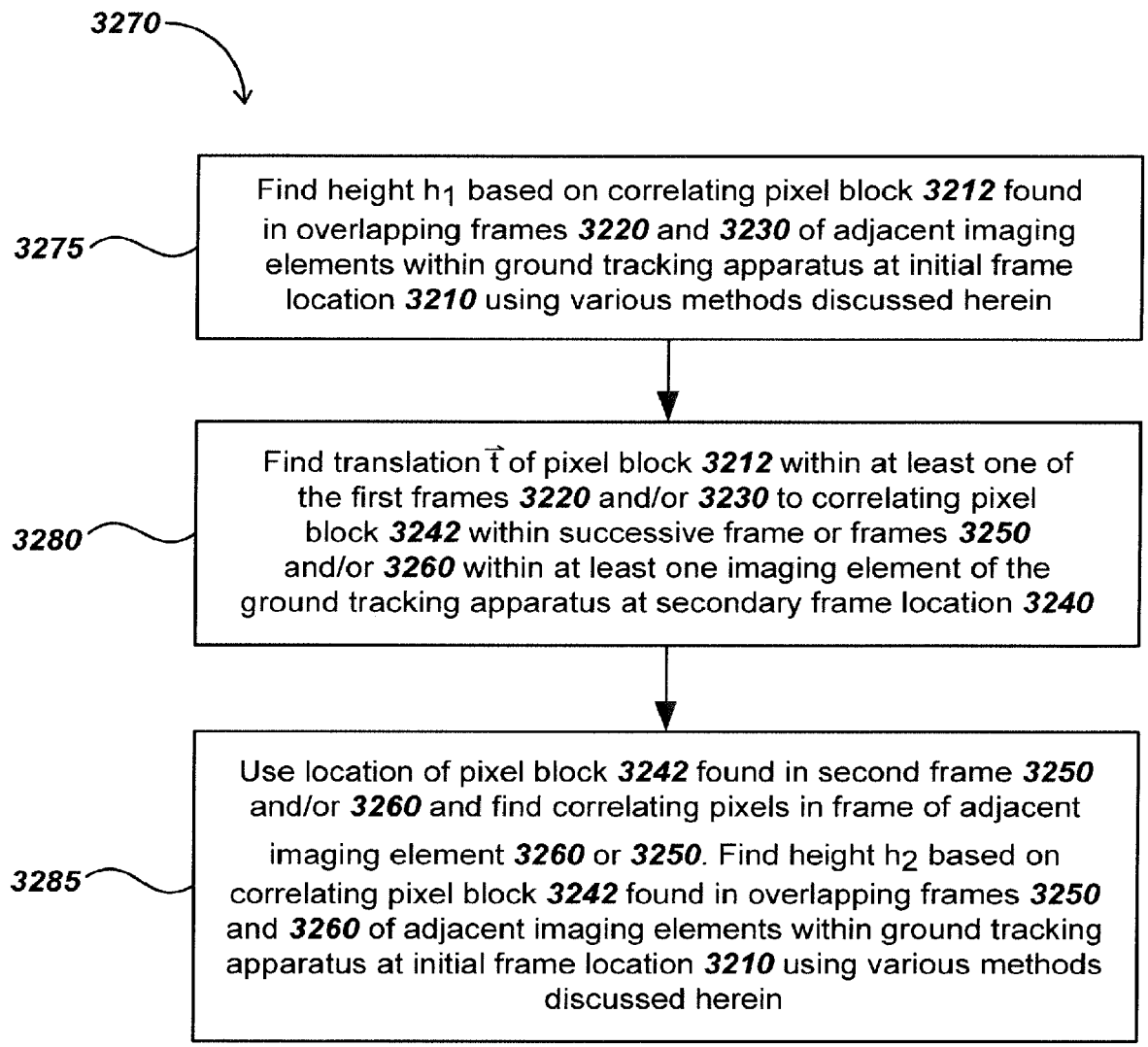
FIG. 32B illustrates an embodiment of a method for calculating height and translations based off the same set of pixel blocks.

As disclosed and illustrated subsequently herein with respect to FIGS. 32A and 32B, in some embodiments, pixel blocks comprising ground features and/or other correlations used to find positional data such as relative position, translation movements and/or motion vectors, may be the same as those used for height calculations.

Figure 9D:
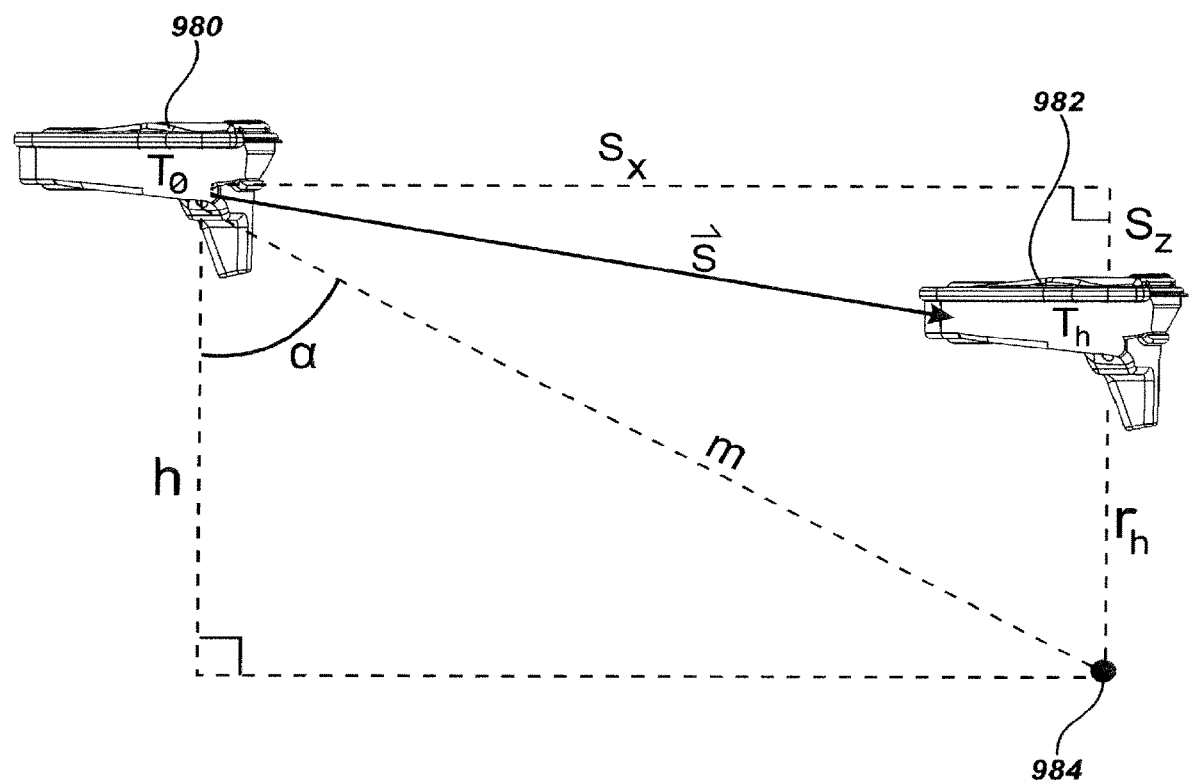
FIG. 9D is an illustration in the XZ plane showing movement of a ground tracking apparatus in time to visually define aspects used in the method embodiment of FIG. 9F.
Figure 9E:
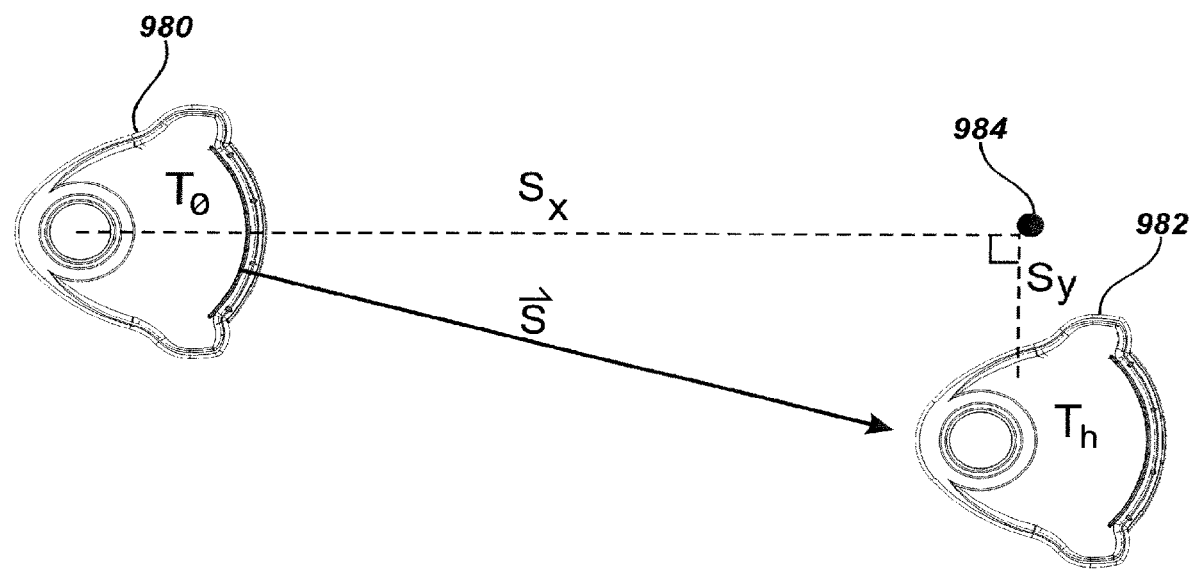
FIG. 9E is an illustration in the XY plane showing example movement of a ground tracking apparatus in time to visually defining aspects used in the method embodiment of FIG. 9F.
Figure 9F:
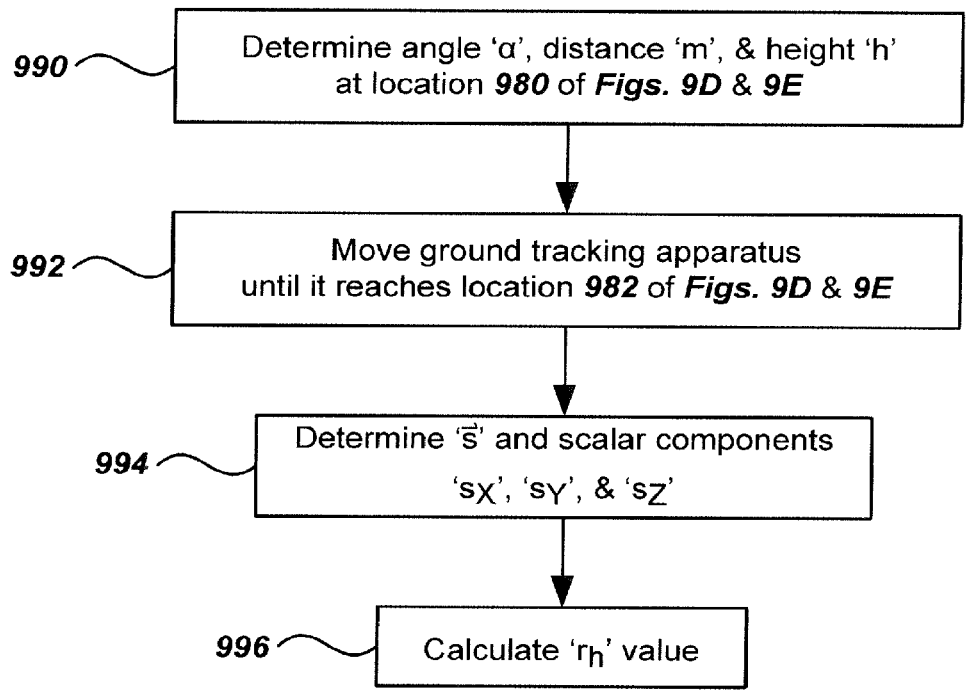
FIG. 9F illustrates an embodiment of a method for calculating a refined value of height, h.

Turning to FIGS. 9D and 9E, an illustration of a ground tracking apparatus at two points in time is shown to visually demonstrate terms and geometries used in association with the method of FIG. 9F. In FIGS. 9D and 9E, the initial or first point in time may be notated as time $t_0$. The first ground tracking apparatus location 980 may correspond to time $t_0$ within an X and Z axis plane in FIG. 9D and an X and Y axis plane in FIG. 9E. A different point in time (either subsequent or previous), notated as time $t_R$ may further be defined as the point in time where the ground tracking apparatus is at location 982 in FIGS. 9D and 9E, such that apparatus location 982 is above a ground feature 984 in the XY plane illustrated in FIG. 9E. A refined height, $r_h$, is defined as the measure of the distance from the ground surface to the ground tracking apparatus location 982 at time $t_n$. Angle α, distance m, and height h and be the same as those defined throughout FIGS. 8A-9B. A vector $\vec{s}$ is further defined as the change in position in three dimensional space between ground tracking apparatus locations 980 and 982 having scalar components $s_x$, along the x axis (FIGS. 9D and 9E), $s_z$ along the z axis (FIG. 9D), and $s_y$ along the y axis (FIG. 9E). In some embodiments, data from inertial navigation sensors and/or other positional sensors may be used to determine $\vec{s}$ and its components $s_x$, $s_y$, and $s_z$.

Turning to FIG. 9F, details of an embodiment of a method for calculating the refined height, $r_h$, are shown. In step 990, angle α, distance m, and height h are determined at ground tracking apparatus location 980 from FIGS. 9D and 9E. In step 992, the ground tracking apparatus is moved until it reaches ground tracking apparatus location 982 (as shown in FIGS. 9D and 9E), where a right angle is formed between the location of ground feature 984 and ground tracking apparatus location 982 in the XY plane illustrated in FIG. 9E. In step 994, a vector $\vec{s}$ and components $s_x$, $s_y$, and $s_z$, are determined. In step 996, $r_h$ is calculated where $r_h = |h - s_z|$. In situations where the ground tracker never reaches a location 982 (FIGS. 9D and 9E), one of the previous method embodiments illustrated in conjunction with FIGS. 9A-9C may be used to determine height. In some method embodiments used to determine $r_h$, $\vec{s}$ and/or one or more of its components $s_x$, $s_y$, and $s_z$ may be disregarded where negligible change may be determined in normal usage due to frame rate and/or particular use of the ground tracking apparatus embodiment. For example, in normal use of a system comprised of a ground tracker coupled to a utility locator device such as shown in FIGS. 1A-7B the change in $s_z$ may be negligible and $r_h = h$ once the system is moved from location 980 to 982 (FIGS. 9D and 9E).

A Sum of Absolute Differences, Mean Squared Error, Sum of Squared Errors or other such Block-Matching methods may be used to determine correlations to detect ground features in image frames taken at different times as well as correlations at a single moment in time between the separate cameras. Such correlations and methods of implementing them may be further used in determining motion vectors of each correlated ground feature between frames. Unlike the height calculations described previously herein, correlations of ground features need not occur in overlapping sections between the separate imager elements. In some embodiments a predictive method of identifying these correlating ground features in successive frames whereby INS sensor data is used to approximate the location of the ground features in the current frame view for each imager element may be used.

Figure 10A:
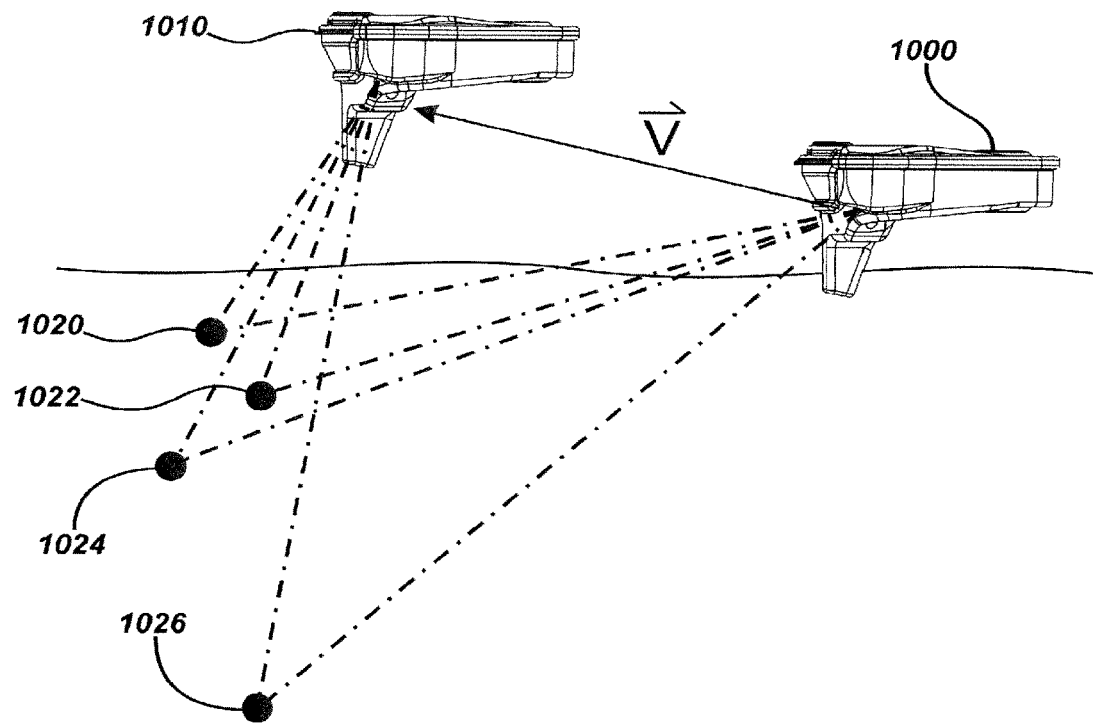
FIG. 10A illustrates example movement of a ground tracking device from a first position to a second position at different times.

Turning to FIG. 10A, an illustration of example movement of a ground tracking device at a first or initial position 1000 in time $T_0$ and moved to a second position 1010 at time $T_1$ relative to a series of correlated ground features 1020, 1022, 1024, and 1026 is shown. A vector $\vec{v}$ may further be defined as the change in position from position 1000 to 1010 in both magnitude and direction in either two or three dimensions. In FIG. 10A, four correlated ground features 1020, 1022, 1024, and 1026 are illustrated. In use, a ground tracker may use any number of ground feature correlations.

Figure 10B:
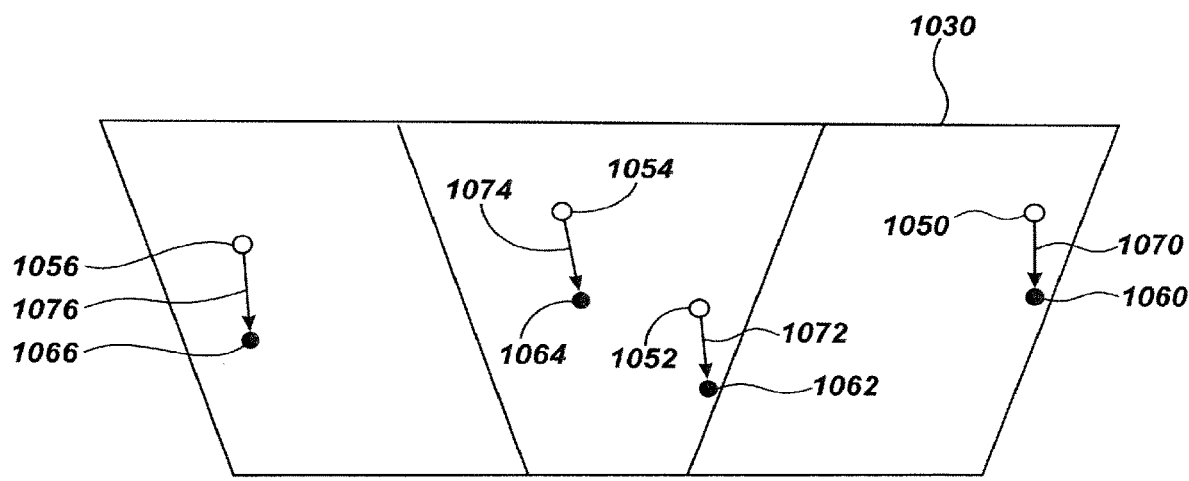
FIG. 10B illustrates ground tracking device positions from a first position view to a second position, overlaid onto a single combined view.

Turning to FIG. 10B, an illustration of image frames from the initial position 1000 in time $T_0$ from FIG. 10A and the second position 1010 at time $T_1$ from FIG. 10A are overlaid onto a single combined frame 1030. In frame 1030, ground feature positions 1050, 1052, 1054, and 1056 may correspond to the recorded position of 1020, 1022, 1024, and 1026 (FIG. 10A) from the initial ground tracking device position 1000 (FIG. 10A) at time $T_0$. Similarly, ground feature positions 1060, 1062, 1064 and 1066 may correspond to the recorded position of 1020, 1022, 1024, and 1026 (FIG. 10A) from the second ground tracking device position 1010 (FIG. 10A) at time Vectors 1070, 1072, 1074, and 1076 may be a measure of the change in position within the horizontal plane of frame 1030 between initial ground feature positions 1050, 1052, 1054, and 1056 to their correlating ground feature positions 1060, 1062, 1064 and 1066 in time. An FPGA module/system or other processing element may be configured to determine motion vectors such as the motion vectors 1070, 1072, 1074, and 1076. In FIG. 10B, four motion vectors 1070, 1072, 1074, and 1076 are illustrated corresponding to the measured change of position within the horizontal plane of the correlating ground features between successive frames in time. A change in the calculated value of h between two frames in time for each correlated ground feature which may further be determined through methods disclosed herein in conjunction with FIGS. 9A and 9B may be used to determine a third dimension variable for each motion vector. In use, a ground tracker may calculate any number of such motion vectors based on detection of one or more ground features using associated ground feature correlations.

Figure 11:
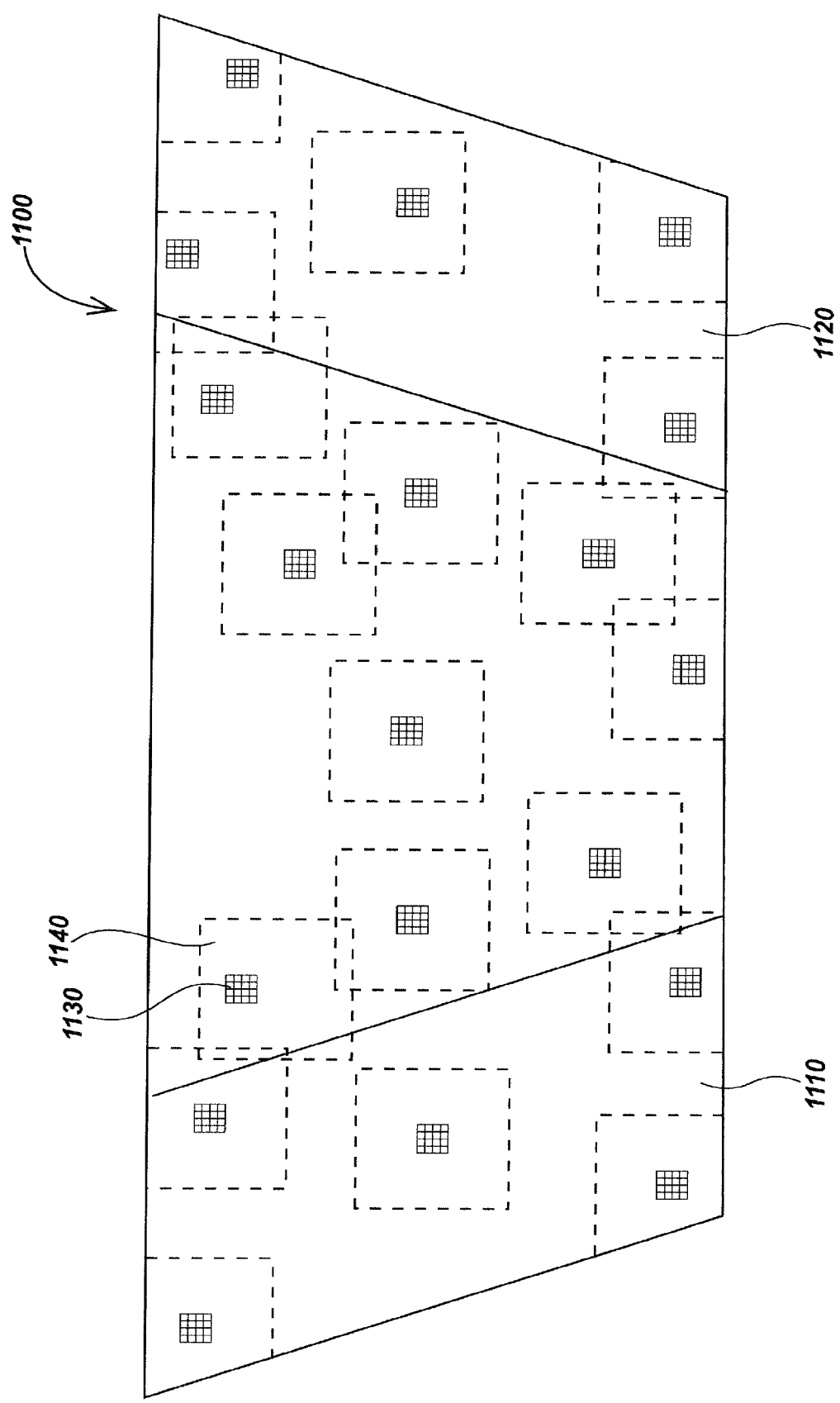
FIG. 11 illustrates an embodiment of a method for determining an enhanced navigation/position solution.

The ground feature correlations as described herein may each be comprised of a predetermined quantity/block of pixels. The initial predetermined quantity/block of pixels chosen may further be initially sampled from one or more predetermined locations within the image or video frame(s). As illustrated in FIG. 11, a combined frame view 1100 including a left imager frame 1110 and a right imager frame 1120 and a series of exemplary predetermined initial ground feature sample locations 1130 is shown. In various embodiments of a ground tracker, one or more predetermined initial ground feature sample locations at any location within the left and right frames may be used. The number and placement of initial ground feature sample locations may be tailored specifically to the particular use of the ground tracker. Further, the initial ground feature sample locations may largely or completely fall within the overlap of two adjacent frames.

In some embodiments, the layout of initial ground feature sample locations may be a grid pattern where each sample location is evenly distanced from its neighboring sample location. This grid pattern may be defined completely or largely within the overlap of the two adjacent frames. In yet further embodiments, the initial ground features may be determined by various other feature detection methods, such as edge detection methods, where no predetermined locations need to be sampled. In some embodiments, a maximum sample range, such as the sample range 1140, may be determined. The sample range 1140 may be used in the predictive method illustrated in FIG. 12. A sample range, such as the sample range 1140, need not be used in all embodiments where, for example, an exhaustive search of the entire frame(s) is alternately used.

Figure 12:
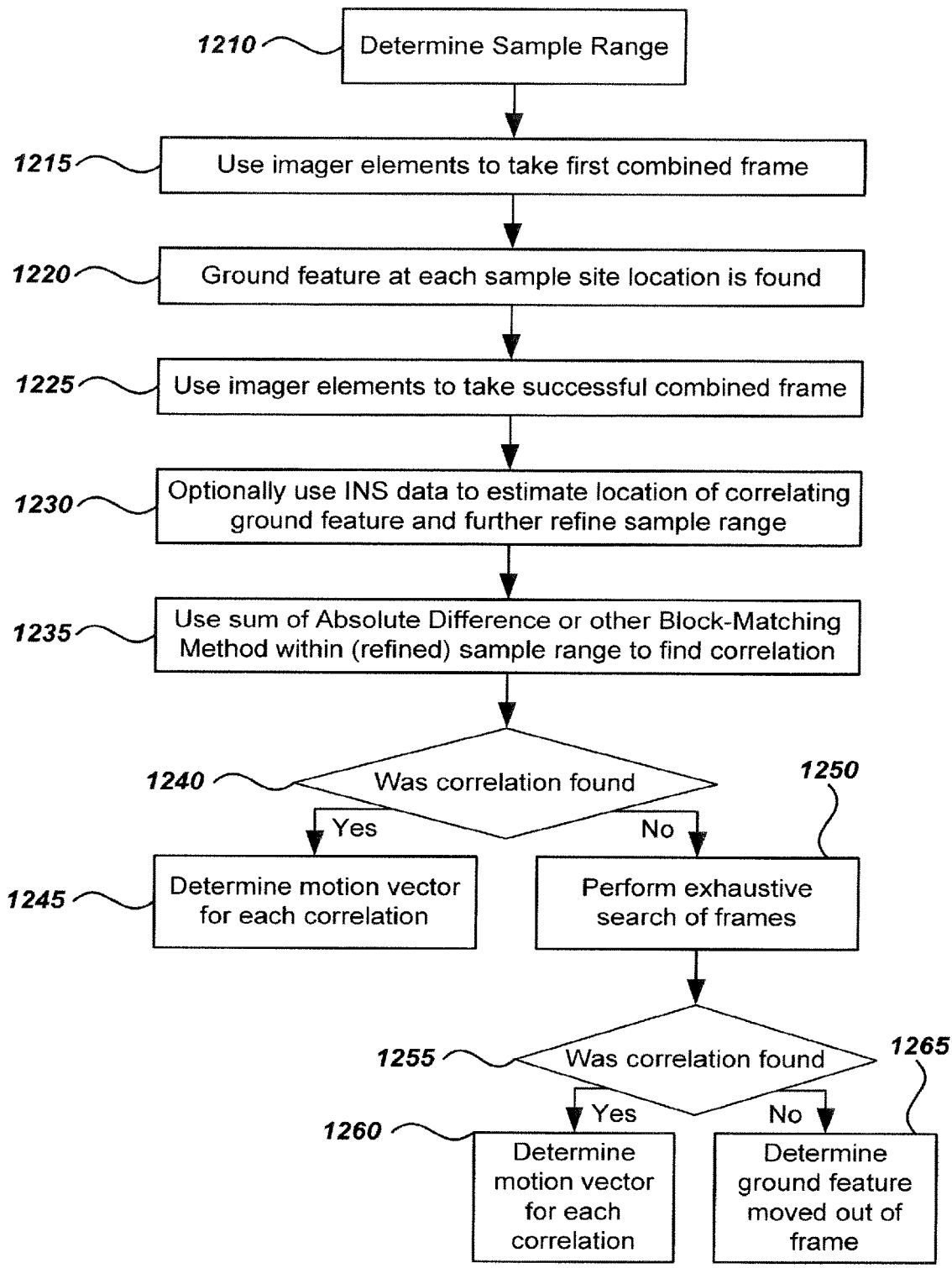
FIG. 12 illustrates an embodiment of a method for finding ground correlations in successive frames over time.

Turning to FIG. 12, an embodiment of a predictive method of determining positional data such as a change in position within the combined frame view is shown. In step 1210, a sample range, such as the sample range 1140 illustrated in FIG. 11, is selected. The sample range may be based on knowledge of the maximum distance that ground features within successive frames may move. For example, knowing a particular frame rate and maximum possible distance the device may be moved within the time of one frame (e.g., based on a maximum speed a user can walk over the ground), the sample range may correspond to this maximum possible distance within the time of a single frame. In step 1215, the imager elements may take a first combined frame. In step 1220, a ground feature at each sample site location is determined. In step 1225, a successive combined frame is taken by the imager elements. In optional step 1230, inertial navigation data may be used to further refine the sample range. For example, inertial data estimating movement in a particular direction at a particular speed during the time from the initial frame of step 1215 to the successive frame of step 1225, may be used to estimate the location where the ground feature may be found within the successive frame. In practice, the inertial data may be used to refine the sample range to account for drift error and the like within the inertial sensors.

By providing a refined sample range using this method, versus an exhaustive search of the frame, the amount of work and resources required by an FPGA module/system or other processing element to detect ground features by finding ground feature correlations may be greatly reduced. In step 1235, the Sum of Absolute Difference or other Block-Matching method may be used to look for correlations in ground feature within the (refined) sample range. In step 1240, a decision may be made as to whether a correlation was found. If a correlation was found, in step 1245 the motion vector for the correlation may be calculated. If a correlation was not found, in step 1250, an exhaustive search of the frames may be used.

In step 1255, once again a decision may be made as to whether a correlation was found. If a correlation was found, in step 1260 the motion vector for the correlation may be calculated. If a correlation was not found, in step 1265, a determination may be made that the ground feature moved out of frame. In some embodiments, a decision that the ground feature moved out of frame following step 1240 may be made, thus skipping the need for an exhaustive search altogether.

In determining correlations in ground features using the Sum of Absolute Differences method, errors in determining the incorrect location of block of pixels between successive frames may be detected by comparing the magnitude of the minimum sum of absolute differences calculated with respect to a moving average of past minimum sum of absolute difference calculations.

Figure 13:
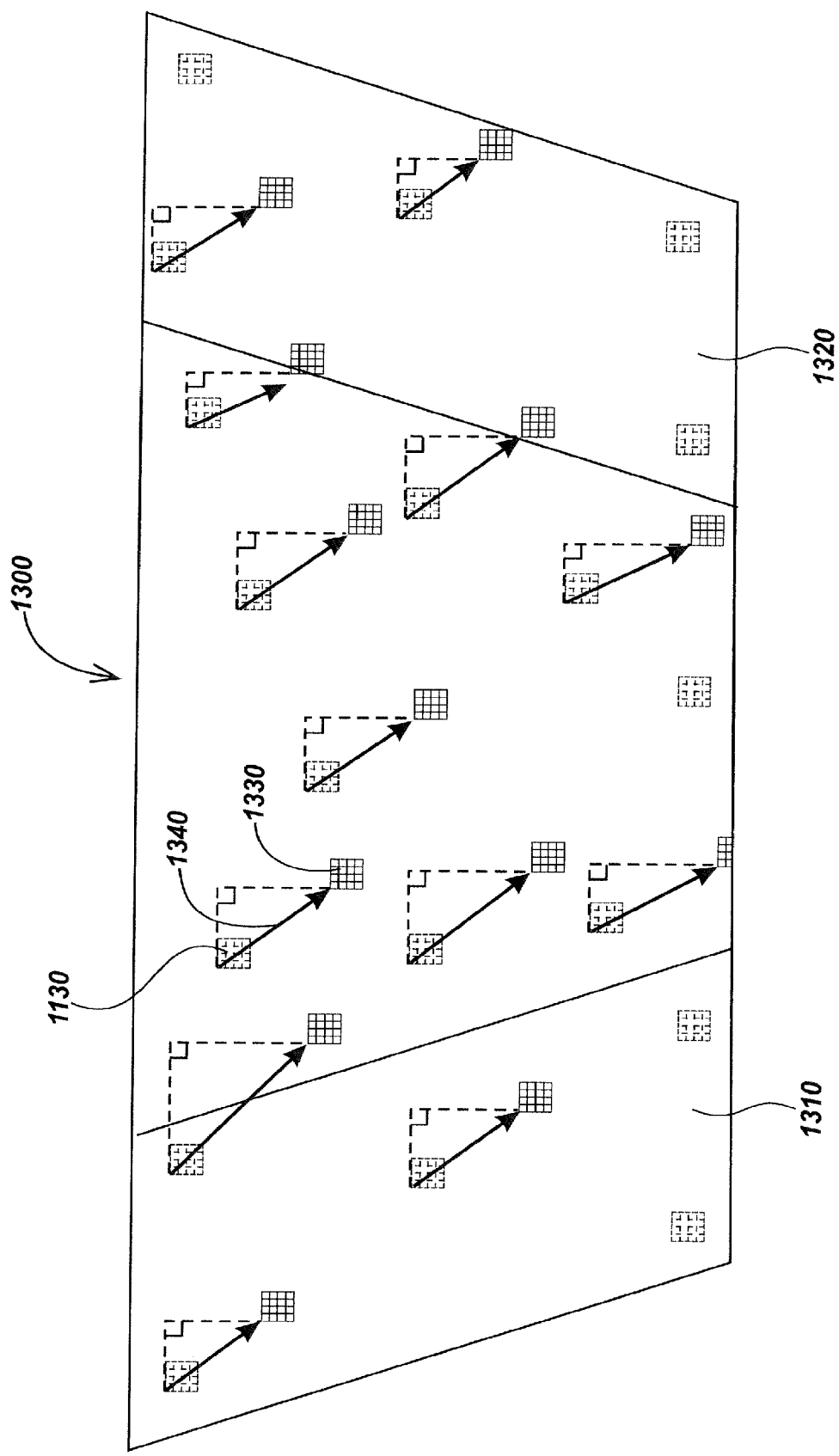
FIG. 13 illustrates example motion vectors determined between successive frames over time.

Turning to FIG. 13, an illustration of a combined frame view 1300 comprising of a left imager frame 1310 and a right imager frame 1320 that may be successive to that illustrated in FIG. 11. In FIG. 13, the combined frame view 1300, left imager frame 1310, and right imager frame 1320 may correspond to the combined frame view 1100, left imager frame 1110, and a right imager frame 1120 of FIG. 11. As illustrated, a ground feature detected at the initial ground feature sample locations 1130 is moved to the successive ground feature location 1330. A motion vector 1340 may be calculated by determining rise and run of pixels from the initial ground feature sample locations 1130 to its correlation at the successive ground feature location 1330. The field of motion vectors may be descriptive of movements of the ground tracking apparatus. For example, the backwards angled vectors 1340 of FIG. 13 may describe a translational movement in the opposite forward moving direction for the ground tracking apparatus.

An optical flow based on the motion vectors determined between successive frames in time may further be used to determine translational and rotational movements in three dimensional space for a ground tracking apparatus and configured utility locator device and/or other device or system. In such cases, a change in the value for h as described previously herein in connection with FIGS. 9A and 9B between successive frames may allow for the third dimension calculation of the motion vectors.

In a ground tracker such as illustrated in FIGS. 1A and 1B, movements and rotations of the ground tracking apparatus 110 (FIGS. 1A and 1B) may be analogous to movements and rotations of utility locator device 100 (FIGS. 1A and 1B) and vice versa. Data may be communicated between the ground tracking apparatus 110 (FIGS. 1A and 1B) and utility locator device 100 (FIGS. 1A and 1B) may include orientation and velocity of movements and rotations and/or information regarding each individual motion vector calculated from each ground feature correlation, and/or imagery from each imager element 112 and 114 (FIGS. 1A and 1B). Such imagery data may include ground cover color photomosaic which may further allow for detecting the color and/or position of paint or other ground markings. In some embodiments, the data may also relate to mapping solution whereby a map of a locate area may be created that further contains detected buried utility information.

Figure 14:
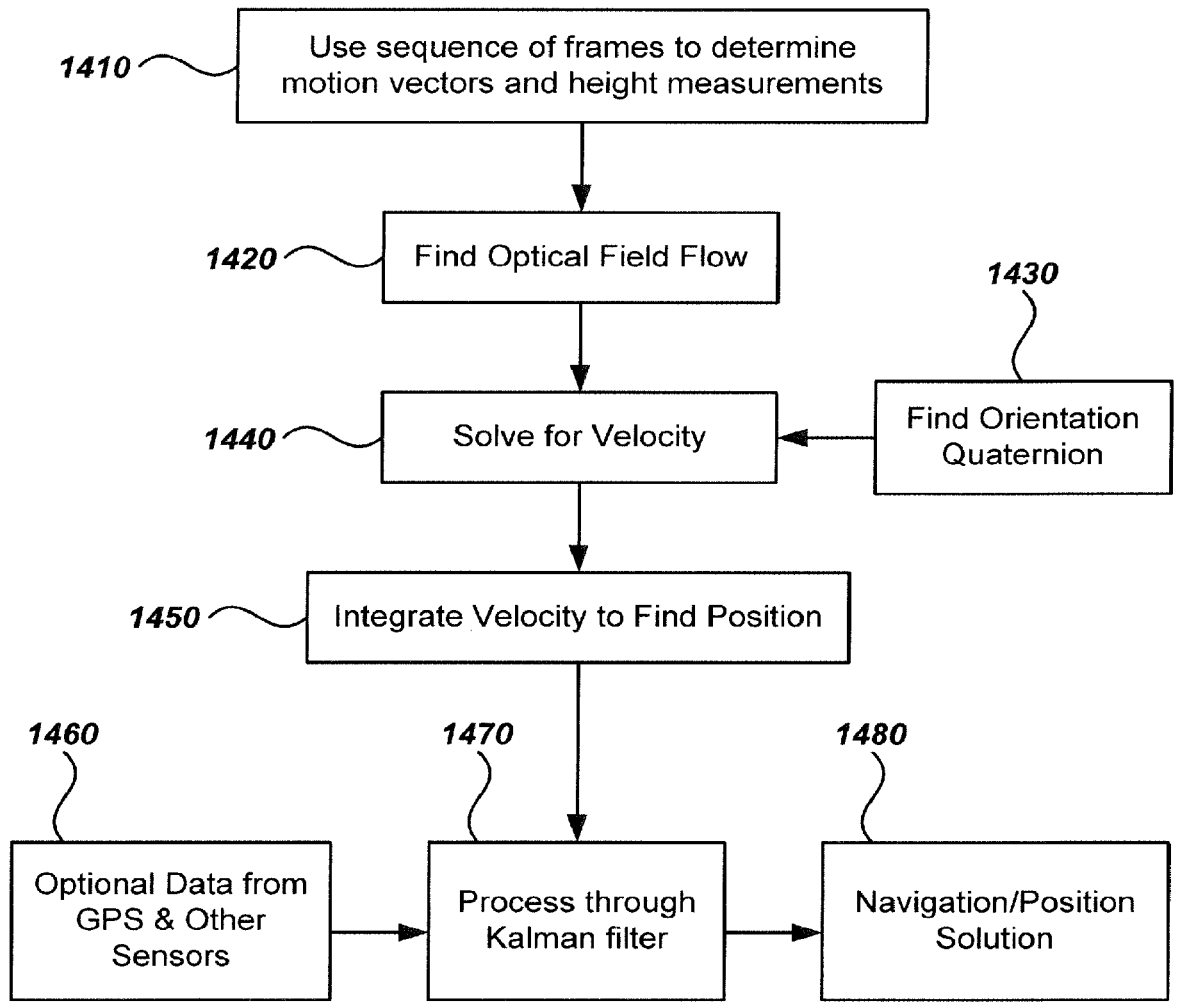
FIG. 14 illustrates an embodiment of a method for determining an enhanced navigation/position solution for a ground tracking apparatus and associated devices or systems such as locators.

Turning to FIG. 14, details of an embodiment of a method for an enhanced navigation/position solution for a ground tracking apparatus are described. In step 1410, sequential images or frames may be used to determine motion vectors and calculate changes in height of a ground tracker. In step 1420, an optical field flow is determined from motion vectors in step 1410. In step 1430, the orientation quaternion of the ground tracker is found. In step 1440, the velocity of the ground tracker and attached utility locator or other device may be found from data determined in steps 1420 and 1430. In step 1450, the determined velocity is integrated to find position. In step 1460, data from GPS, inertial navigation sensors, and/or other sensors may be received or determined. In a combined step 1470, data from step 1450 and 1460 may be processed through a Kalman filter or other predictive filter. In step 1480, an enhanced navigation and position solution is determined, with associated data stored in a memory of the ground tracker and/or associated device or system.

The enhanced position/navigation data from FIG. 14 may further be used in mapping applications. The calculated position/navigation data determined by a ground tracking apparatus may correspond to images taken and stored by another system device. For example, in the utility locator device 100 illustrated in FIGS. 1A and 1B, the cameras 144 on the control/user interface module 140 may be configured to record imagery of the locate area. The cameras 144 and methods of use thereof may, for example, be cameras and methods for use thereof as described in U.S. patent application Ser. No. 13/766,670, entitled OPTICAL GROUND TRACKING LOCATOR DEVICES AND METHODS, filed Feb. 13, 2013, the content of which is incorporated by reference herein. This imagery may be low altitude aerial photography that corresponds to both buried utility data determined by the utility locator device 100 and position/navigation data determined by the ground tracking apparatus 110.

Figure 15:
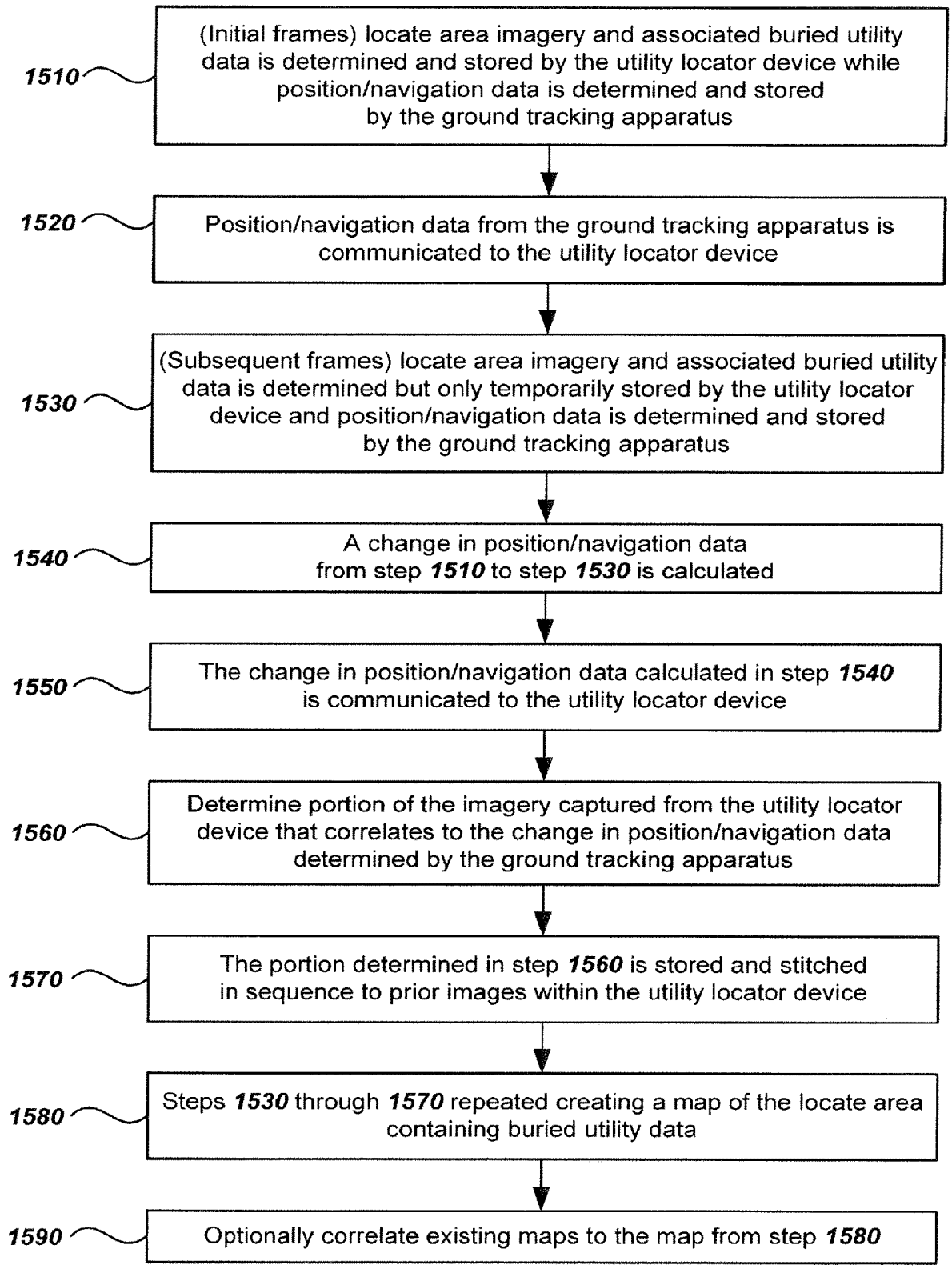
FIG. 15 illustrates an embodiment of a method for a mapping solution for a ground tracking apparatus coupled with a utility locator device.

Turning to FIG. 15, an embodiment of a mapping method for a system including a utility locator device and a ground tracking apparatus is described. In step 1510 corresponding to an initial set of frames within the ground tracking apparatus and cameras within the utility locator device, locate area imagery and associated buried utility data may be determined and stored by the utility locator device while position/navigation data may be determined and stored by the ground tracking apparatus. In step 1520, position/navigation data is communicated to the utility locator device. In step 1530 corresponding to a subsequent set of frame within the ground tracking apparatus and cameras within the utility locator device, locate area imagery and associated buried utility data may again be determined but optionally temporarily stored by the utility locator device while position/navigation data may again be determined and stored by the ground tracking apparatus. In step 1540, a change in position/navigation data from step 1510 to step 1530 is calculated.

In step 1550, the change in position/navigation data calculated in step 1540 is communicated to the utility locator device. In step 1560, a portion of the imagery captured from the utility locator device is correlated to the change in position/navigation data of the ground tracking apparatus. In step 1570, the portion determined in step 1560 may be stored and stitched in sequence to prior images. In step 1580, the steps 1530 through 1570 may be repeated until the locate operation has ceased thus providing a map of the locate area containing vital buried utility data. By storing only the portion of imagery data as indicated in step 1570, total storage required to create such a mapping solution may be lessened. In an optional step 1590, preexisting maps may be fit to the mapping solution provided in step 1580.

Figure 16:
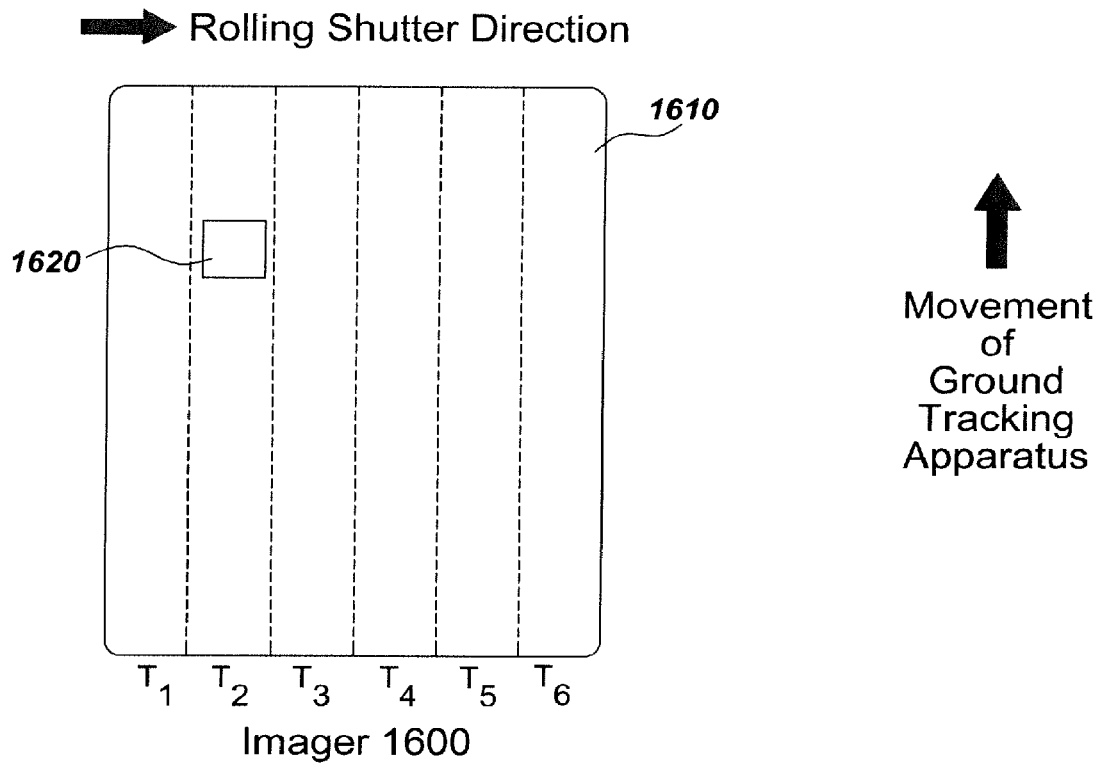
FIG. 16 is an illustration of one rolling shutter direction relative to the movement of the ground tracking apparatus.

In the various ground tracking apparatus, system, and method embodiments herein, the imaging elements/sensors may utilize a global shutter or a rolling shutter. In embodiments utilizing rolling shutter type imaging elements, orientation of the imaging element may dictate scan direction of the rolling shutter relative to the movement of ground tracking device. In some embodiments, the orientation of rolling shutter type imagers and/or imaging elements, such as that with imager 1600 of FIG. 16, may have a side to side scan direction along vertical scan lines. Within FIG. 16, a frame 1610 may have a left to right rolling shutter direction. One or more sample locations, such as sample location 1620, may be used to further find correlation between pixels within the sample location and that within other imaging elements at the same point in time and/or between successive frames using the SAD method and/or the various other methods disclosed herein. In some embodiments, the imaging element may also be oriented to allow from right to left rolling shutter direction (not illustrated) versus the left to right rolling shutter direction illustrated within frame 1610.

Figure 17:
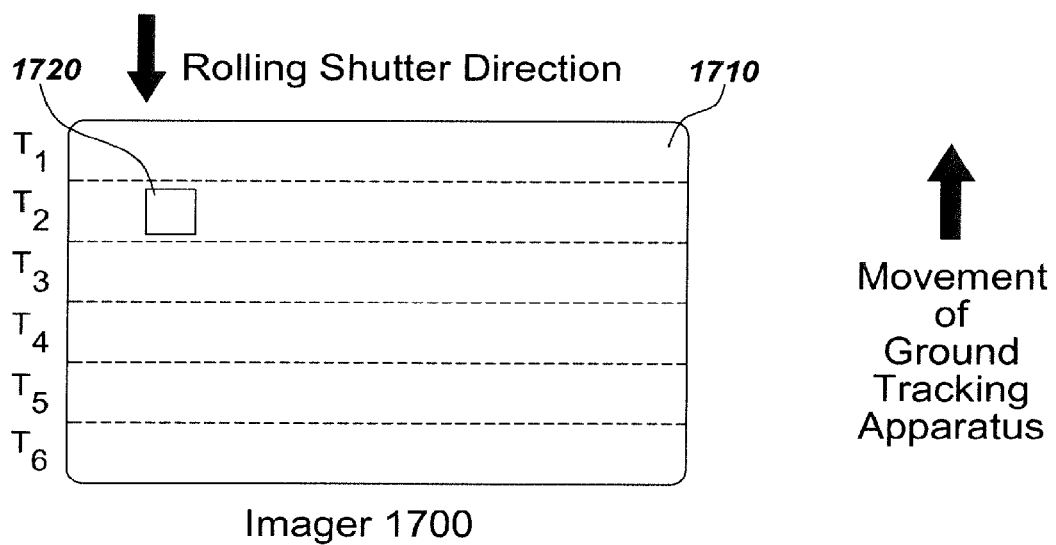
FIG. 17 is an illustration of a different rolling shutter direction relative to the movement of the ground tracking apparatus.

In yet other embodiments, imaging elements may be oriented such that rolling shutters may scan along horizontal scan lines in a direction contrary to the motion of the ground tracking apparatus. As illustrated in FIG. 17, for example, imager 1700 may produce a frame 1710. The frame 1710 may have a top to bottom rolling shutter direction that may be contrary to the motion of the ground tracking apparatus. One or more sample locations, such as sample location 1720, may be used to further find correlation between pixels within the sample location and that within other imaging elements at the same point in time and/or between successive frames using the SAD method and/or the various other methods disclosed herein.

Figure 18:
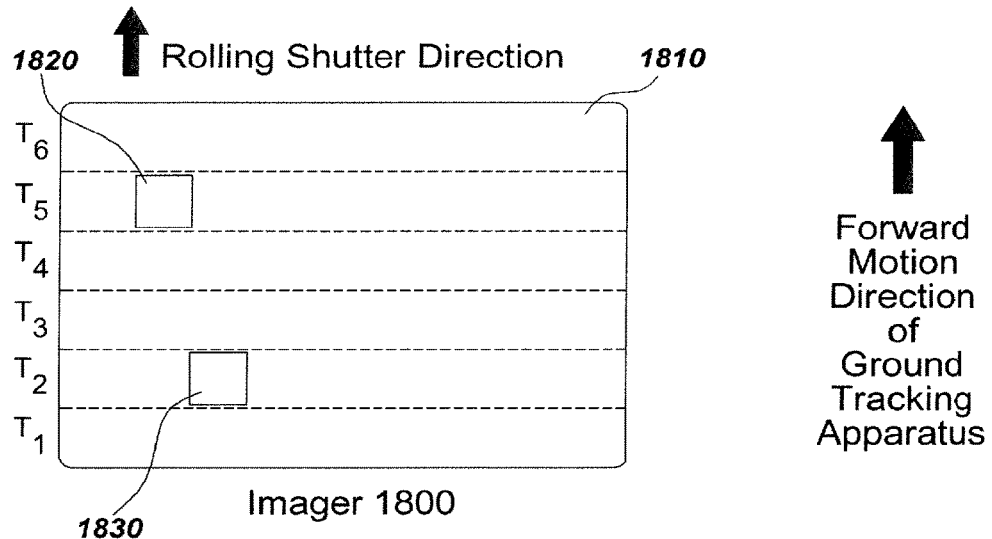
FIG. 18 is an illustration of a rolling shutter direction that corresponds to the movement of the ground tracking apparatus.

In yet further embodiments, imaging elements may be oriented such that rolling shutters may scan along horizontal scan lines in a direction correlating with that of motion of the ground tracking apparatus. As illustrated in FIG. 18, for example, imager 1800 may produce a frame 1810. The frame 1810 may have a bottom to top rolling shutter direction that may be the same direction as the motion of the ground tracking apparatus. One or more sample locations, such as sample location 1820, may be used to further find correlation between pixels within the sample location and that within other imaging elements at the same point in time and/or between successive frames using the SAD method and/or the various other methods disclosed herein. As disclosed in subsequent sections herein, such a scan direction orientation correlating with the motion of the ground tracking apparatus may allow for correlations in successive frames to be located in less time.

In some embodiments, a correction to distance in pixels may be used to account for time between when correlations are found in successive frames of a rolling shutter type imaging element. In such embodiments, the rolling shutter of imaging elements within a ground tracking apparatus may scan each scan line in a sequential order for a predetermine amount of time. For example, the imager 1900 of FIG. 19, may scan line $T_1$ for a period of time equal to $T_{Row}$ before scanning $T_2$ for the same period of time $T_{Row}$. This trend may continue from $T_1$ through $T_6$ scanning each successive line for a period of time equal to $T_{Row}$ prior to repeating the sequence back in the next frame at $T_1$. As used herein, the total time required to scan all lines within a frame may be defined as $T_{nom}$. Within successive frames in time, the location of correlating ground features may move between different scan lines within their respective frames. Such movement between scan lines within successive frames may increase or decrease the time in which each ground feature is found and therefore affect apparent distance the ground feature may have moved between frames and the apparent velocity by which the ground feature may have moved. Adjustments may be made to correct for such a time difference of such a rolling shutter effect. Turning again to FIG. 19, an initial ground feature location 1910 at scan line $T_2$ may be the location of a particular ground feature within a first frame. Ground feature location 1920 at scan line $T_s$ may be the location of the same ground feature found at initial ground feature location 1910 in a successive frame. As illustrated, there may be a measurement of $p_y$ along the vertical axis and $p_x$ along a horizontal axis of the ground feature from the initial ground feature location 1910 to the ground feature location 1920 in its successive frame. Because the initial ground feature location 1910 is at scan line $T_2$ in FIG. 19, the time interval between initial ground feature location 1910 of the first frame and the ground feature location 1920 in its successive frame may be one full frame cycle or $T_{nom}$ offset by a difference in the number of scan lines in time ($T_{Row}$) scaled by the magnitude of the distance in pixels along the axis perpendicular to the orientation of the scan lines ($p_y$ in FIG. 19). The resultant number may again be scaled by the distance in pixels along the axis perpendicular to the orientation of the scan lines to find the corrected time the ground feature may have moved during a complete frame cycle. Therefore, the corrected distance accounting for the time difference due to the rolling shutter effect between frames may be found by $$p_y\left(\frac{T_{nom}}{T_{nom} \pm |p_y| * T_{Row}}\right).$$

Figure 19:
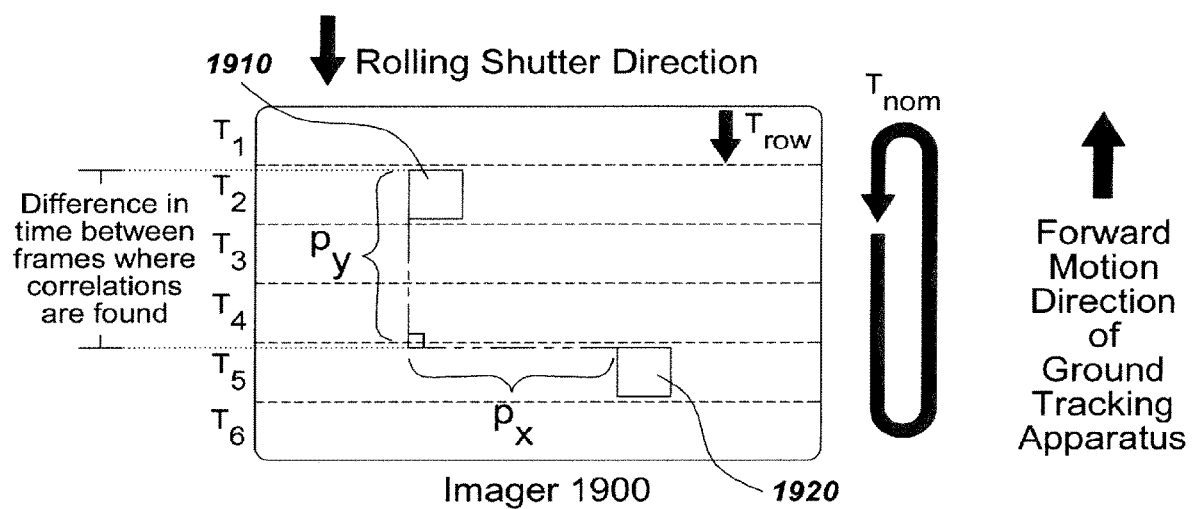
FIG. 19 is an illustration of embodiments of time adjustments for correlations in successive frames.

In embodiments where the movement of the ground tracking apparatus is contrary to the rolling shutter direction, such as with FIG. 19, this equation may be understood as $$p_y\left(\frac{T_{nom}}{T_{nom} + |p_y| * T_{Row}}\right).$$

In embodiments where the movement of the ground tracking apparatus is in the same direction to the rolling shutter direction, such as with FIG. 18, this equation may be understood as $$p_y\left(\frac{T_{nom}}{T_{nom} - |p_y| * T_{Row}}\right).$$

Turning back to FIG. 18, though the orientation of imager 1800 may be contrary to the intended orientation of imagers and/or other imaging elements as known in the art, such an orientation may be particularly advantageous in a ground tracking apparatus in keeping with the present disclosure. In a ground tracking apparatus with a rolling shutter type imaging element or elements oriented such that the movement of the apparatus correlates to the same relative direction as its rolling shutter direction, the time by which correlations may be found may be reduced versus other imaging element orientations. For example, in the successive frame of such an imaging element, the correlation of sample location 1820 may be found at location 1830 on scan line $T_2$. Because of the correlating of ground tracker apparatus movement and the direction of the rolling shutter, the time required to find the correlation at location 1830 may be less than the time required for a complete frame cycle. In other imaging element orientations, correlation may generally require time in excess of a complete frame cycle. In further embodiments with rolling shutter type imaging elements having vertically oriented scan lines, such calculations may be modified to compensate for a similar time offset of a rolling shutter effect. In such embodiments, $p_x$ may be substituted for $p_y$ in the corrected time equations and methods disclosed above.

Figure 20:
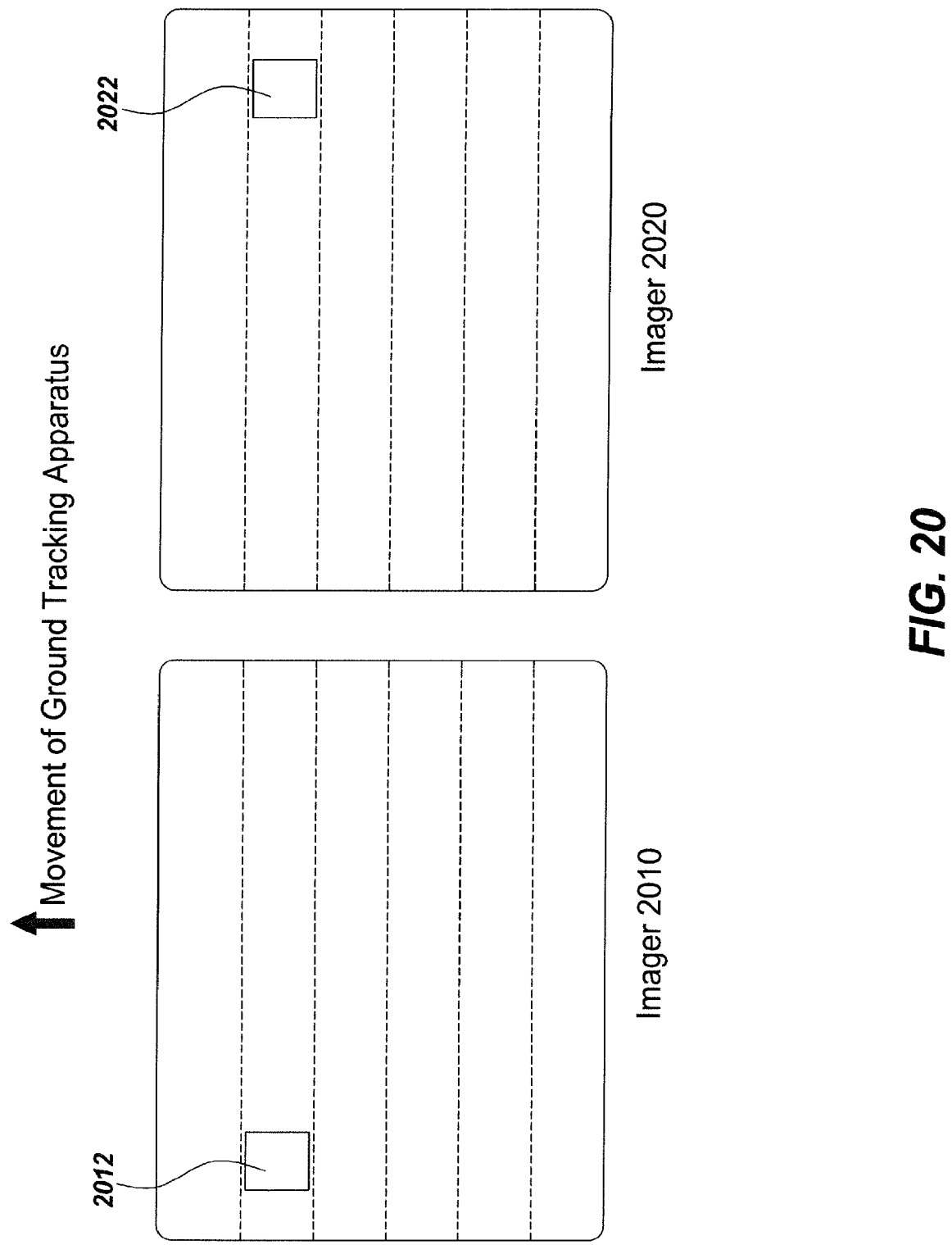
FIG. 20 is an illustration of an embodiment of a method for finding height using adjacent imaging elements with rolling shutters having horizontal scan lines.

In some embodiments, translational x/y movements about the ground's surface may only be calculated at one imager or other imaging element whereas height of the optical ground tracking device off the ground may be calculated by multiple imagers/imaging elements. Some such embodiments with a rolling shutter type imaging element having horizontally oriented scan lines may perform a search of correlating scan lines between frames of the separate imaging elements at the same point in time. As illustrated in FIG. 20, imager 2010 may have a sample location 2012 correlating to location 2022 along the same scan line in imager 2020. As these correlated locations 2012 and 2022 may be found along the same scan line, no adjustment for difference in time between scan lines may be necessary. A predictive method and/or overall exhaustive search of the frame need not but necessary. Instead, a search, which may be an exhaustive search, of the correlating scan line within each frame may be performed thus requiring fewer processing resources within the ground tracking apparatus.

Figure 21:
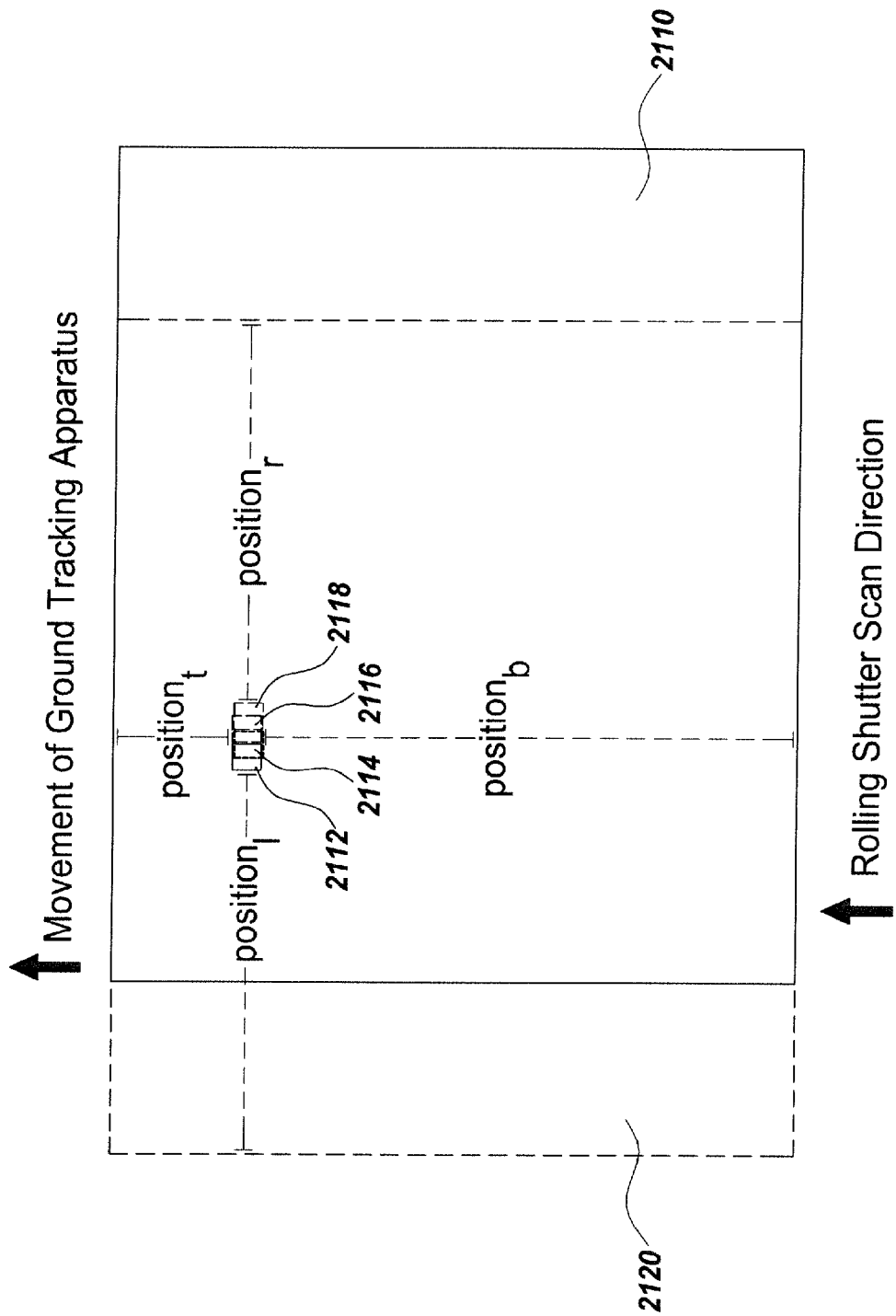
FIG. 21 is an illustration demonstrating example sample locations.

In various embodiments herein, chosen sample location(s) in one imaging element may be chosen to maximize possibility of finding correlations in both frames of adjacent imaging elements as well as successive frames within the same imaging element. As illustrated in FIG. 21, a right imager frame 2110 may have a number of sample locations 2112, 2114, 2116, and 2118 all found on a single scan line. The sample locations 2112-2118 within right imager frame 2110 may correspond to correlations within the left imager frame 2120 along a single scan line such that the position of sample locations 2112-2118 from the right edge of the frame, position$_r$, and left edge of the frame, position$_l$, may be equidistant. Furthermore, assuming a correlating forward rolling shutter direction and movement of the ground tracking apparatus, the sample locations 2112-2118 may be located further toward the top of each frame, position$_t$, than the bottom of each frame, position$_b$, to maximize probability of finding correlations in successive frames by compensating for intended movement of the ground tracking apparatus and direction of its rolling shutter. In other embodiments, different number of sample locations may be distributed in different positions along any number of scan lines in each frame. The sampling of locations along a single scan line, as illustrated in the embodiment of FIG. 21, may utilize fewer processing resources than those with sample locations on multiple scan lines.

Figure 22:
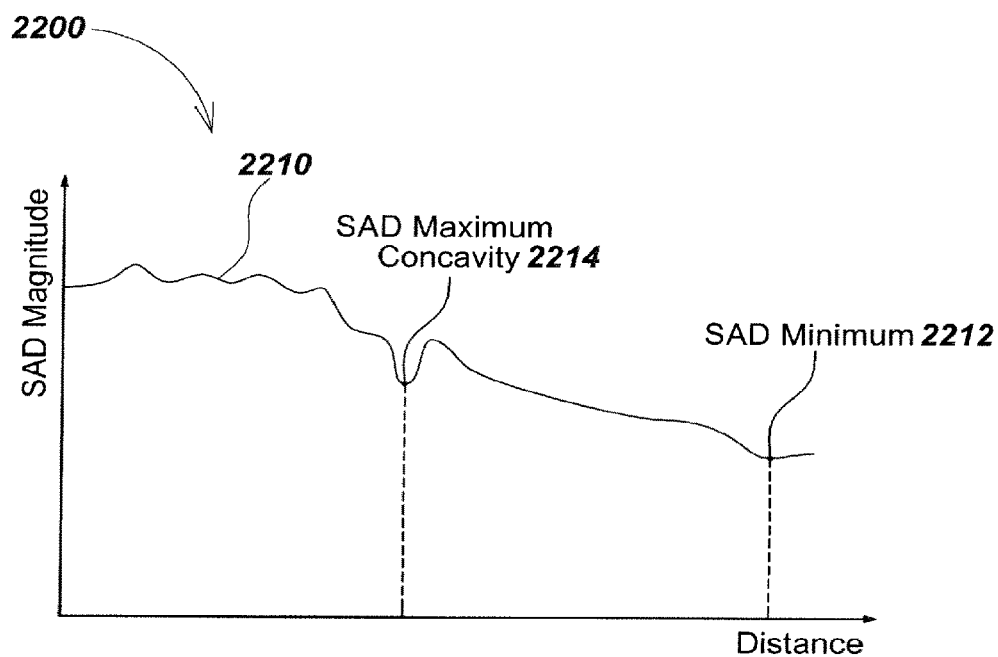
FIG. 22 shows a graph illustrating a SAD maximum concavity and SAD minimum.

In some ground tracking apparatus, system, and method embodiments herein, SAD results may be determined by the maximum concavity and/or the minimum SAD value. As illustrated in graph 2200 of FIG. 22, SAD result line 2210 from along a single scan line may have both a minimum SAD value 2212 as well as a maximum concavity 2214. In some embodiments, the minimum SAD value, such as the minimum SAD value 2212, may be used to find maximum correlations. In other embodiments, the maximum concavity, such as the maximum concavity 2214, may be used to determine maximum correlations between frames. Yet, in further embodiments, the maximum correlation may be the minimum SAD value 2212 and the confidence in such a result may be qualified by the degree of concavity of the SAD result line 2210 near the minimum SAD value 2212.

Within some embodiments, a SAD result's proximity to raster boundaries may be factored into the metric of confidence attributed to the SAD result. For example, within graph 2200 of FIG. 22, the SAD minimum 2212 may exist along a raster boundary on the edge of the SAD result line 2210. Various embodiments may choose sample locations to avoid having SAD results crossing raster boundaries between successive frames and/or correlation in frames collected by separate imaging elements at the same point in time. In some embodiments, SAD results crossing raster boundaries may be discarded. In other embodiments, less confidence may be attributed to SAD results near raster boundaries.

Figure 23A:
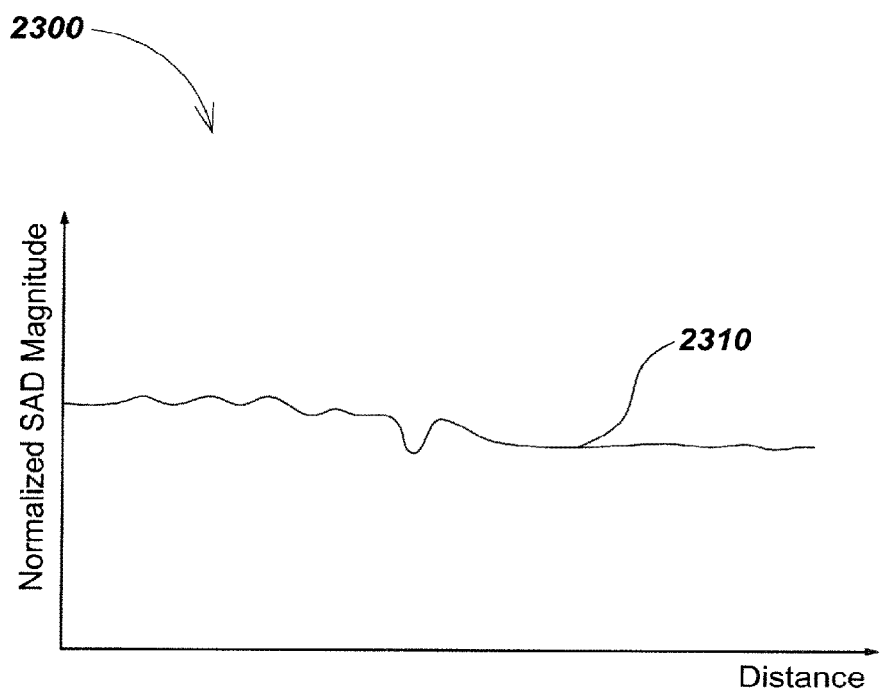
FIG. 23A shows a graph illustrating a normalized SAD line.
Figure 23B:
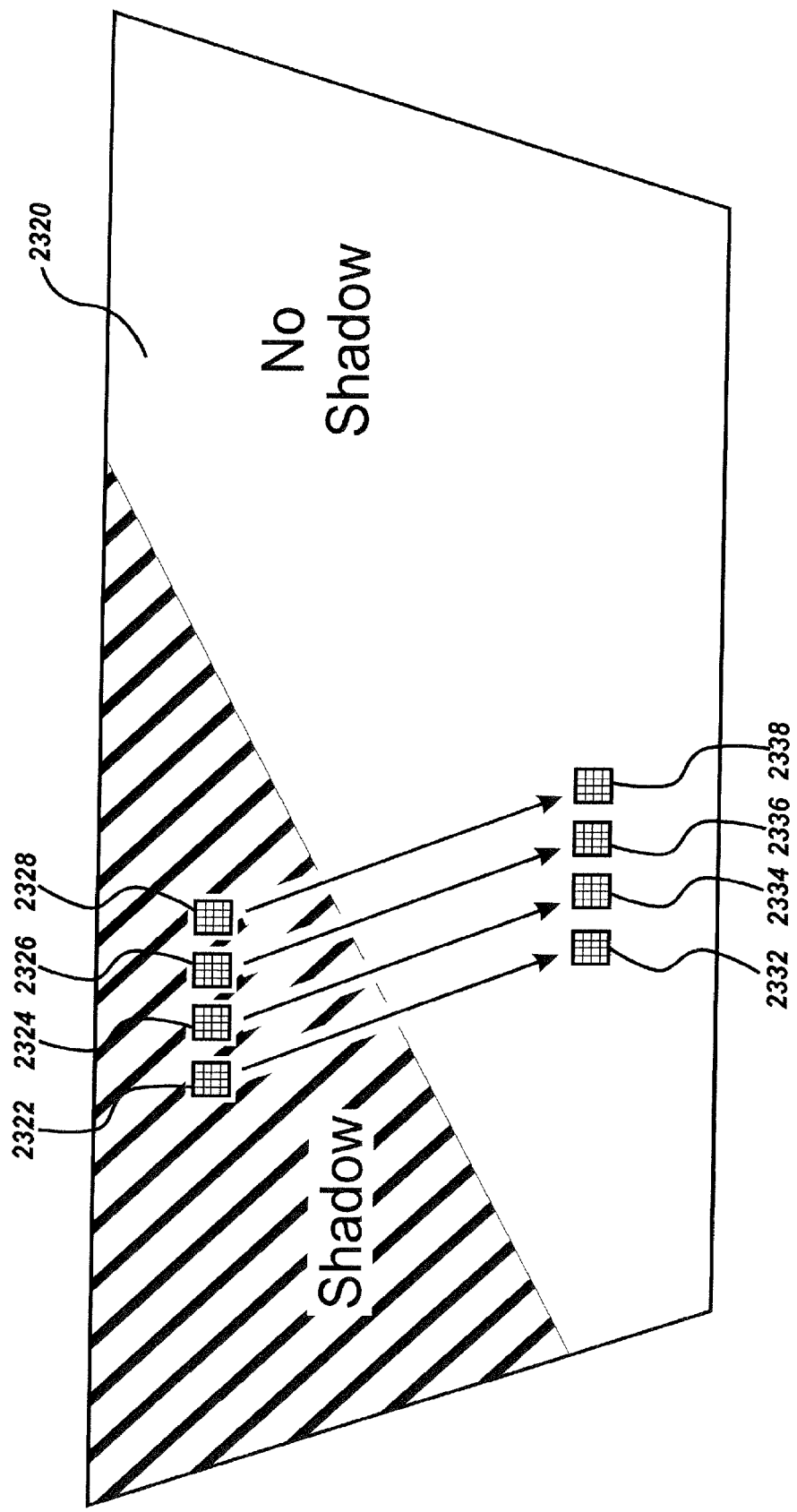
FIG. 23B illustrates an example combined frame with pixel blocks moving from areas of shadow to no shadow.

In some embodiments, SAD values may be normalized to compensate for factors such as differences in measured luminance between frames. As illustrated in graph 2300 of FIG. 23A, a normalized SAD line 2310 may scale all pixels and/or pixel blocks within each frame to compensate for luminance differences between frames. Locally Scaled Sum of Absolute Differences (LSAD), Locally Squared Sum of Squared Differences (LSSD), and/or various other methods may be used to normalize SAD results. Normalization, optionally coupled with a high dynamic range imaging elements, may be used to compensate moving shadows, such as those that follow along with the ground tracker apparatus cast by the apparatus itself or the individual operating the apparatus, and/or other differences in brightness between frames. For example, in the combined frame 2320 of FIG. 23B may sample pixel blocks 2322, 2324, 2326, and 2328 in the initial frame within shadow. In a successive frame, pixel blocks 2322, 2324, 2326, and 2328 may move from within shadow to correlating pixel block locations 2332, 2334, 2336, and 2338 within sunshine. The movement of pixel blocks between locations of different brightness may, in some instances, create false or inaccurate SAD values.

Within each pixel block of the successive frame, each individual pixel, $p_s$, may be scaled by the sum of total brightness measured within the reference pixel block in the initial frame, $b_i$, divided by the sum of total brightness measured within its pixel block in the successive frame, $b_z$, such that normalized SAD values may allow for the compared pixels used in the SAD algorithm to be found by $$p_s * \frac{b_i}{b_s}.$$

Scaling of brightness values, in some embodiments, may be achieved through bit shifting techniques rather than utilizing processor intensive calculation of scaling each individual pixel. For example, the brightness of one or both frames may be scaled up or down by a factor of two utilizing bit shifting until a brightness/luminance match may be found in the compared frames. In other embodiments, other normalization method and/or calculations may be used.

Figure 23C:
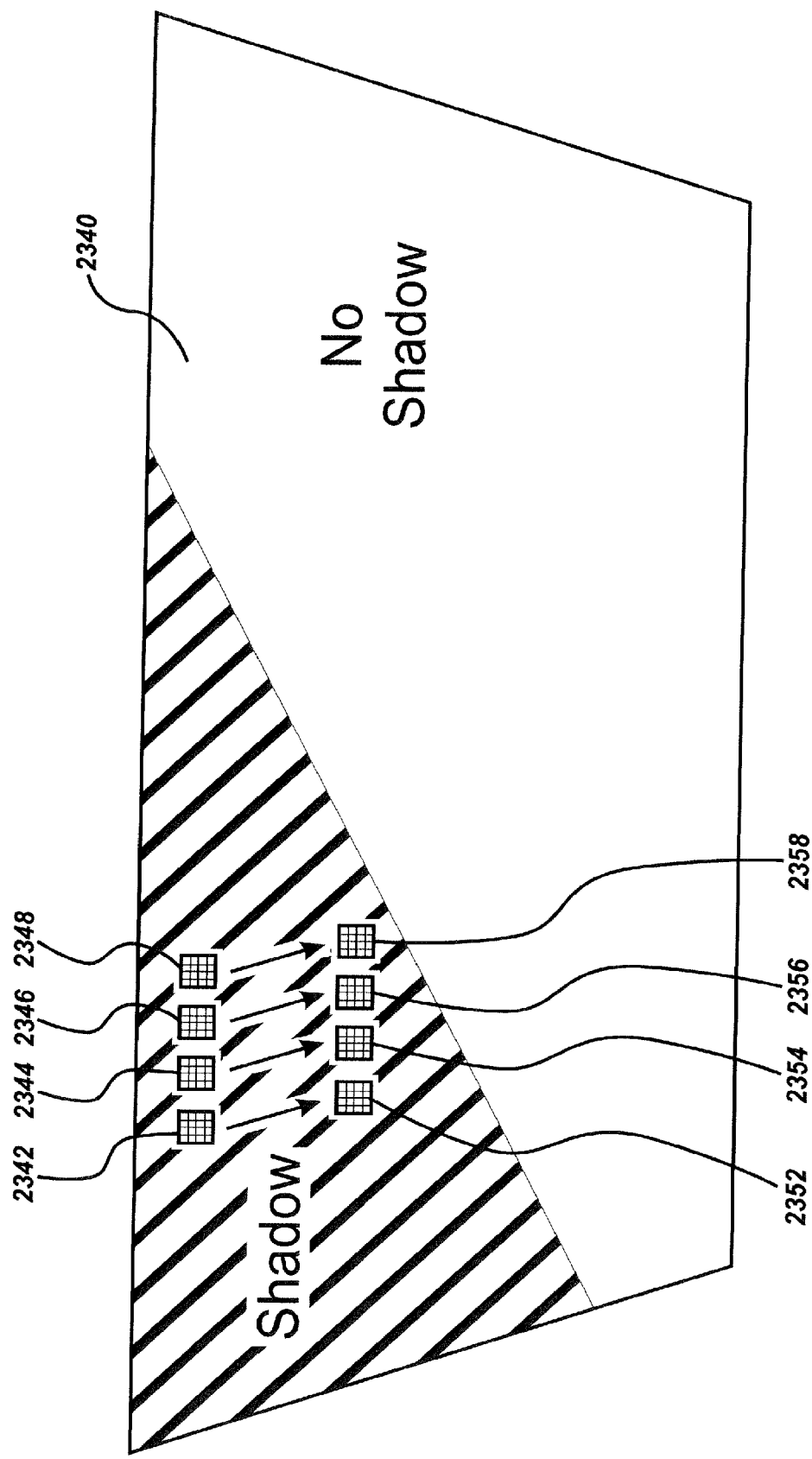
FIG. 23C illustrates a combined frame of increased frame rate keeping pixel blocks within regions of similar brightness.

In further embodiments, an increased frame rate may be used to compensate for shadows. As illustrated in combined frame 2340 of FIG. 23C, an increased frame rate may decrease the travel of pixel blocks 2342, 2344, 2346, and 2348 at the initial frame location to their correlating successive pixel block locations 2352, 2354, 2356, and 2358.

Figure 23D:
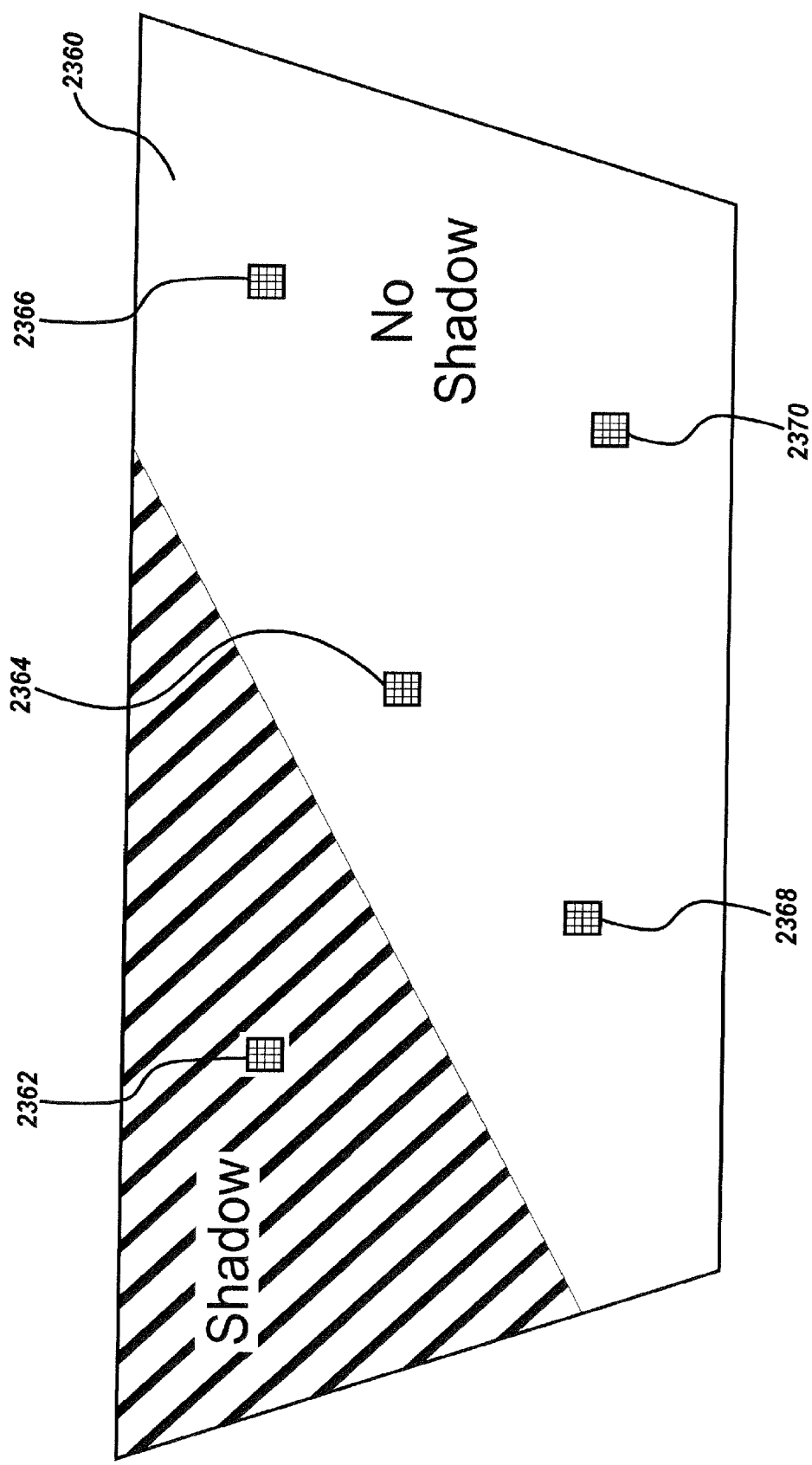
FIG. 23D illustrates a combined frame where an increased quantity of pixel blocks may be distributed more evenly throughout the frame.

In yet further embodiments, a wider distribution and/or increased number of sample locations within each frame may be used to compensate for brightness differences between frames. As illustrated in combined frame 2360 of FIG. 23D, sample locations 2362, 2364, 2366, 2368, and 2370 may be provide more coverage of the frame and allow for greater probability that pixel blocks may not travel between areas of brightness difference.

In yet further embodiments, illumination of the operating area may be provided by a ground tracking apparatus embodiment and/or other system devices. For example, one or more lights attached to a ground tracking apparatus and/or utility locator device may be used to illuminate the ground and thus lessen shadows or other brightness differences. Furthermore, the various techniques disclosed herein may be combined together to eliminate or lessen inaccuracies due to brightness differences.

Figure 24:
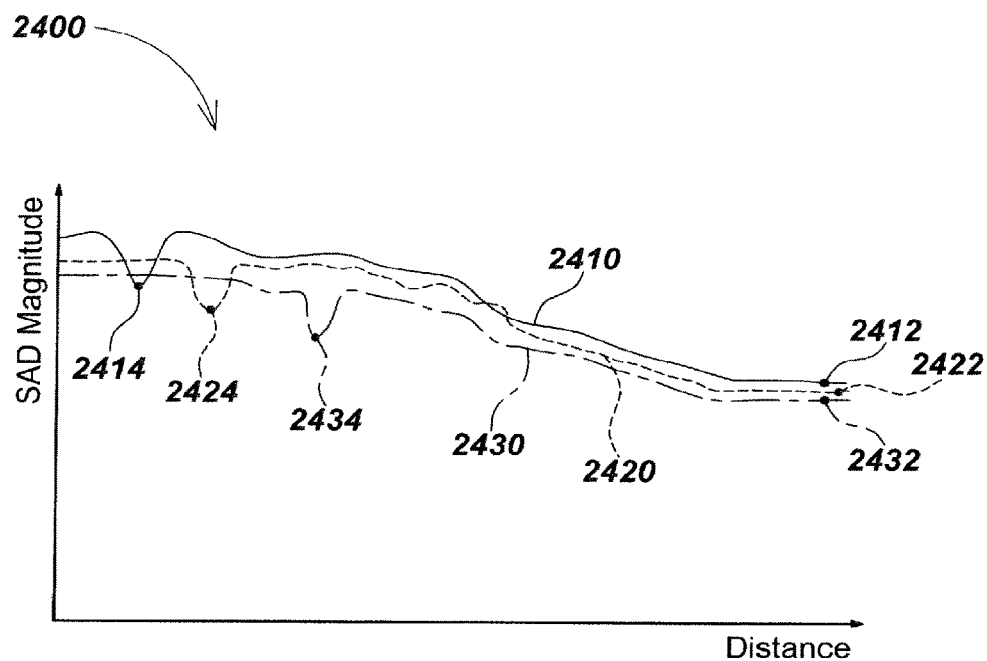
FIG. 24 shows a graph illustrating waveform stacking of multiple SAD result lines.
Figure 25:
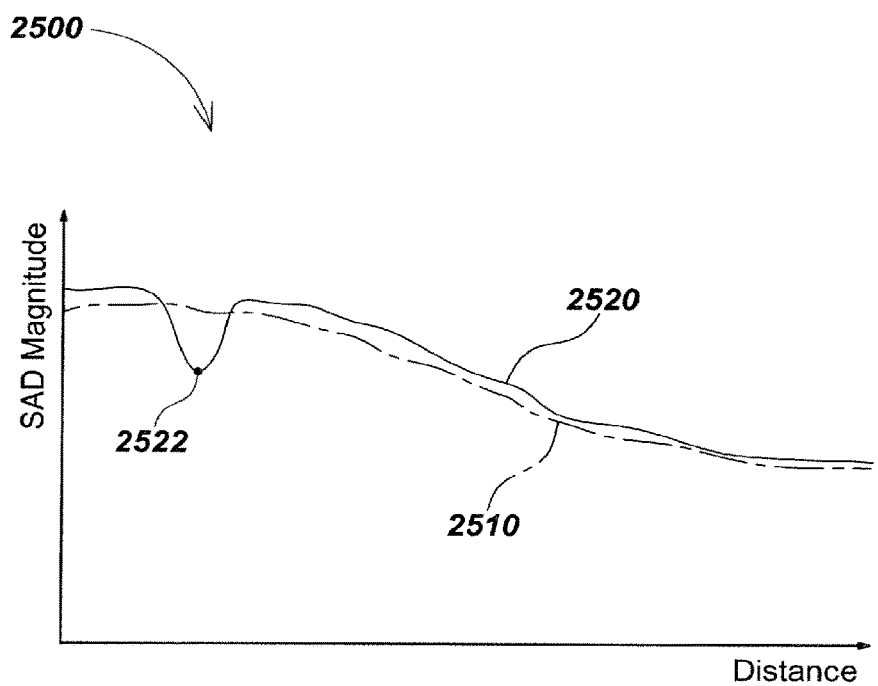
FIG. 25 shows a graph illustrating a comparison of a scaled line resulting from waveform stacking to a SAD result line.

In some normalizing methods, a waveform/image stacking may be applied along multiple SAD result lines. For instance, the graph 2400 of FIG. 24 may have SAD results lines 2410, 2420, and 2430. Each line 2410, 2420, and 2430 may have a corresponding minimum SAD result 2412, 2422, and 2432 as well as a different corresponding maximum concavity 2414, 2424, and 2434. Comparison of SAD result lines 2410, 2420, and 2430 may result in a scaled line. As illustrated in graph 2500 of FIG. 25, the scaled line 2510 may be compared again to a SAD result line 2520 to find a maximum correlated result 2522 as the point of greatest difference between the scaled line 2510 and SAD result line 2520.

Figure 26:
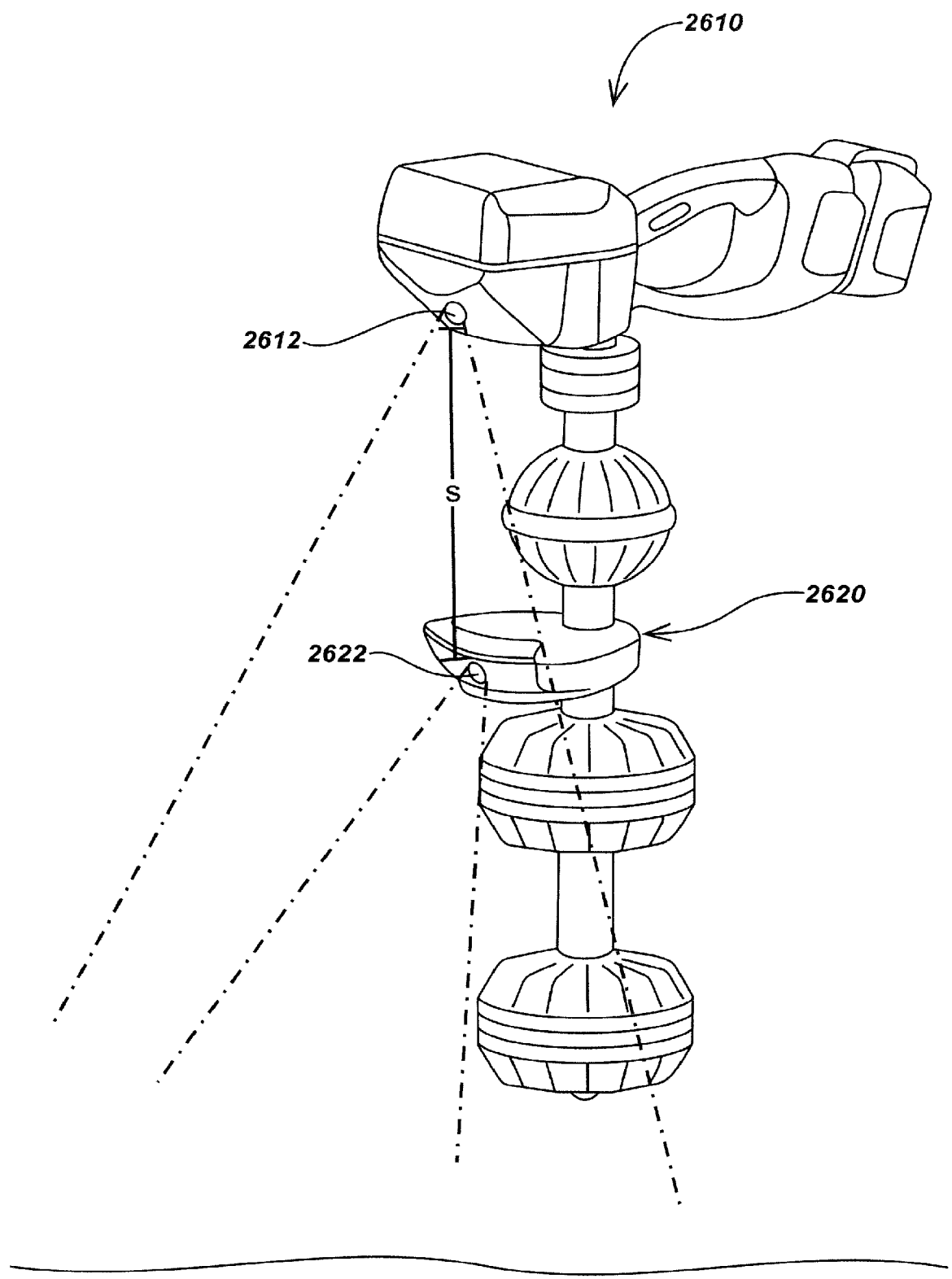
FIG. 26 illustrates an embodiment of a ground tracking apparatus with imaging elements at different heights on a utility locator device.

In various embodiments in accordance with the disclosures herein, imaging elements may be oriented in different ways. For example, within FIG. 26 a utility locator device 2610 with imaging element 2612 may have a ground tracking apparatus 2620 secured thereto having at least one imaging element 2622. Measurement of the spatial separation between imaging element 2612 on the utility locator device 2610 and imaging element 2622 on ground tracking apparatus 2620 in three dimensions may be used in conjunction with imagery collected by the imaging elements 2612 and 2622 to further measure movement about the ground surface using the various methods disclosed herein.

Figure 27A:
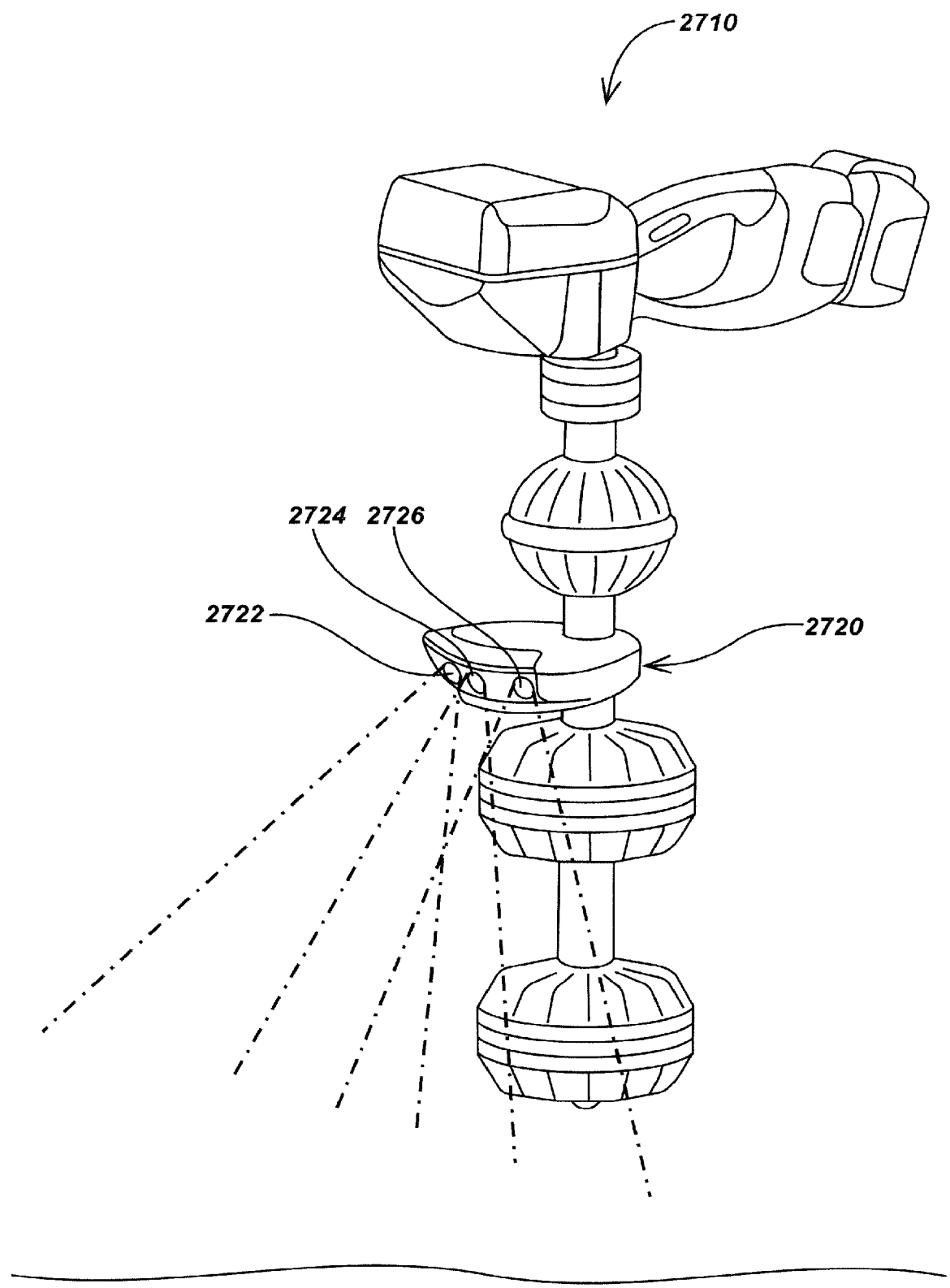
FIG. 27A illustrates a multi-imaging element ground tracking apparatus embodiment disposed on a utility locator device.
Figure 27B:
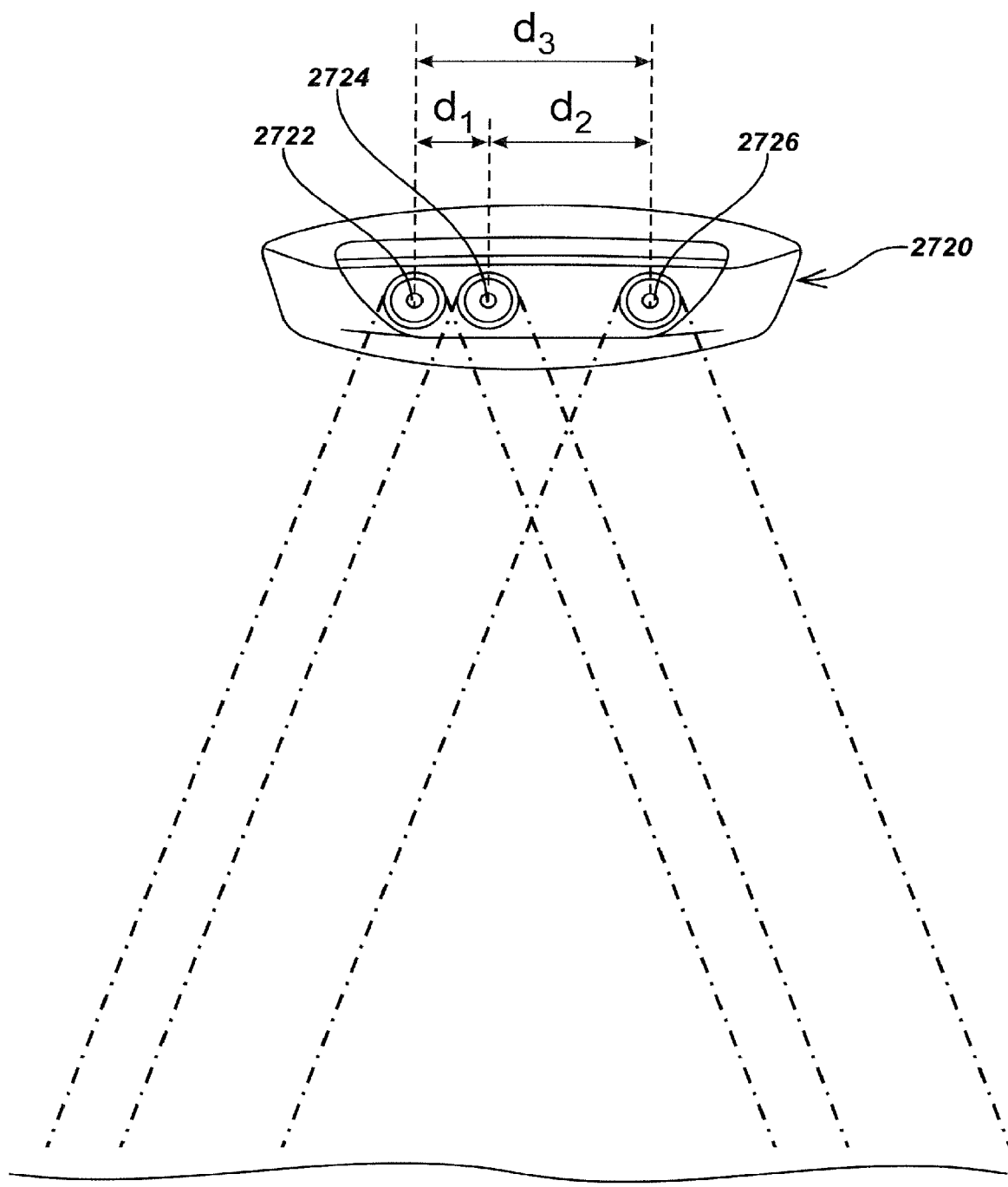
FIG. 27B illustrates the multi-imaging element ground tracking embodiment of FIG. 27.

Some embodiments may utilize a different number of imaging elements than the two imaging elements shown in previous ground tracking apparatus embodiments. For example, in FIG. 27A a utility locator device 2710 may have a connected ground tracking apparatus 2720. Ground tracking apparatus 2720 may have three imaging elements 2722, 2724, and 2726. As best illustrated in FIG. 27B, the spacing between imaging elements 2722, 2724, and 2726 may be located at different spacing such that one imaging element may be offset from the others creating multiple stereo baselines of different lengths. Such embodiments may be advantageous in measuring motion over surfaces with patterns where differences in such patterns may be difficult to determine at certain altitudes. For example, a large baseline, such as $d_3$ of FIG. 27B, may allow for better height determining resolution whereas a narrow baseline, such as $d_1$ of FIG. 27B, may be accurate in a scenario where the imaging elements must handle large height disparities. Furthermore, the multiple different sized stereo baselines in such embodiments may advantageously allow for selection of optimal baseline depending on use of the ground tracking apparatus embodiment.

Figure 28:
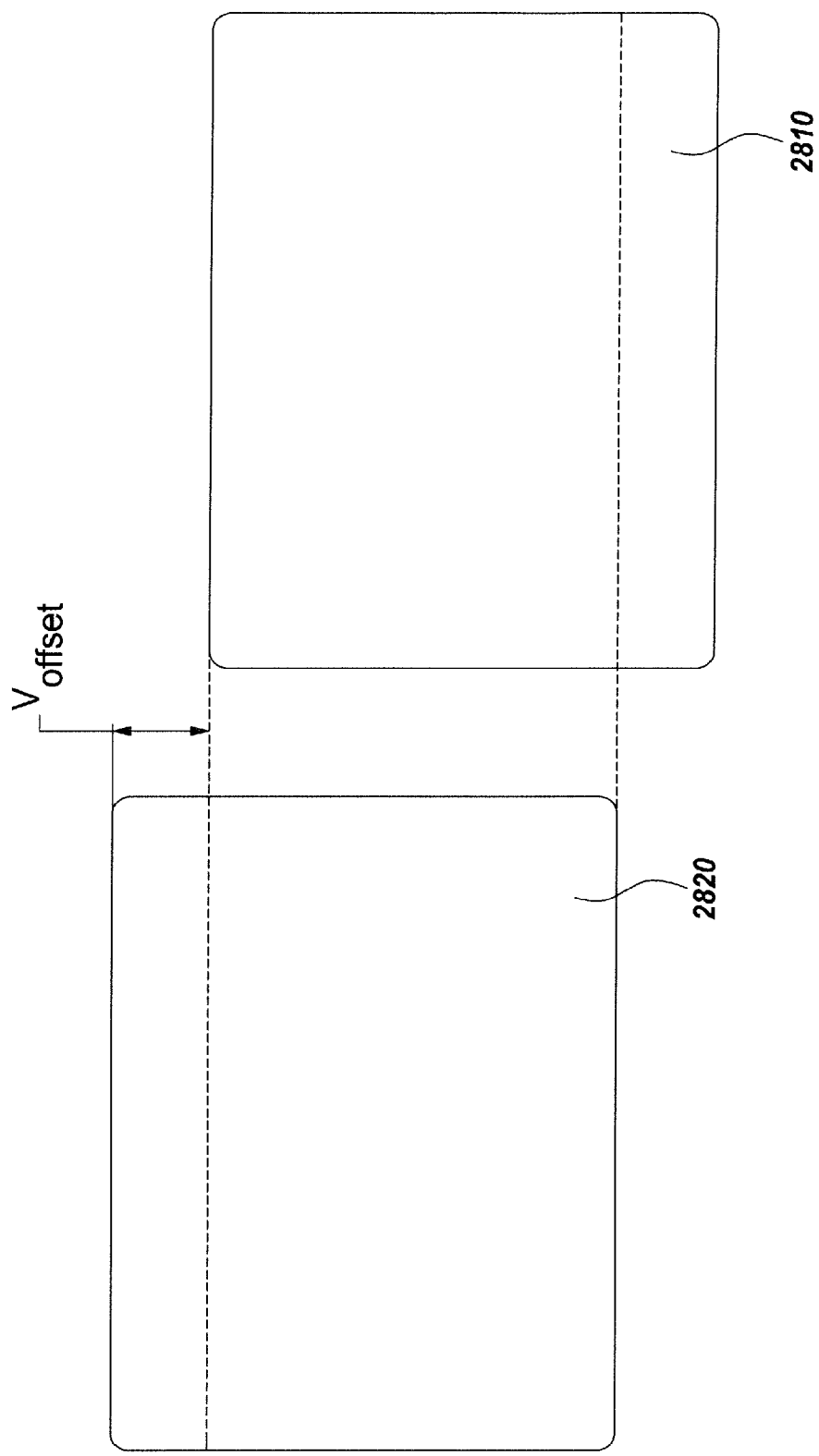
FIG. 28 is an illustration demonstrating an embodiment of vertical offset calibration.

In various embodiments in accordance with the disclosures herein, one or more calibration methods may be used to enhance accuracy of correlations found. For example, adjacent imaging elements may be subject to vertical misalignment due to manufacturing tolerances of the imaging elements. As one example, manufacturing tolerances of soldering of an imager onto a PCB may create such a vertical misalignment. As illustrated in FIG. 28, adjacent imaging elements 2810 and 2820 may be subject to such a vertical misalignment. In such embodiments, a vertical offset, $v_{offset}$, may be calculated and used to ensure a synchronization of horizontal scan lines between imaging elements 2810 and 2820.

Figure 29:
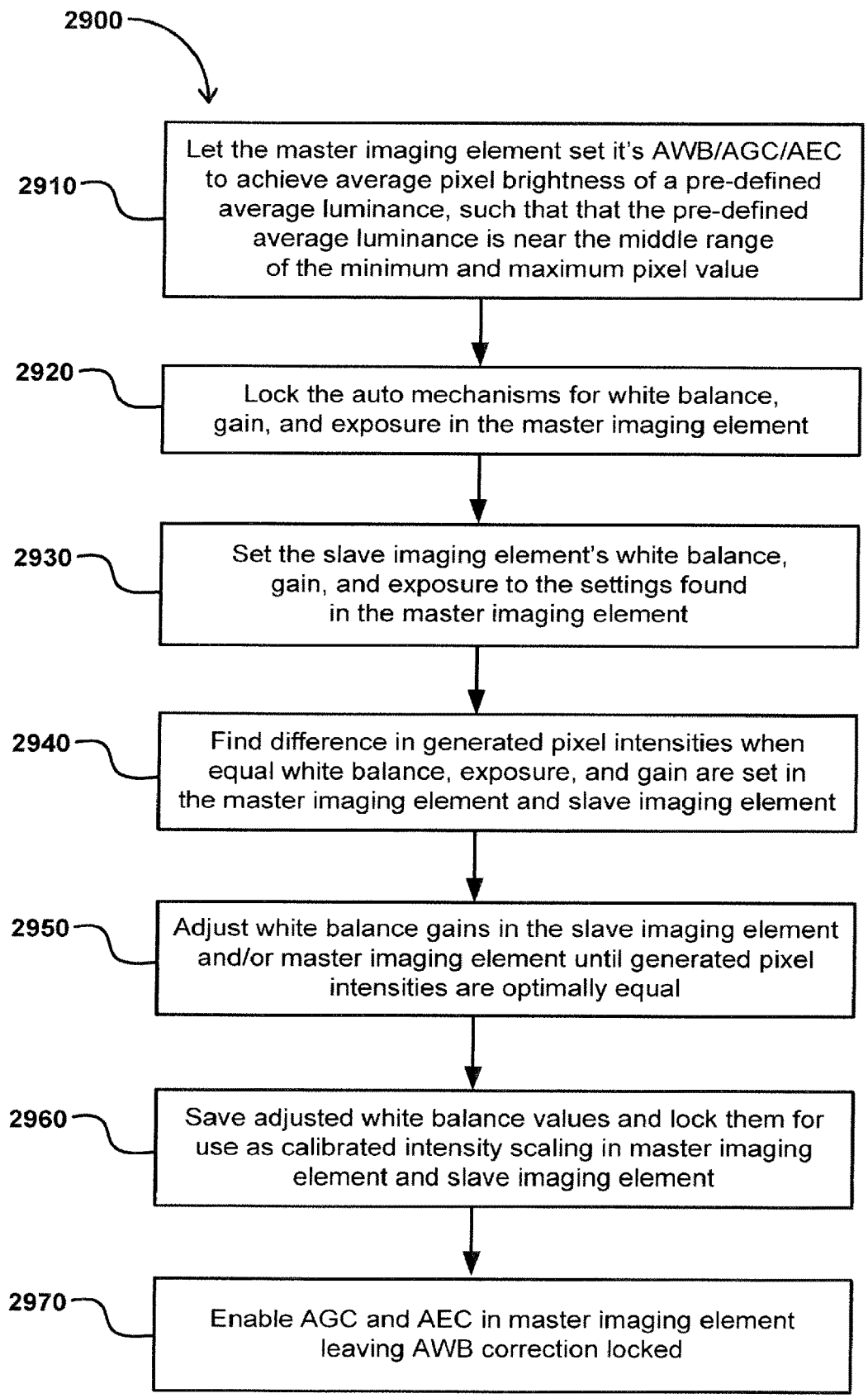
FIG. 29 illustrates an embodiment of a method for calibrating imaging element sensitivity.

In various embodiments in accordance with the disclosures herein, a calibration method embodiment 2900 may be used to calibrate sensitivity of imaging elements. In this method, a ground tracking apparatus may have one imaging element considered the master imaging element and one or more slave imaging elements. As illustrated in FIG. 29, in step 2910 a master imaging element may set it's automatic white balance (AWB), automatic gain control (AGC), and automatic exposure control (AEC) to achieve average pixel brightness of a pre-defined average luminance, such that the pre-defined average luminance is near the middle range of the minimum and maximum pixel value. In step 2920, the auto mechanisms for white balance, gain, and exposure may be locked within the master imaging element. In step 2930, the slave imaging element's white balance, gain, and exposure may be set to the settings found in the master imaging element. In step 2940, difference in generated pixel intensity is found when equal white balance, exposure, and gain are sit in the master imaging element and slave imaging element. In step 2950, adjustments to the white balance gains within the slave imaging element until generated pixel intensities are optimally equal. In step 2960, the adjusted white balance values may be saved and locked for use as calibrating intensity in master and slave imaging elements. In a final step 2970, AGC and AEC are enabled in the master imaging element leaving AWB correction locked.

Figure 30:
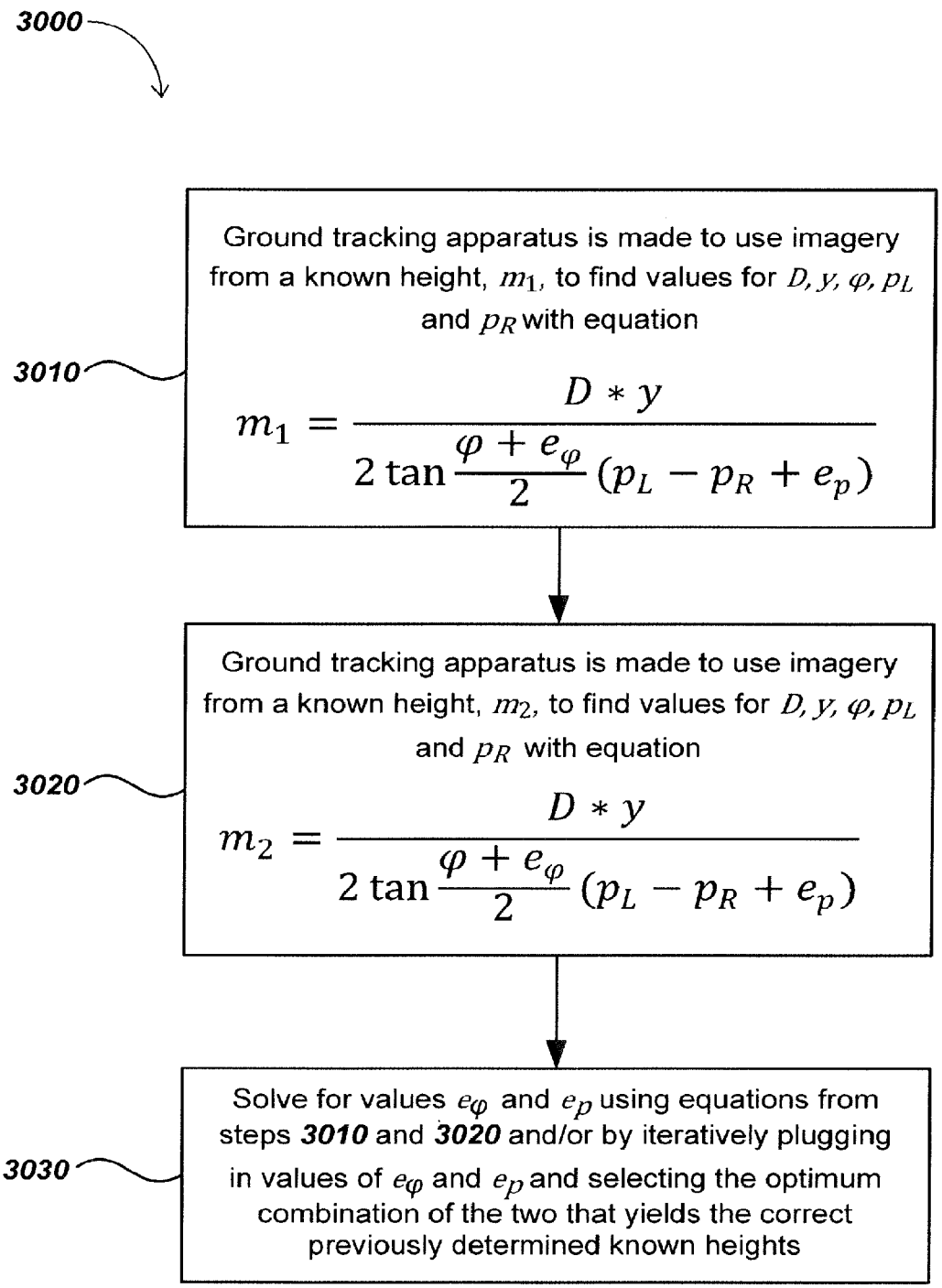
FIG. 30 illustrates an embodiment of a calibration method for calibrating image circle and lens position offsets.

In some embodiments, a calibration method embodiment 3000 as illustrated in FIG. 30 may be used to compensate for both image circle offsets and lens position offsets. Such offsets may be due to misalignment of a lens relative to the imager in manufacture. For example, in manufacture, a misalignment of the lens about the imager may cause a lens position offset. As used herein, a lens position error offset value may be referred to as $e_p$. Similarly, an image circle offset may occur when manufacturing tolerances of the lens create differences in field of view. As used herein, an image circle error offset value may be referred to as $e_\varphi$.

The method 3000, as disclosed herein, utilizes the terms and variables defined as well as the equations associated with previous FIG. 8A. In particular, the equation $$m = \frac{D*y}{2\tan\frac{\varphi}{2}(p_L - p_R)}$$

may be carried into method 3000 and rewritten as $$m = \frac{D*y}{2\tan\frac{\varphi + e_\varphi}{2}(p_L - p_R + e_p)}$$

to account for the offset errors $e_\varphi$ and $e_p$. The method 3000 of FIG. 30 may include step 3010 where ground tracking apparatus is made to use imagery a known height, $m_1$, to find values for D, y, $\varphi$, $p_L$, and $P_R$. In step 3010, the equation $$m_1 = \frac{D*y}{2\tan\frac{\varphi + e_\varphi}{2}(p_L - p_R + e_p)}$$

may be left with only to unknown values, $e_\varphi$, and $e_p$. In step 3020, the ground tracking apparatus may made to use imagery at a second known height, $m_2$, to find values for D, y, $\varphi$, $p_L$, and $P_R$. In step 3020, the equation $$m_2 = \frac{D*y}{2\tan\frac{\varphi + e_\varphi}{2}(p_L - p_R + e_p)}$$

may again be left with only to unknown values, $e_\varphi$ and $e_p$. In a third and final step 3030, values for $e_\varphi$ and $e_p$ may be determined by solving for equations at steps 3010 and 3020 and/or by iteratively plugging in values of $e_\varphi$ and $e_p$ and selecting the optimum combination of the two that yields the correct previously determined known heights.

A method to improve accuracy of a ground tracking apparatus moving at slow speeds may be used in some embodiments. In some such embodiments, due to the nature of SAD calculations and/or other block matching methods, an aggregate error for calculating apparatus movements may occur. For example, a ground tracking apparatus moving at a fraction of a pixel per frame may be determined to have either moved an entire pixel's distance or to not have moved at all due to rounding up or down of the apparent movement calculated in each frame. Over time, rounding of fraction pixel movements due to movements of the ground tracking apparatus at slow (e.g. fraction of a pixel per frame) speeds may add up and the result in inaccuracies in total movement calculated over time. Such a method for calculating a corrected movement of a ground tracking apparatus may do so by determining a slow apparent movement of a ground tracking apparatus over a number of cycles of frames and adjust the number of frames that may be allowed to lapse in between movement calculations rather than calculating these movements on a frame by frame basis.

Figure 31:
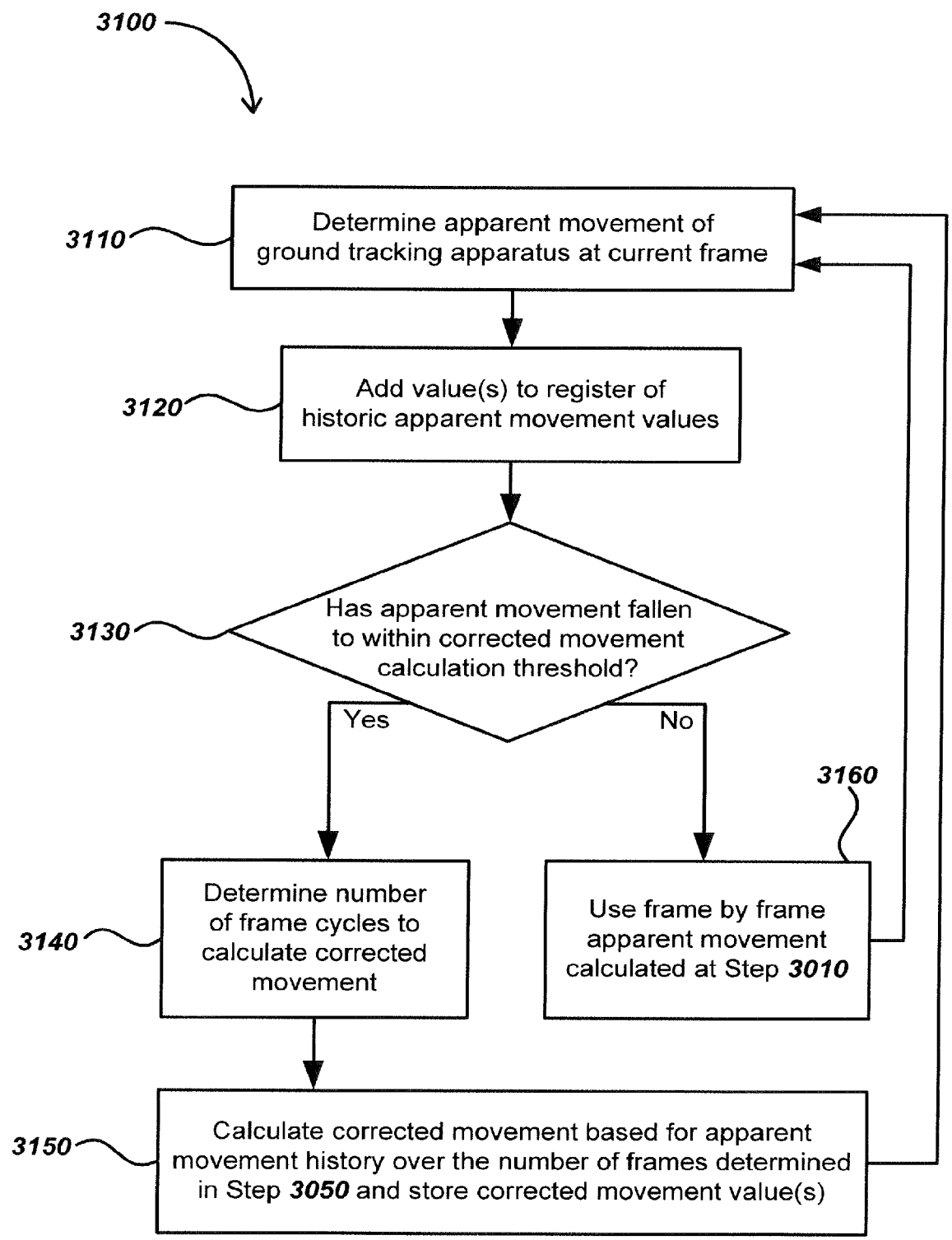
FIG. 31 illustrates an embodiment of adjusting a number frame cycle between movement calculations to adjust for slow moving ground tracking apparatus implementations.

The method embodiment 3100 of FIG. 31 may be one such method to increase the accuracy of a ground tracking apparatus when moved at slow speeds. In method 3100 step 3110 may include calculating apparent movement at the current frame(s). Such calculations may use SAD correlations, other black matching methods, and/or other methods disclosed herein. In step 3120, values determined in step 3110 may be stored within a register of historic apparent movement values. In step 3130, a decision may be made as to whether the history of apparent movements has fallen within a corrected movement calculation threshold. For example, a ground tracking apparatus may calculate an apparent movement of a single pixel or less per frame over two or more frame cycles. As the apparent movement may include rounding of values, the actual movement of the ground tracking apparatus may be different than the apparent movement determined.

In the various embodiments herein, the criteria by which a corrected movement calculation threshold may be defined may include any number and values of calculated apparent movements over any number of frame cycles. If it has been determined that apparent movement history has fallen to within the corrected movement calculation threshold of step 3130, in step 3140 the number of frame cycles by which to calculate a corrected movement may be determined. For example, this may equal the number of frame cycles total where the apparent movement has fallen to within the corrected movement calculation threshold. In other embodiments, the number of frame cycles in step 3140 may be a predetermined number and/or be determined by other criteria. In step 3150, a corrected movement value may be calculated based in the apparent movement history over the number of frames determined in step 3050. The corrected movement values may be stored and used as the calculated movement of the ground tracking apparatus. For example, the corrected movement may be calculated using the distance found in a first frame to that correlating in the last frame of step 3140. In some embodiments, an averaging of apparent movements over the number of cycles from step 3140 may be used to determine corrected movement values. In yet other embodiments, other criteria and methods may be used in step 3150 to determine correct movement. Following step 3150, the method 3100 may again repeat starting back at step 3110.

Turning back to step 3130, if it has been determined that apparent movement history has not fallen to within the corrected movement calculation threshold, in step 3140 the apparent frame by frame movements calculated in step 3110 may be used as the correct movement of the ground tracking apparatus. Following step 3110, the method 3100 may again repeat starting back at step 3110. Values at steps 3150 and/or 3160 may, in some cases, be corrected in subsequent iterations of method 3100 if an apparent movement history that may include these values is later determined to fall within the corrected movement calculation threshold.

In the various embodiments herein, calculations of height of a ground tracking apparatus in keeping with the present disclosure may advantageously be made from the same correlating pixel blocks, sample locations, and/or other correlating ground feature as the calculations of translation movement of the ground tracking apparatus across the ground surface on a vector by vector basis. As illustrated in FIG. 32A, a ground tracking apparatus at an initial location 3210 may have at least one pixel block 3212 of correlating pixels between its right frame 3220 and left frame 3230. The height of the ground tracking apparatus at initial location 3210 may be notated as $h_1$. The same ground tracking apparatus at a secondary location 3240 at a later time corresponding to successive frames 3250 and 3260 to that of frames 3220 and 3230 of the ground tracking apparatus at initial location 3210, may also have a pixel block 3242 corresponding to pixel block 3212. The height of the ground tracking apparatus at secondary location 3240 may be notated as $h_2$. The translation of pixel block 3212 at the initial location 3210 to pixel block 3242 at the initial location 3240 may be notated as $\vec{t}$. In a related method 3200 in FIG. 32B, a first step 3275 may include finding height $h_1$ based on correlating pixel block 3212 found in overlapping frames 3220 and 3230 of adjacent imaging elements within ground tracking apparatus at initial frame location 3210 using various methods disclosed herein. In some ground tracking apparatus embodiments having horizontally oriented rolling shutters, the calculation of $h_1$ may be found on the same scan line as described with FIG. 20. In other embodiments, any of the method for calculating height as disclosed herein may be used to determine $h_1$. Within method 3270 of FIG. 32B, step 3280 may include finding translation $\vec{t}$ of pixel block 3212 within at least one of the first frames 3220 and/or 3230 to correlating pixel block 3242 within successive frame or frames 3250 and/or 3260 within at least one imaging element of the ground tracking apparatus at secondary frame location 3240. In the exemplary ground tracking apparatus embodiments having horizontally oriented rolling shutters, correction to pixel distances between successive frames, such as that described in connection with FIG. 19, may be used. In other embodiments, any of the method embodiments for calculating movement about the grounds surface herein may be used to calculation translation $\vec{t}$. Within method 3270 of FIG. 32B, a final step 3285 may include using the location of pixel block 3242 found in second frame 3250 and/or 3260 to find correlating pixels in frame of adjacent imaging element 3260 or 3250. Find height $h_2$ based on correlating pixel block 3242 found in overlapping frames 3250 and 3260 of adjacent imaging elements within ground tracking apparatus at initial frame location 3210 using various methods disclosed herein. In the exemplary ground tracking apparatus embodiments having horizontally oriented rolling shutters, the calculation of $h_2$ may be found on the same scan line as described with FIG. 20. In other embodiments, any of the method for calculating height as disclosed herein may be used to determine $h_2$. The method 3260 may repeat as needed for successive frames. In such embodiments, calculating both height and translational movements off of the same correlating points and/or pixel groupings, the ground tracking apparatus herein may benefit from increased accuracy. In other method embodiments, height calculation may only be carried out in a first or subsequent frame. Some embodiments may further average height calculations over two or more successive frames.

Figure 33:
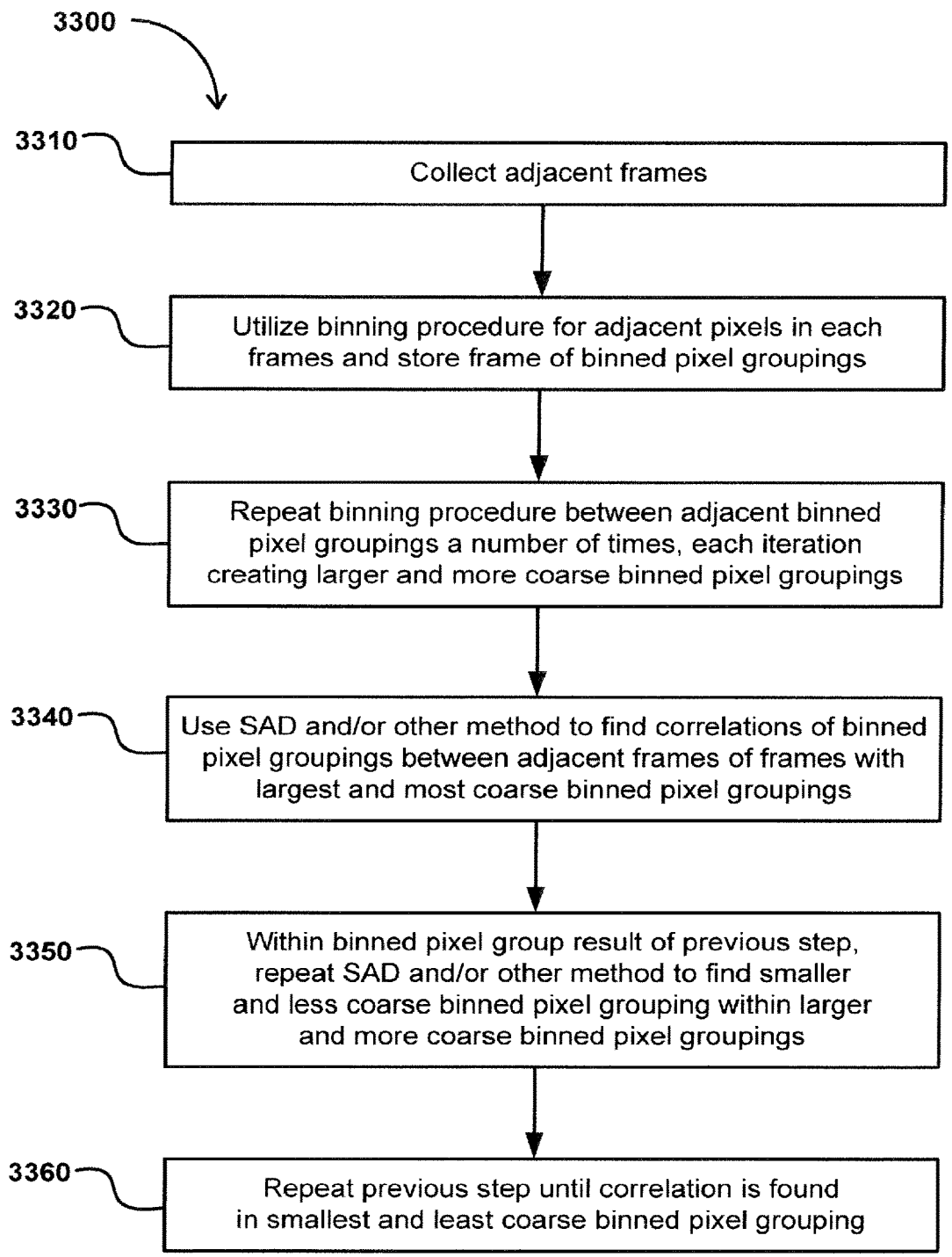
FIG. 33 illustrates an embodiment of a binning search method for finding correlations between frames.

In some embodiments, a binning search method may be employed to iteratively focus in on location of greatest correlations between frames. In method embodiment 3300 of FIG. 33, step 3310 may include collecting adjacent frames. These frames may either be frame adjacent imaging elements collected at the same point in time or successive frames taken by an imaging element at different times. In step 3320, a binning procedure may be used on adjacent pixels in each frame. The resultant frames of binned pixel groupings may further be stored. In step 3330, the binning procedure of the prior step is repeated through adjacent binned pixel groupings a number of times.

Each iteration of the binning procedure may produce larger and more coarse binned pixel groupings. The resultant frame from each iteration of the binning procedure may be stored. In step 3340, starting with frames containing the largest and most coarse binned pixel grouping, SAD and/or other method disclosed herein may be used to find correlations of binned pixel groupings between adjacent frames. In step 3350, within the binned pixel grouping result found in the prior step, SAD and/or other method may be used to find smaller and less coarse binned pixel grouping within the larger and more coarse binned pixel grouping. In step 3360, the prior step is repeated until correlation of the smallest and least coarse binned pixel grouping is found.

Figure 34:
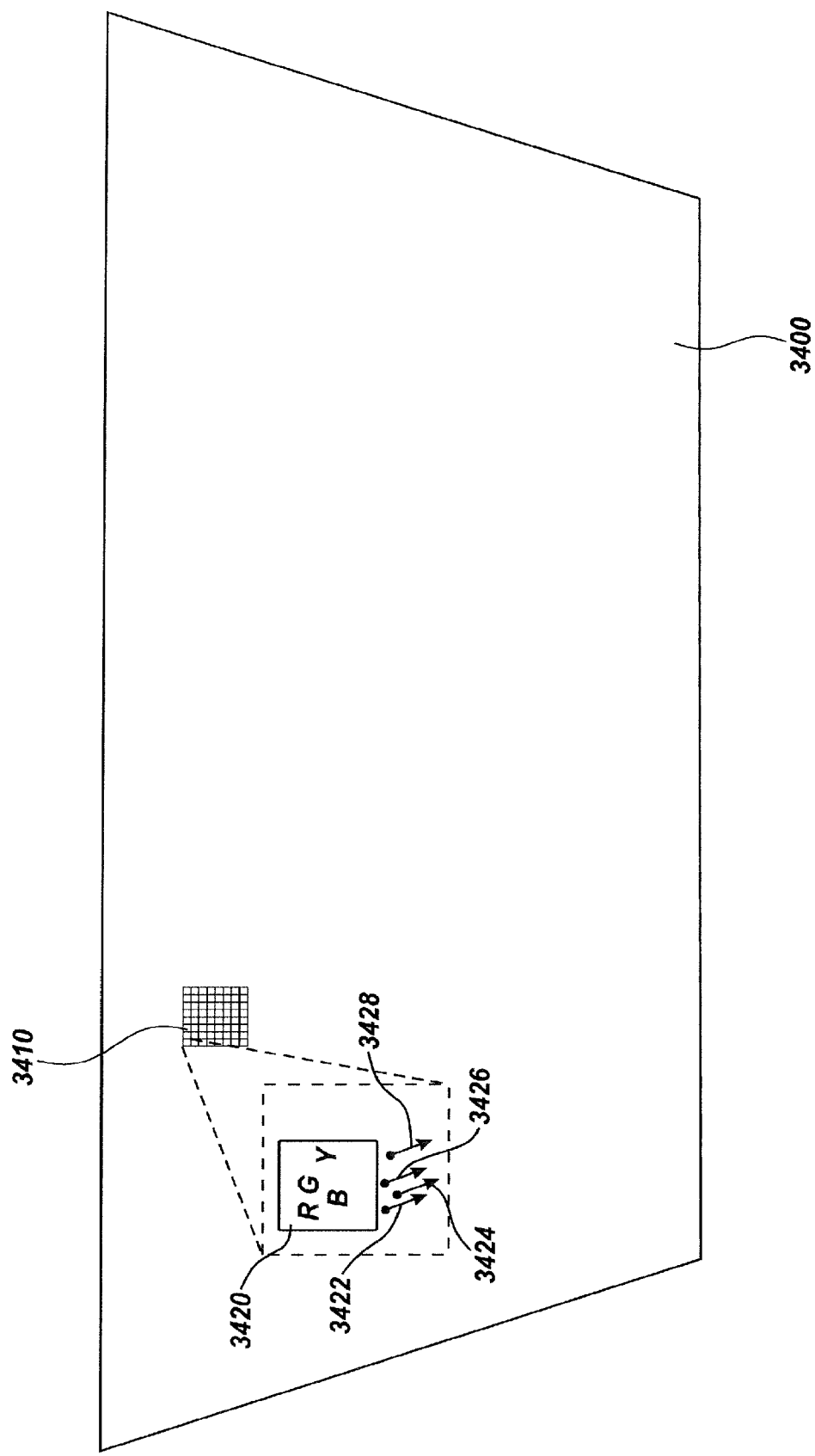
FIG. 34 illustrates details of an embodiment of a method for calculating vectors for each RGB and luminance value.

Within successive and/or adjacent frames, vectors may be calculated based on various components, such as color and/or luminance, at each pixel. For example, as illustrated in the combined frame 3400 of FIG. 34, a pixel block 3410 having a number of individual pixels, such as pixel 3420, may further have a number of color components R (red), S (green), and B (blue) and a luminance component Y. Vectors 3422, 3424, 3426, 3428 based on movement of pixel 3420 of pixel block 3410 between successive frames of the combined frame 3400 may be calculated using the various methods disclosed herein. Though color interpolated RGB plus luminance values are used in the exemplary illustration of FIG. 34, other componentized pixel values may be used. For example, Bayer values, chroma-luminance values, and/or other componentized values within a single pixel may be used to create separate vectors between adjacent frames. In some embodiments, component values at each pixel may be used to determine overall confidence in pixel block correlations between frames. In other embodiments, individual component vectors may be used for calculating movements between frames and/or heights based on correlations between frames. In yet further embodiments, the most relevant or best values from component vectors may be used.

The method embodiments disclosed herein may further be adapted to other devices and systems utilizing imagers and imaging elements. For example, unmanned aerial vehicles, ROVs, drones, and other devices with multiple cameras and/or other imaging elements may utilize the apparatus and methods herein to determine movement about the ground's surface and/or elevation above the ground. Furthermore, the devices described herein may also utilize cameras and imaging elements to collect imagery for purposes other than determining movement and elevation from the ground. For example, photographing and/or collecting video of an area which may further be used in mapping applications make likewise be done in addition to the disclosures herein in some embodiments.

In some configurations, the apparatus, circuit, modules, or systems described herein in ground trackers and locators or other devices may include means for implementing features or providing functions described herein. In one aspect, the aforementioned means may be a module comprising a processing element including a processor or processors, associated memory and/or other electronics in which embodiments of the invention reside, such as to implement signal processing, switching, transmission, or other functions to process and/or condition transmitter outputs, locator inputs, and/or provide other electronic functions described herein. These may be, for example, modules or apparatus residing in buried object transmitters, locators, coupling apparatus, and/or other related equipment or devices.

In one or more exemplary embodiments, the electronic functions, methods and processes described herein and associated with ground trackers and locators and other devices may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise. In addition, specific steps or stages may be omitted in additional embodiments and/or additional steps or stages may be added to those described herein.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in a processing element in RAM memory, flash memory, ROM memory, EPROM memory, EEPROM memory, registers, hard disk, a removable disk, a CD-ROM, or any other form of non-transitory data storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a processing element in a device such as a ground tracker. In the alternative, the processor and the storage medium may reside as discrete components.

The present invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosures herein. Thus, the present invention is not intended to be limited to the aspects shown herein, but is to be accorded the widest scope consistent with the appended claims and their equivalents.

We claim:

1. A buried utility locator including multi-camera ground tracking, comprising:
   a buried utility locator including:
   a magnetic field antenna array comprising a plurality of antennas positioned substantially vertically along a locator mast for receiving magnetic field signals from one or more buried utilities and providing corresponding antenna output signals;
   a receiver for receiving the antenna array output signals and determining information associated with the one or more buried utilities;
   a non-transitory memory for storing the information associated with the one or more buried utilities; and
   a display for providing a visual rendering of the information associated with the one or more buried utilities; and
   a ground tracking apparatus operatively coupled to the buried utility locator, including:
   a housing;
   a first camera element disposed on or in the housing;
   a second camera element disposed on or in the housing offset in position relative to the first camera element; and
   a processing element coupled to an output from the first camera element and the second camera element, the processing element including instructions for execution on one or more processors to:

receive an image from the first camera element and an image from the second camera element, wherein the first camera element image and the second camera element image are captured with the ground tracking apparatus at a first position;

detect a ground feature in both the image from the first camera element and the image from the second camera element; determine, based on a position of the ground feature in the image from the first camera element and a position of the ground feature in the image from the second camera element, a height value of the ground tracker above the ground feature at the first position;

store the height value at the first position in a non-transitory memory;

the processing element further configured to determine based on one or both of the image from the first camera element and the image from the second camera element and one or both of another image from the first camera element captured at a second position and another image from the second camera element captured at the second position, a change in position of the ground tracker relative to the first position; and store data associated with the change in position as a tracking parameter in the non-transitory memory.

2. The locator of claim 1, wherein the image from the first camera element and the image from the second camera element are captured at substantially the same time.

3. The locator of claim 1, wherein the ground feature is detected in the image from the first camera element and the image from the second camera element by correlating pixels of the image from the first camera element and pixels of the image from the second camera element.

4. The locator of claim 3, wherein the change in position of the ground tracker is determined by correlating pixels of the image from the first camera element and the another image from the first camera element, or by correlating pixels of the image from the second camera element and the another image from the second camera element, or by correlating pixels of the image from the first camera element and the another image from the first camera element and correlating pixels of the image from the second camera element and the another image from the second camera element.

5. The locator of claim 1, wherein the processing element is disposed in the locator.

6. The locator of claim 1, wherein both of another image from the first camera element and another image from the second camera element are captured at the second position, and wherein the processing element is further programmed to:

determine, based on a position of the ground feature in the another image from the first camera element and a position of the ground feature in the another image from the second camera element, a second height value corresponding to the height of the ground tracker above the ground feature at the second position; and store the second height value in the non-transitory memory.

7. The locator of claim 6, wherein the another image from the first camera element and the another image from the second camera element are captured at substantially the same time.

8. The locator of claim 7, wherein the change in position is further based on the second height value.

9. The locator of claim 1, wherein the processing element is further programmed to:

determine a time difference between capture of one or both of the images from the first camera element and the second camera element and the another image;

based on both a determined relative distance and a determined relative direction between the first position and the second position, determine a velocity vector associated with movement of the ground tracker between the first position and the second position; and store the velocity vector as a tracking parameter in the non-transitory memory.

10. The locator of claim 1, wherein the processing element is further programmed to:

determine a time difference between capture of one or both of the images from the first camera element and the second camera element and the another image;

based on a determined relative distance between the first position and the second position, determine a speed associated with movement of the ground tracker between the first position and the second position; and store the speed as a tracking parameter in the non-transitory memory.

11. A method of motion tracking in a ground tracking device that includes a first camera element and a second camera element offset from the first camera element, the method comprising:

generating, in the first camera element with the ground tracking device at a first position, a first camera element image;

generating, in a second camera element with the ground tracking device at the first position, a second camera element image at substantially the same time as the first camera element image is generated;

providing the first camera element image and the second camera element image to a processing element;

detecting a ground feature in the first camera element image and the second camera element image;

determining, based in part on a position of the detected ground feature in the first camera element image and a position of the detected ground feature in the second camera element image, a height value of the ground tracking device above the ground feature;

storing the determined height value in a non-transitory memory;

determining based on one or both of the first camera element image and the second camera element image a change in position of the ground tracker relative to the first position; and storing data associated with the change in position as a tracking parameter in the non-transitory memory.

12. A method of motion tracking in a locator device that includes a ground tracker having a first camera element and a second camera element offset from the first camera element, the method comprising:

generating, in the first camera element with the ground tracking device at a first position, a first camera element image; generating, in a second camera element with the ground tracking device at the first position, a second camera element image;

providing the first camera element image and the second camera element image to a processing element;

detecting a ground feature in the first camera element image and the second camera element image;

determining, based in part on a position of the detected ground feature in the first camera element image and a position of the detected ground feature in the second camera element image, a height value of the ground tracking device above the ground feature;

storing the determined height value in a non-transitory memory of the locator;

determining, based on one or both of the image from the first camera element and the image from the second camera element, the height value at the first position, and one or both of another image from the first camera element captured at a second position and another image from the second camera element captured at the second position, a change in position of the ground tracker relative to the first position; and storing data associated with the change in position as a tracking parameter in the non-transitory memory of the locator.

13. The method of claim 12, wherein the image from the first camera element and the image from the second camera element are captured at substantially the same time.

14. The method of claim 13, wherein both of another image from the first camera element and another image from the second camera element are captured at the second position, the method further comprising:

determining, based on a position of the ground feature in the another image from the first camera element and a position of the ground feature in the another image from the second camera element, a second height value corresponding to the height of the ground tracker above the ground feature at the second position; and storing the second height value in the non-transitory memory.

15. The method of claim 14, wherein the another image from the first camera element and the another image from the second camera element are captured at substantially the same time.

16. The method of claim 14, wherein the change in position is further based on the second height value about the position of the sonde is determined based at least in part on sonde signal strength data.

* * * * *